US010438288B1

(12) United States Patent
Hartigan et al.

(10) Patent No.: US 10,438,288 B1
(45) Date of Patent: Oct. 8, 2019

(54) MULTIDIMENSIONAL ASSET MANAGEMENT TAG PIVOT APPARATUSES, METHODS AND SYSTEMS

(71) Applicant: Marstone, Inc., New York, NY (US)

(72) Inventors: Margaret Josephine Hartigan, New York, NY (US); Robert Morris Stone, San Francisco, CA (US)

(73) Assignee: Marstone, Inc., New York, NY (US)

( * ) Notice: Subject to any disclaimer, the term of this patent is extended or adjusted under 35 U.S.C. 154(b) by 671 days.

(21) Appl. No.: 14/732,717

(22) Filed: Jun. 6, 2015

Related U.S. Application Data

(60) Provisional application No. 62/008,625, filed on Jun. 6, 2014.

(51) Int. Cl.
*G06Q 40/00* (2012.01)
*G06Q 40/06* (2012.01)

(52) U.S. Cl.
CPC ............ *G06Q 40/06* (2013.01); *G06Q 40/00* (2013.01)

(58) Field of Classification Search
CPC ...................................... G06Q 40/00
USPC ...................................... 705/35–45
See application file for complete search history.

(56) References Cited

U.S. PATENT DOCUMENTS

| 6,064,984 | A * | 5/2000 | Ferguson | G06Q 40/00 |
| | | | | 705/35 |
| 7,689,494 | B2 * | 3/2010 | Tome | G06Q 40/00 |
| | | | | 705/36 R |
| 2001/0011242 | A1 * | 8/2001 | Allex | G06Q 40/02 |
| | | | | 705/36 R |
| 2004/0267651 | A1 * | 12/2004 | Jenson | G06Q 40/00 |
| | | | | 705/36 R |
| 2006/0074788 | A1 * | 4/2006 | Grizack | G06Q 40/00 |
| | | | | 705/35 |
| 2006/0190385 | A1 * | 8/2006 | Dresden | G06Q 30/02 |
| | | | | 705/37 |

(Continued)

OTHER PUBLICATIONS

David Bach, Finish Rich Quick Start System, 2012, FinishRich Media, LLC., web, 1-32 (Year: 2012).*

*Primary Examiner* — I Jung Liu
(74) *Attorney, Agent, or Firm* — Hanchuk Kheit LLP; Walter G. Hanchuk

(57) ABSTRACT

The Multidimensional Asset Management Tag Pivot Apparatuses, Methods and Systems ("MAMTP") transforms iTag Creation Request and Responses, holdings selections, allocation splits, goal map selections, goal option selections, account links inputs via MAMTP components into iTag records, iTagged asset information, asset buy/sell approval, asset order, map goal add, tracking, outputs. The MAMTP includes a processor issuing instructions to obtain: an asset identifier for an asset collection from a user, and associated interest profile constraints. MAMTP also obtains an interest tag selection, obtain constituent asset collection proportion allocation information based on the interest tag selection. The MAMTP may then provide a selection mechanism for the user to specify preferences amongst any conflicting tag selections. Thus, the MAMTP may generate synthetic alternatives according to any specified preferences and generate a rebalance of the asset collection based on the constituent asset collection proportion allocation information, any conflicting tag selections, and any synthetic alternatives.

5 Claims, 57 Drawing Sheets

(56) References Cited

U.S. PATENT DOCUMENTS

| | | | | |
|---|---|---|---|---|
| 2007/0100708 A1* | 5/2007 | Smith | G06Q 30/02 | 705/26.1 |
| 2007/0156558 A1* | 7/2007 | Wolzenski | G06Q 40/00 | 705/35 |
| 2007/0244777 A1* | 10/2007 | Tome | G06Q 40/00 | 705/35 |
| 2008/0040221 A1* | 2/2008 | Wiseman | G06Q 30/02 | 705/14.54 |
| 2008/0103953 A1* | 5/2008 | Flake | G06Q 30/02 | 705/37 |
| 2009/0024540 A1* | 1/2009 | Ryder | G06Q 40/00 | 705/36 R |
| 2010/0161467 A1* | 6/2010 | Ageenko | G06Q 40/00 | 705/35 |
| 2010/0268629 A1* | 10/2010 | Ross | G06Q 10/10 | 705/35 |
| 2010/0280935 A1* | 11/2010 | Fellowes | G06Q 40/00 | 705/35 |
| 2011/0106691 A1* | 5/2011 | Clark | G06Q 40/025 | 705/38 |
| 2012/0136762 A1* | 5/2012 | Wissenbach | G06Q 30/02 | 705/30 |
| 2012/0239416 A1* | 9/2012 | Langva | G06Q 40/08 | 705/2 |
| 2013/0318007 A1* | 11/2013 | Van Harlow | G06Q 50/22 | 705/36 R |
| 2014/0222587 A1* | 8/2014 | Feldman | G06Q 30/0275 | 705/14.71 |
| 2014/0310142 A1* | 10/2014 | Mak | G06Q 40/02 | 705/35 |

* cited by examiner

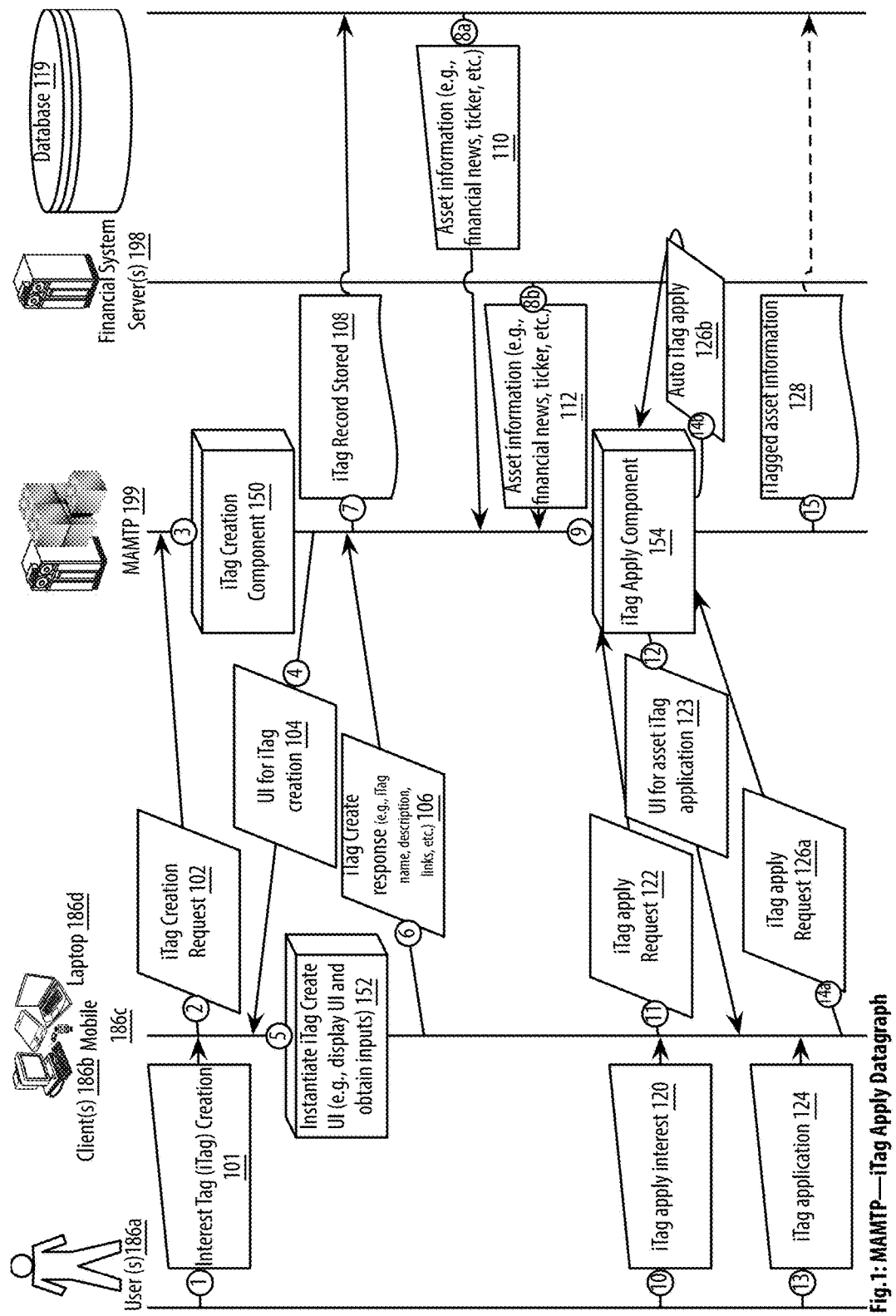
Fig. 1: MAMTP—iTag Apply Datagraph

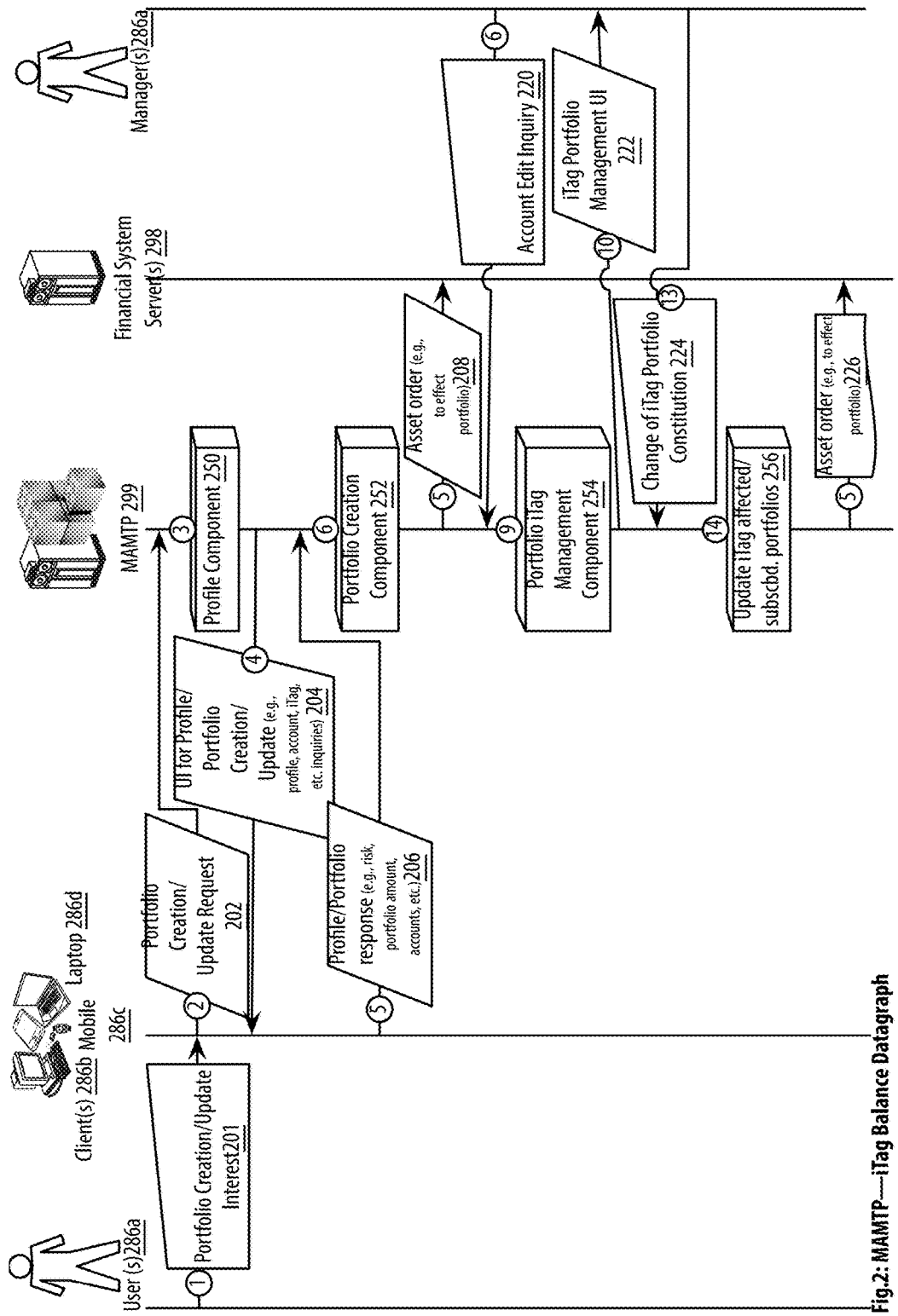
Fig.2: MAMTP—iTag Balance Datagraph

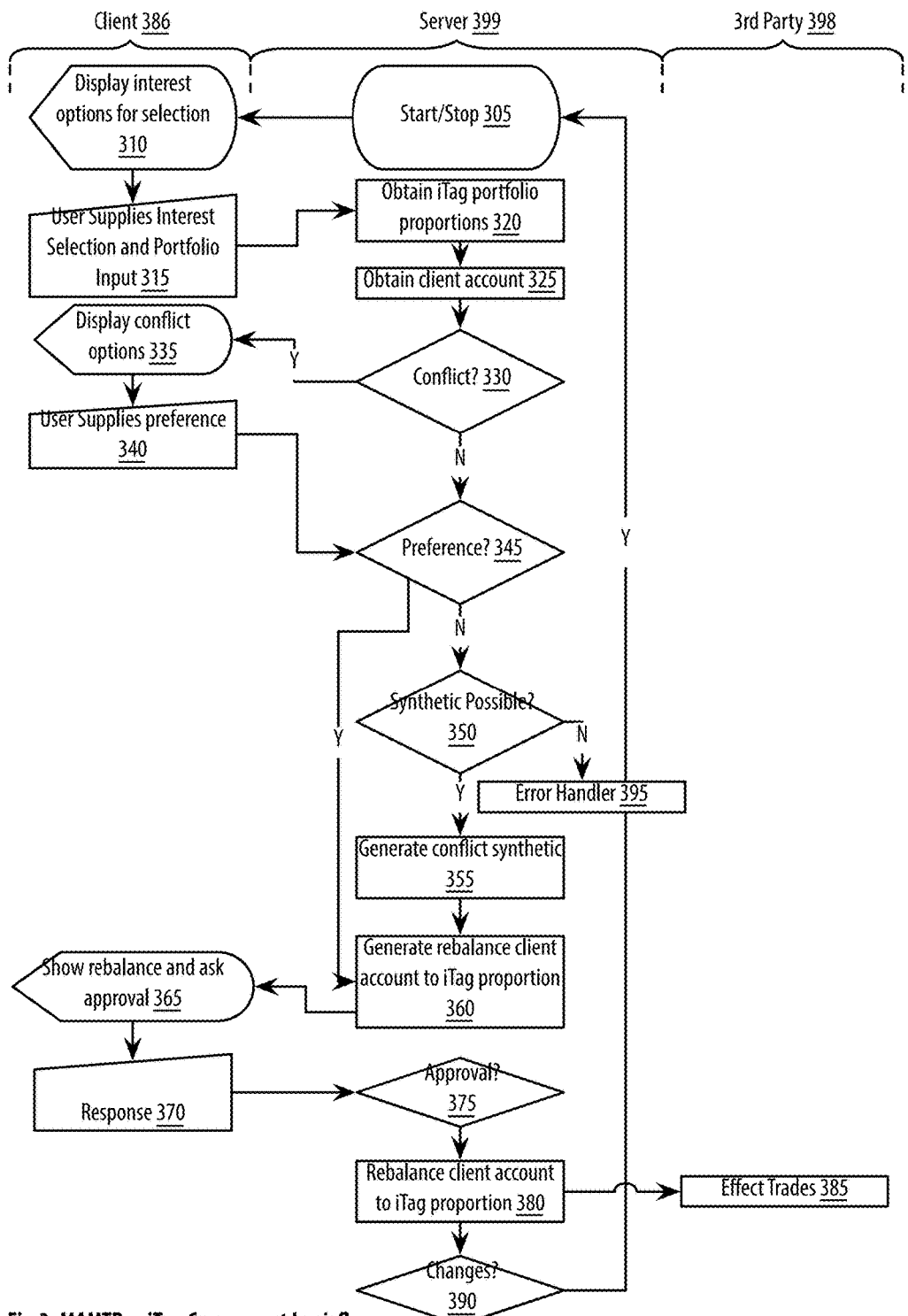
Fig.3: MAMTP—iTag Component Logicflow

Fig. 4: MAMTP—UI iTagger

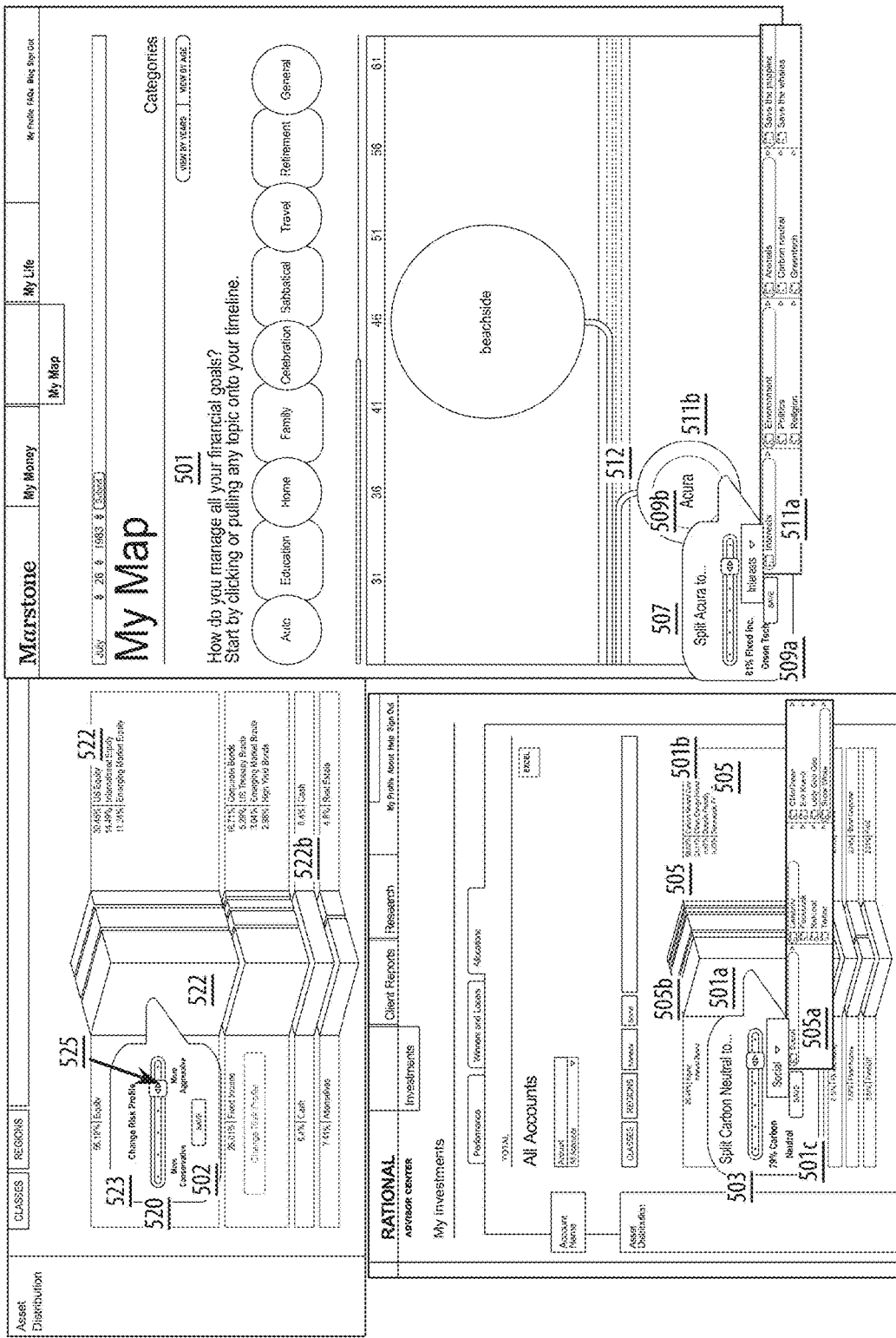
Fig. 5: MAMTP—Asset Holdings Slicer

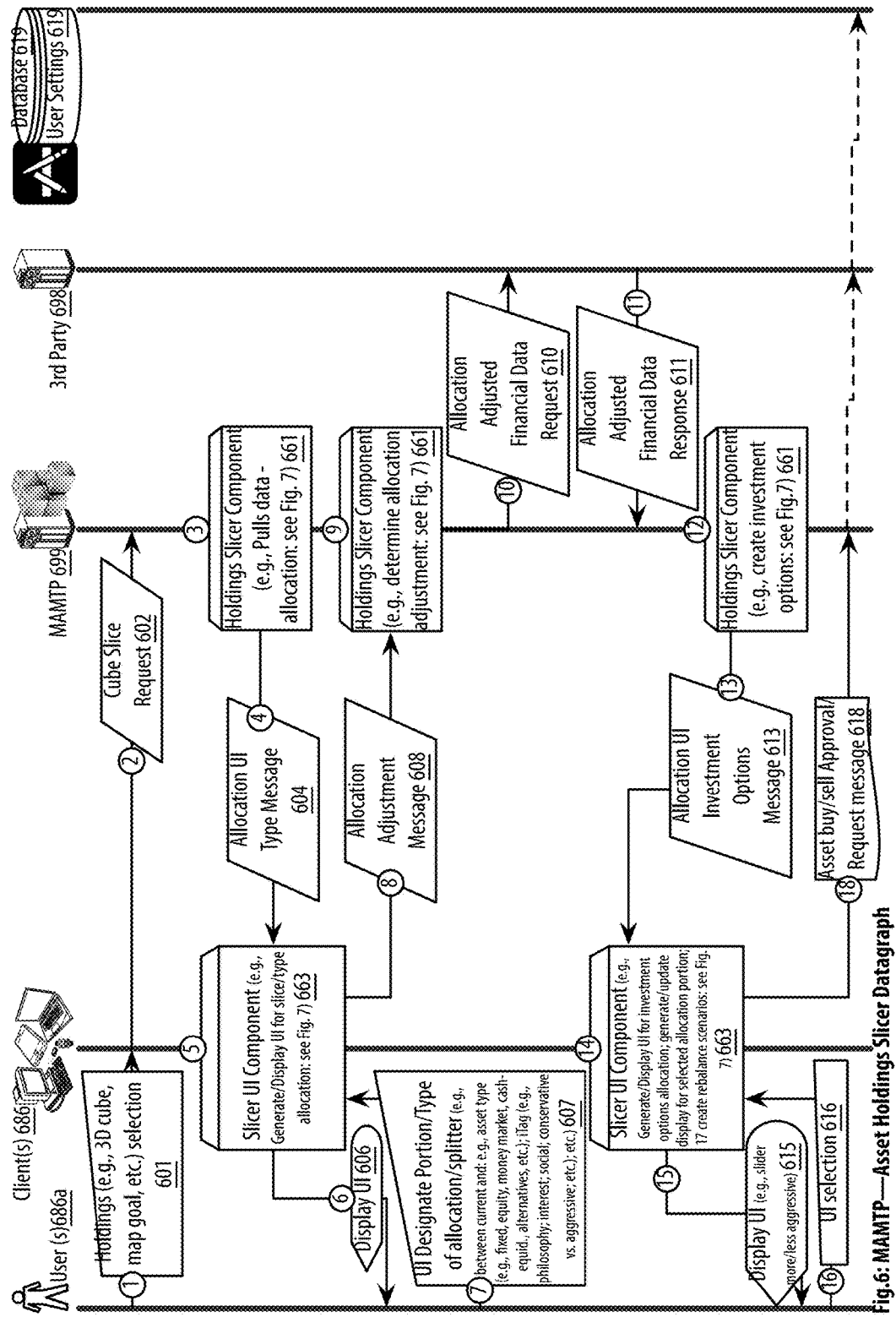
Fig. 6: MAMTP—Asset Holdings Slicer Datagraph

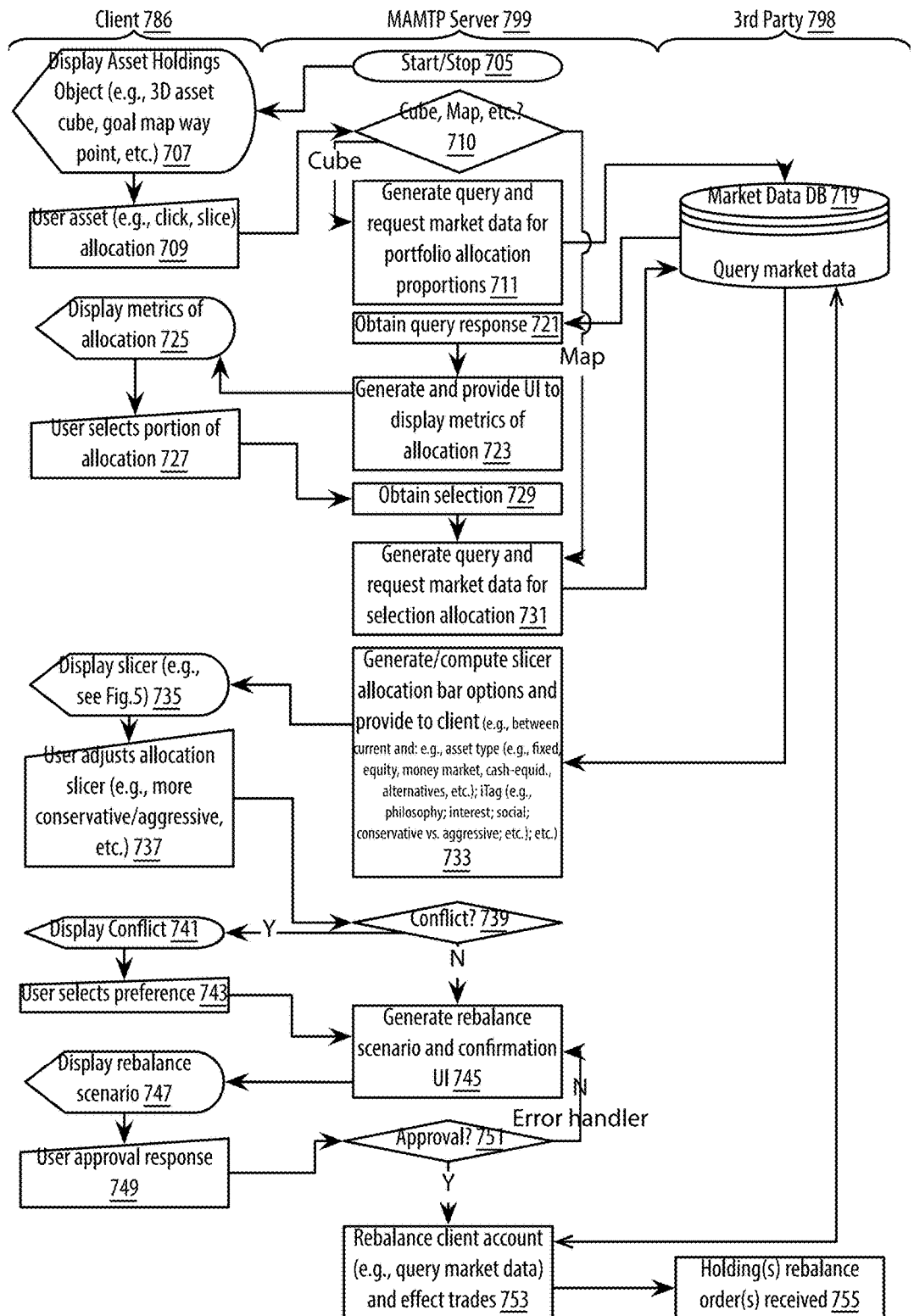
Fig.7: MAMTP—Asset Holdings Slicer Component Logic Flow

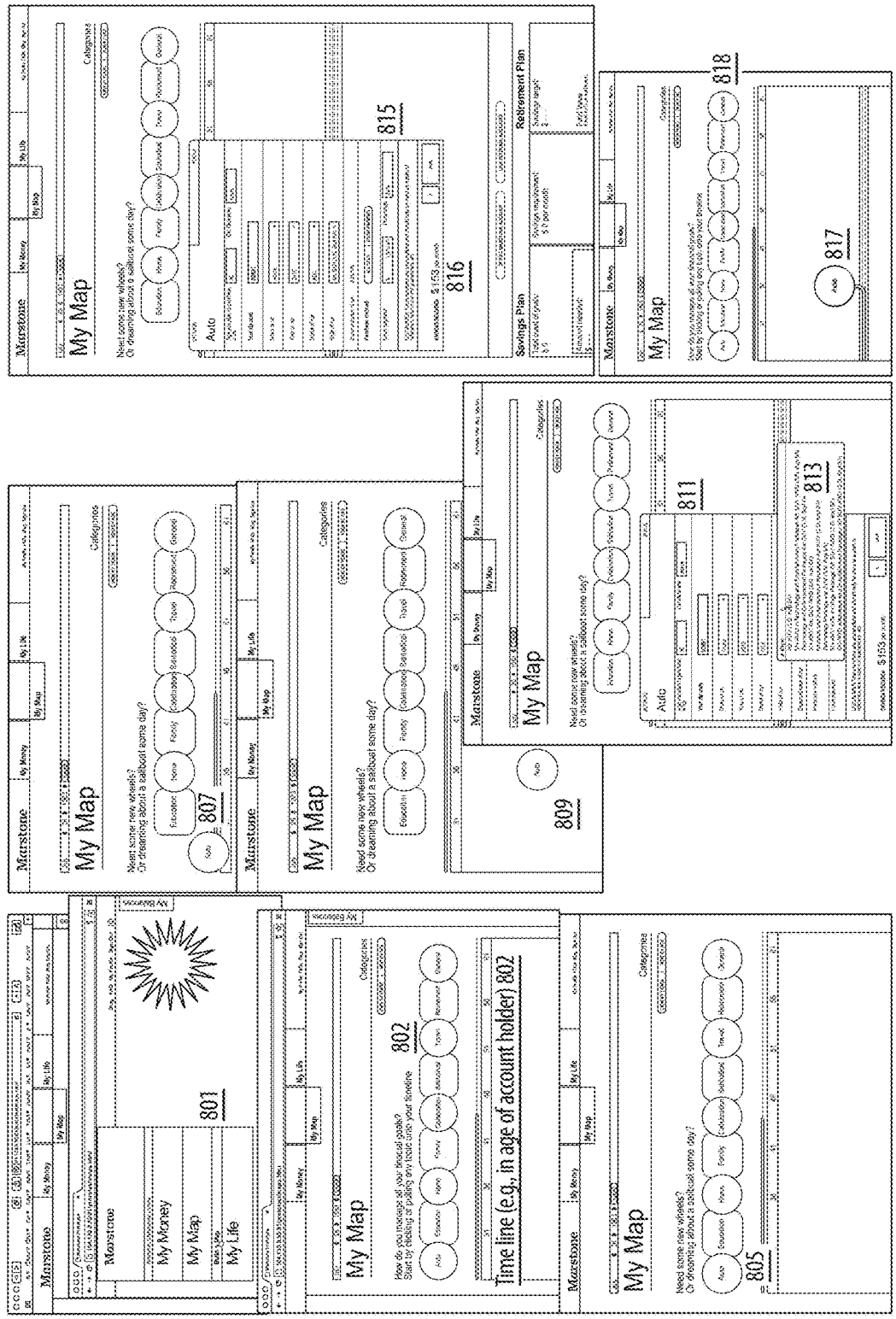
Fig. 8: MAMTP—UI Maps Auto

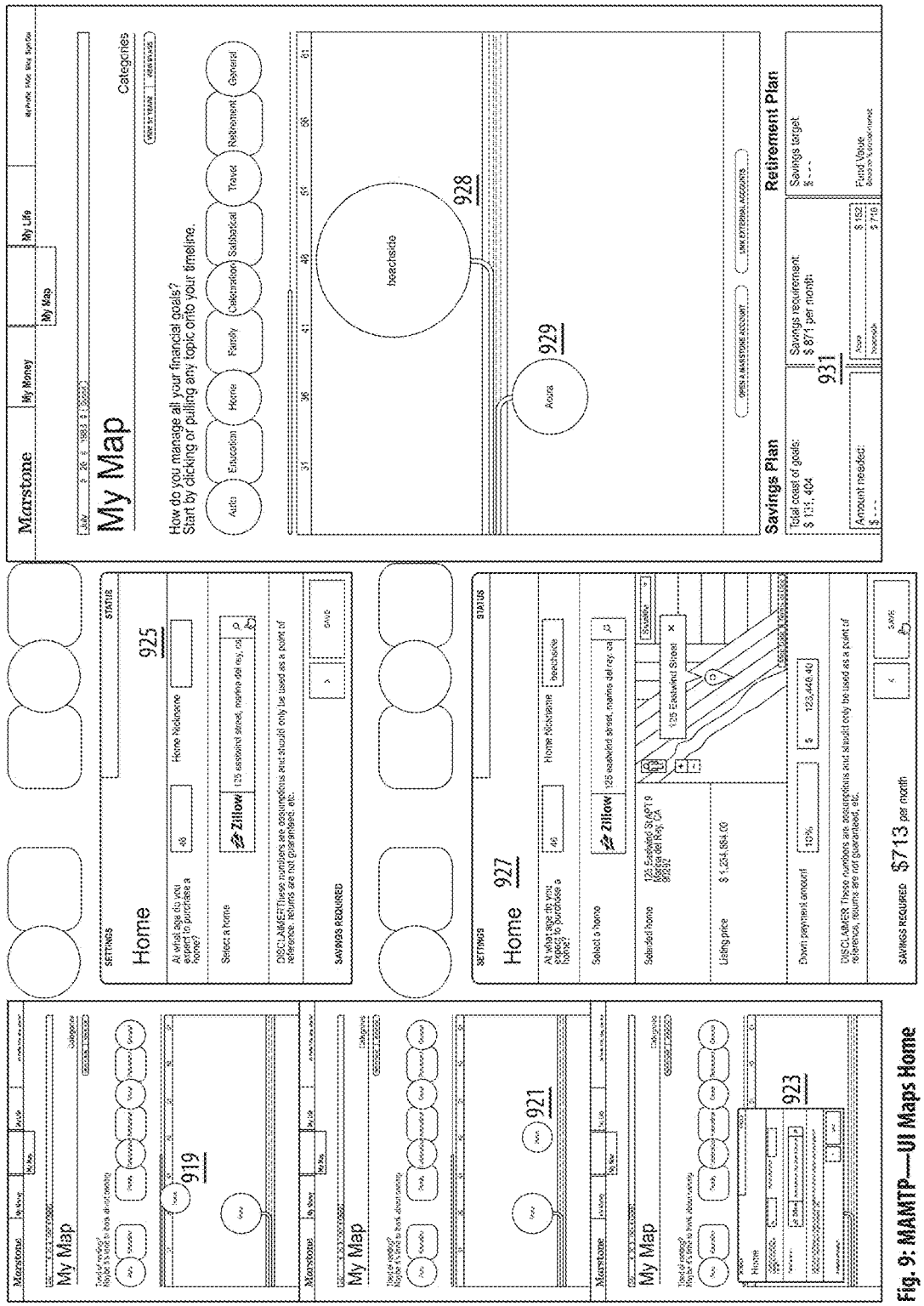
Fig. 9: MAMTP—UI Maps Home

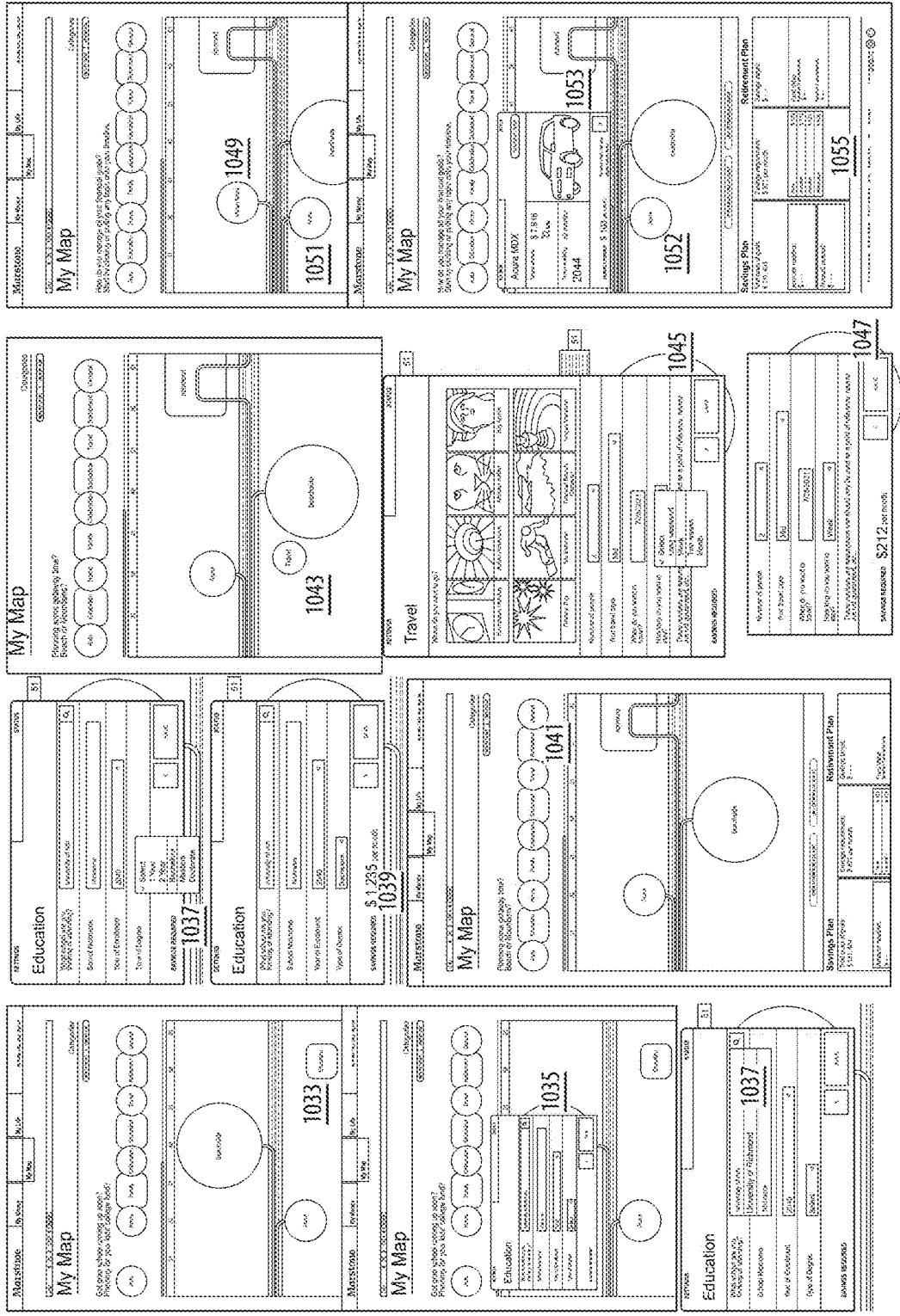
Fig. 10: MAMTP—UI Maps Education

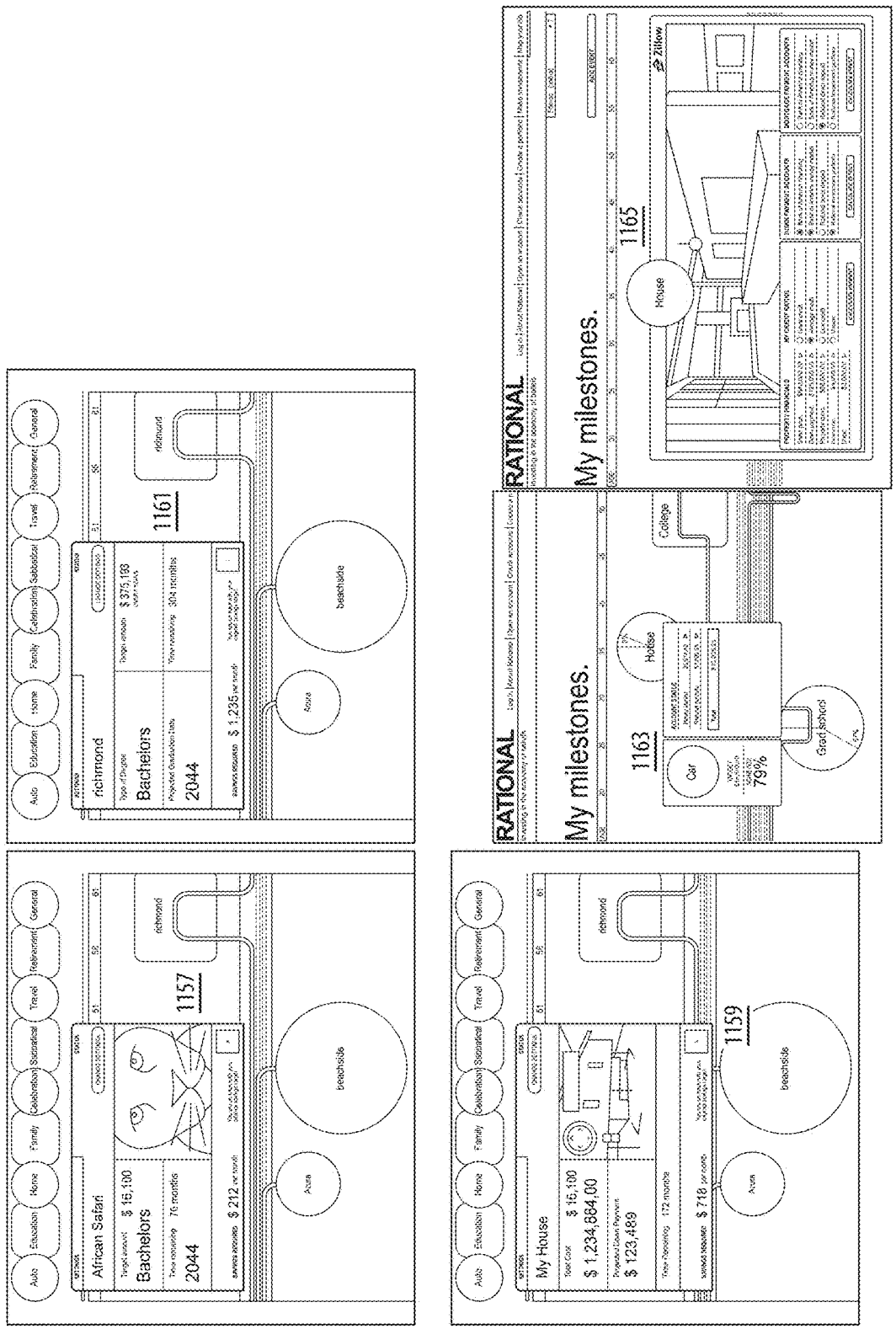
Fig. 11: MAMTP—UI Maps Safari, Education, Home Alernatives

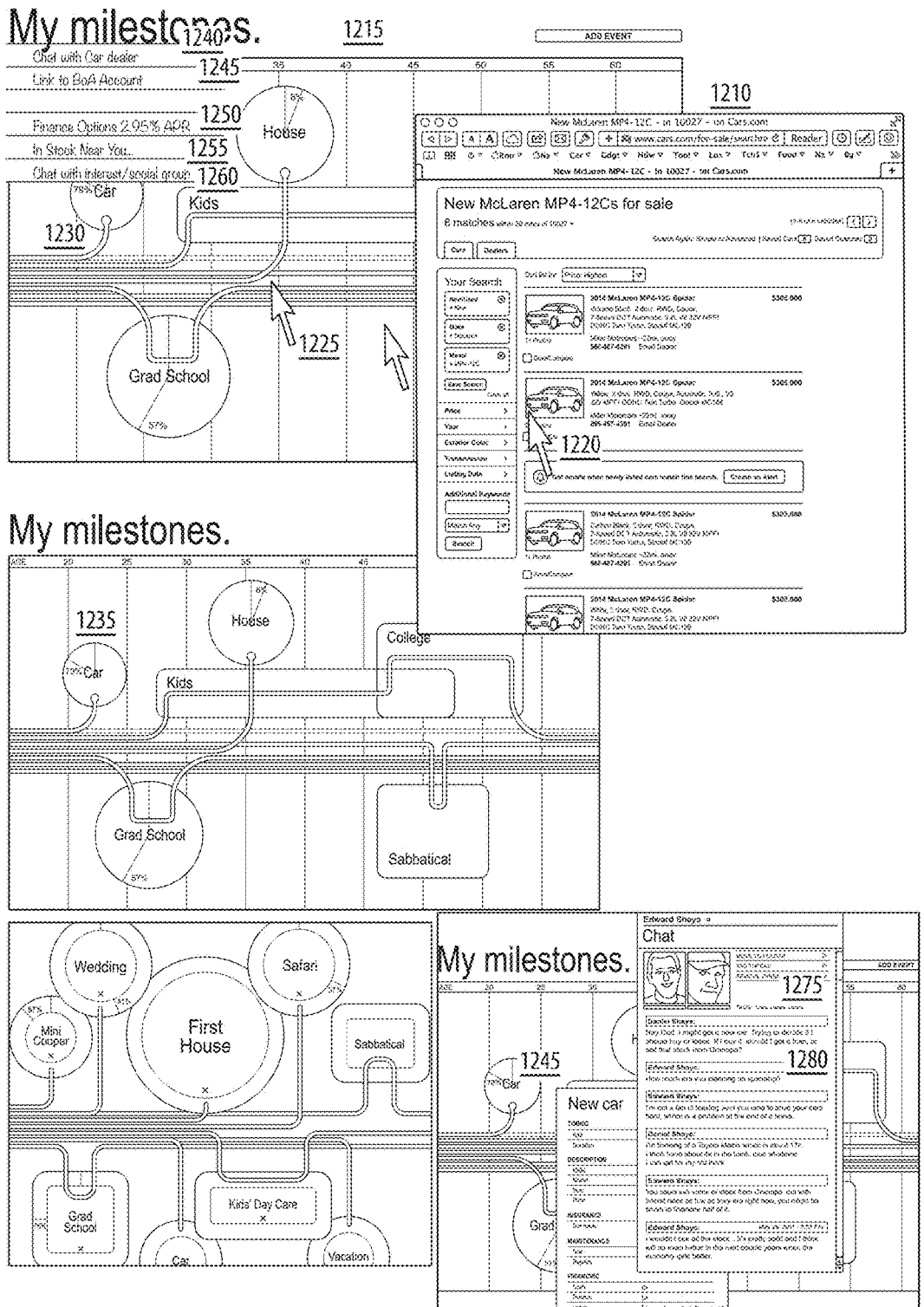
Fig. 12: MAMTP—UI Maps Ads + Extras

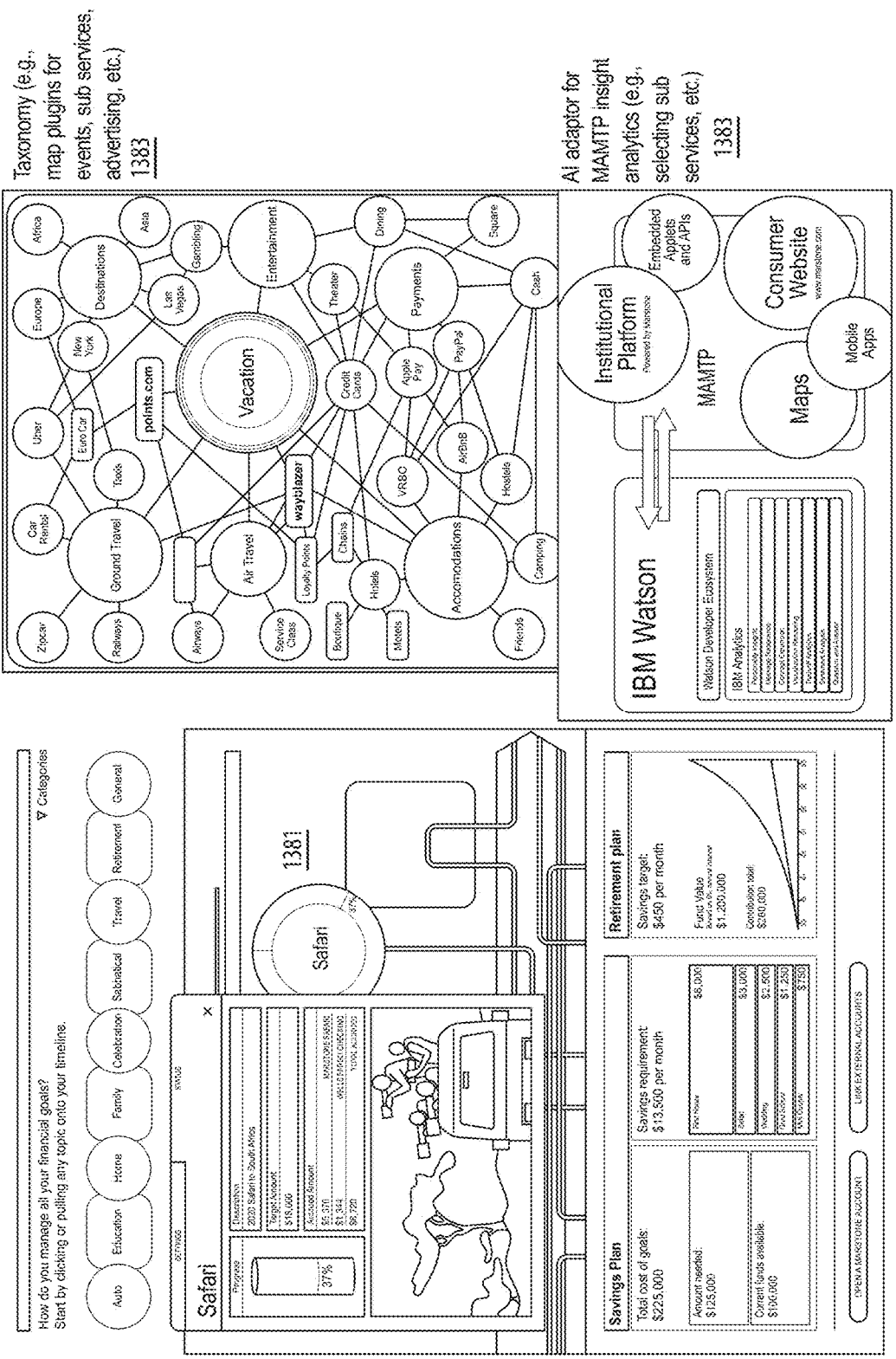
Fig. 13: MAMTP—Maps Extras + Artificial Intelligence

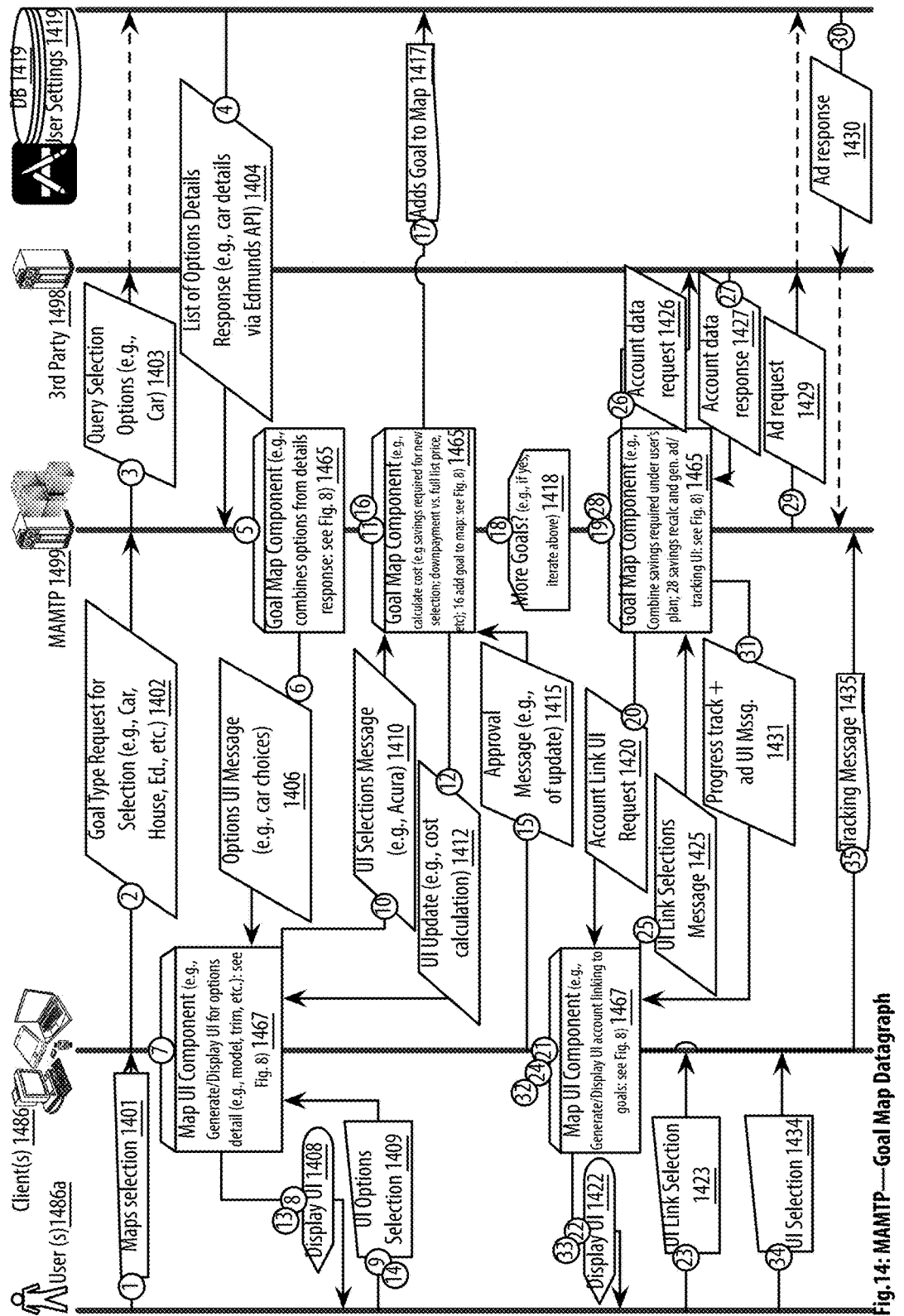
Fig. 14: MAMTP—Goal Map Datagraph

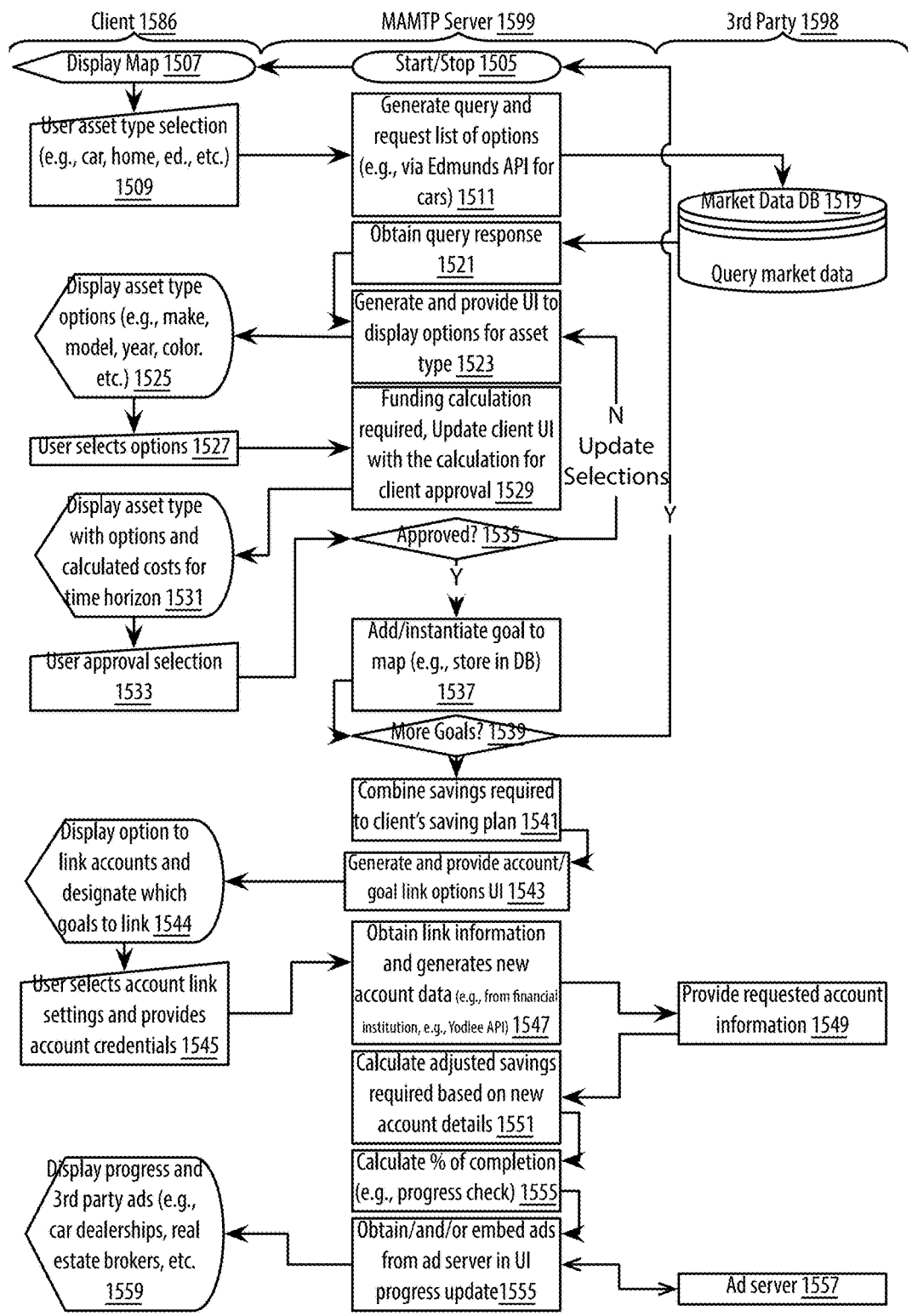
Fig.15: MAMTP—Map Component Logic Flow

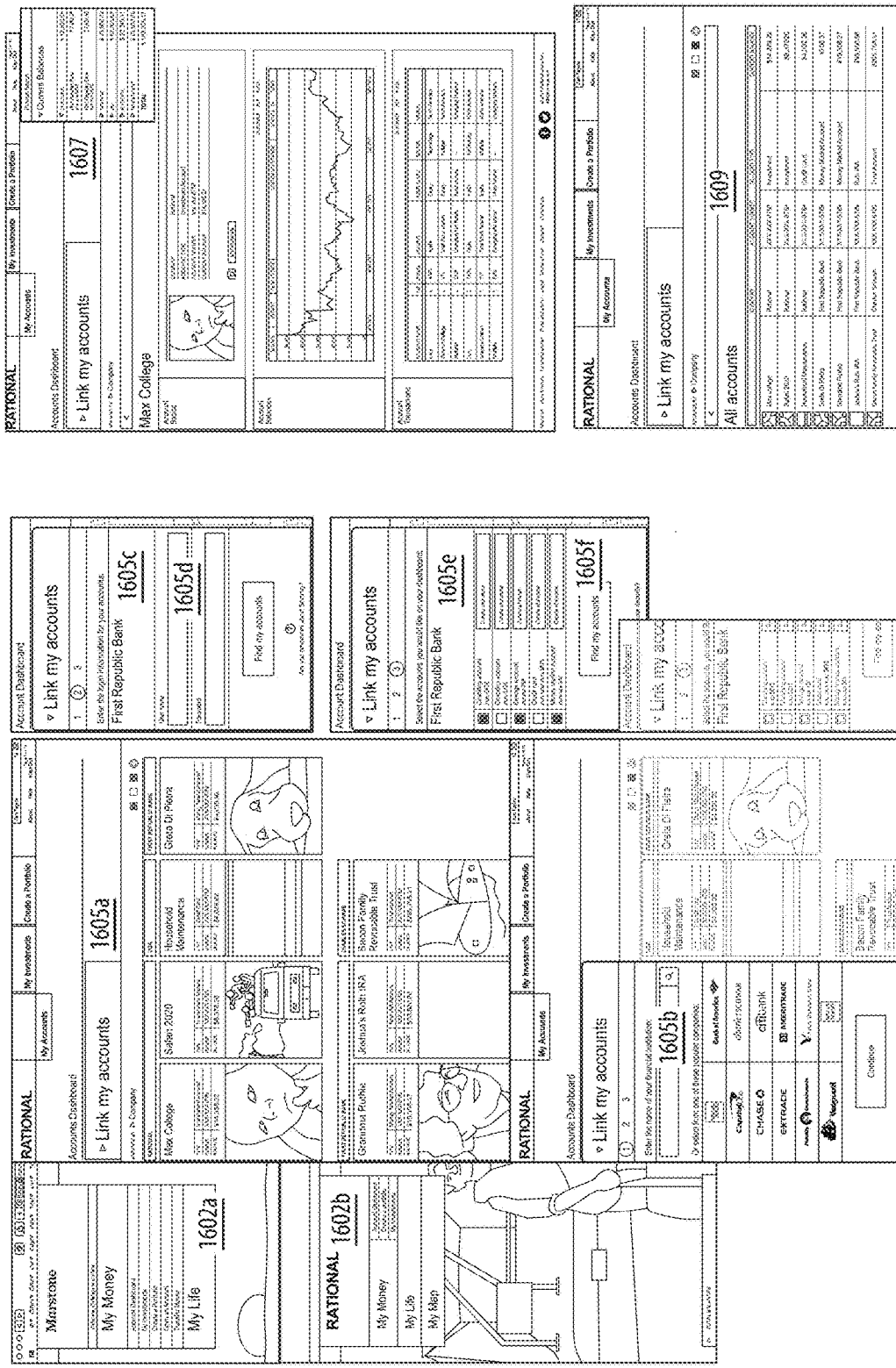
Fig. 16: MAMTP—UI Login, Menus, Account Linking

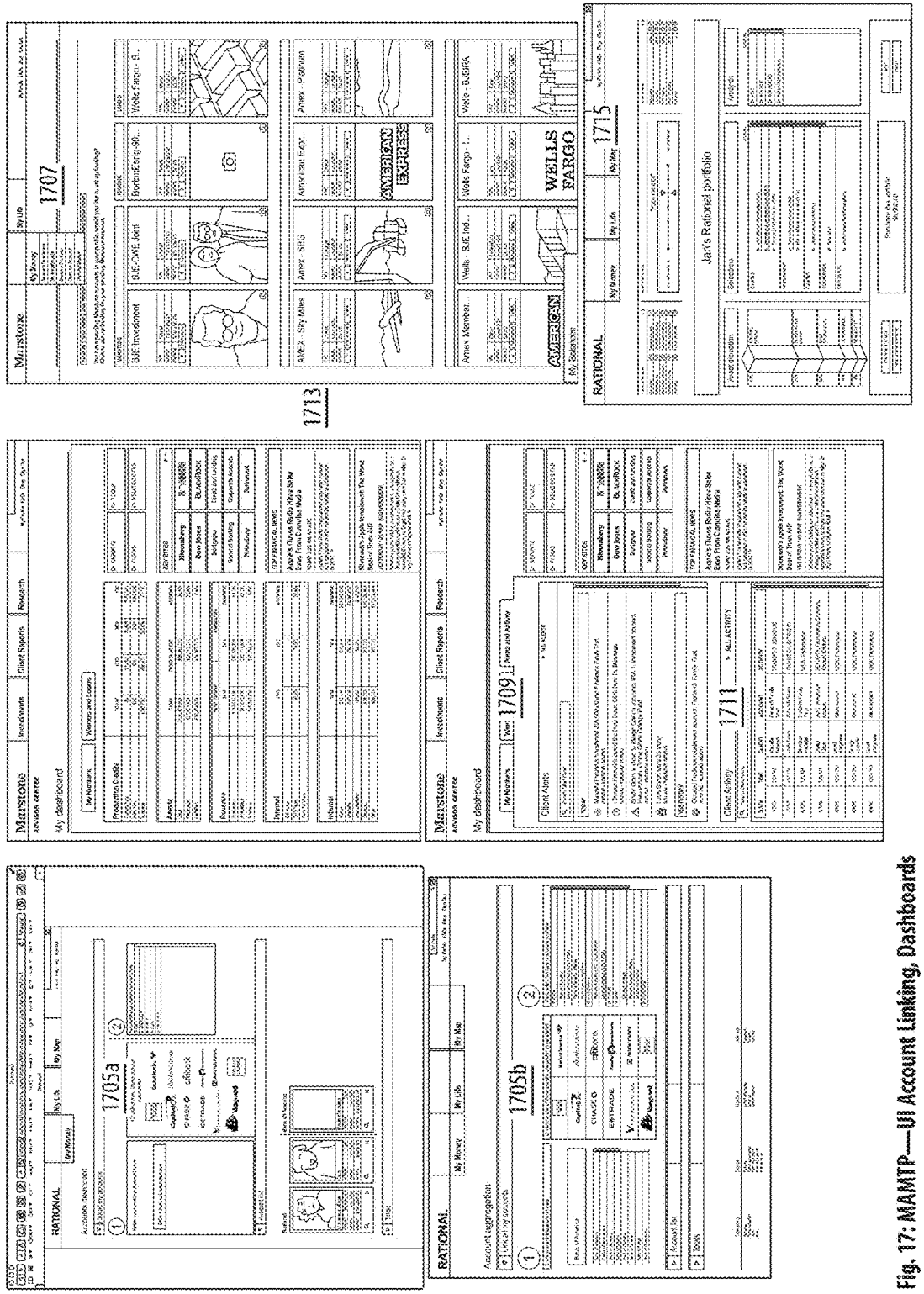
Fig. 17: MAMTP—UI Account Linking, Dashboards

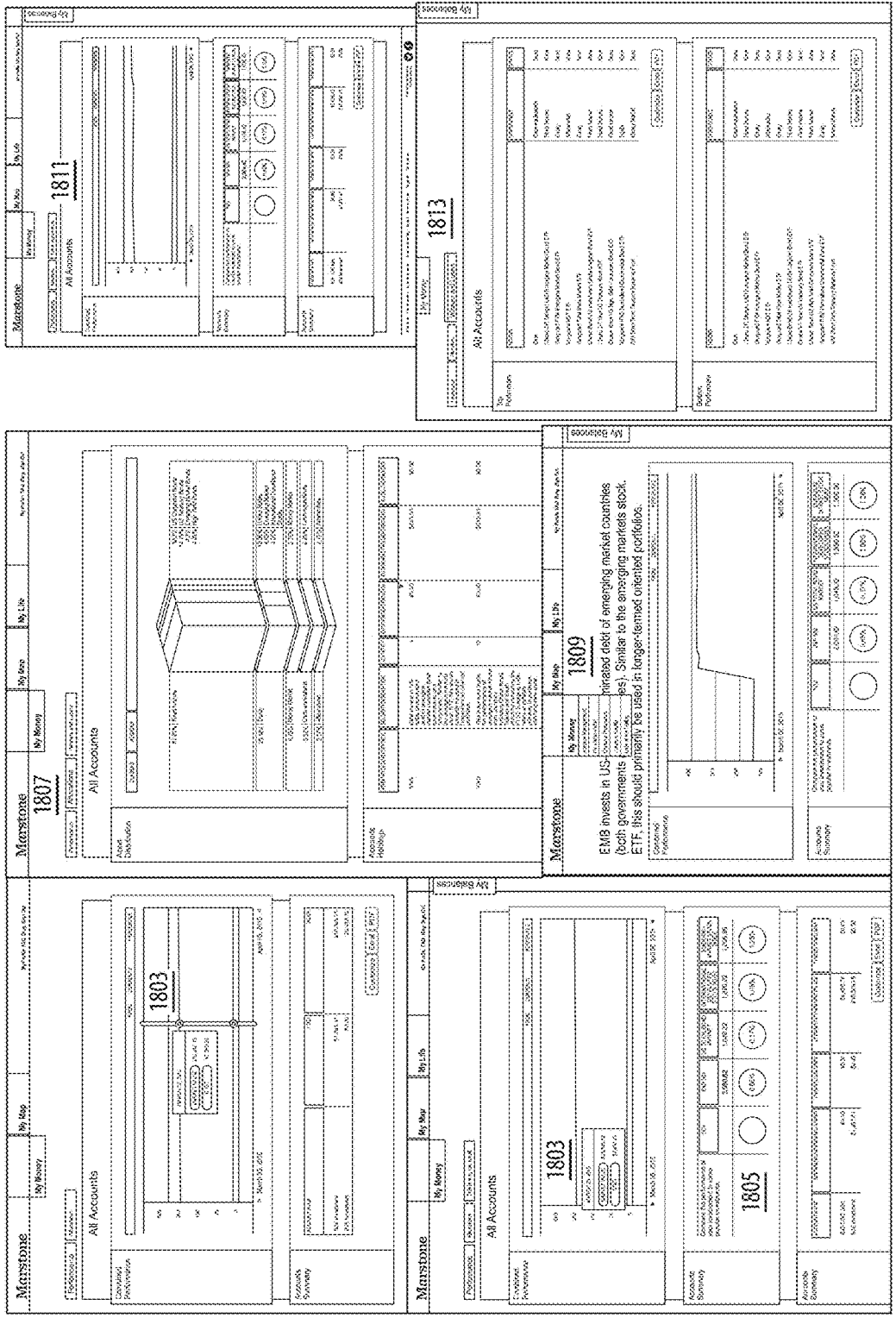
Fig. 18: MAMTP—UI Investments

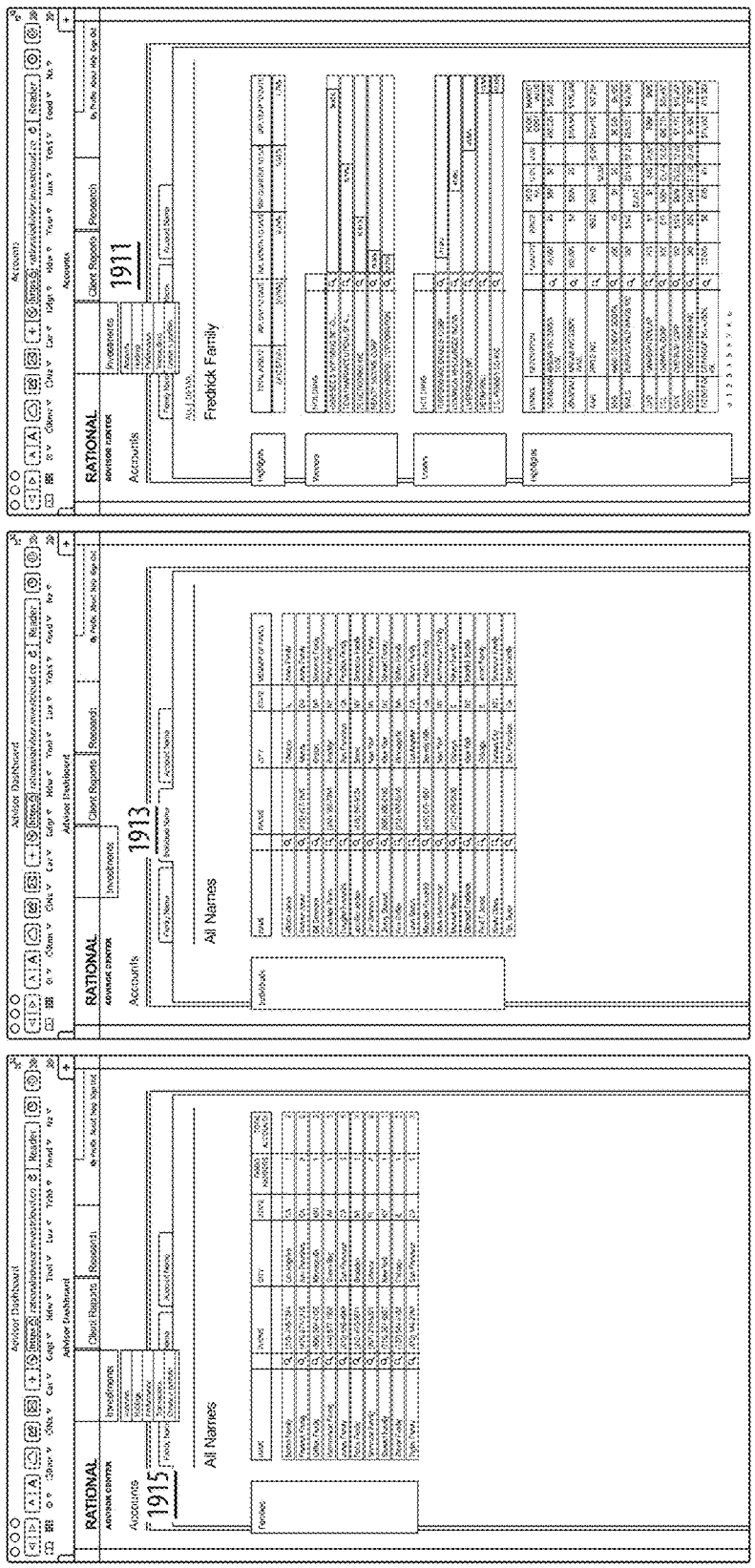
Fig. 19: MAMTP—UI Investments

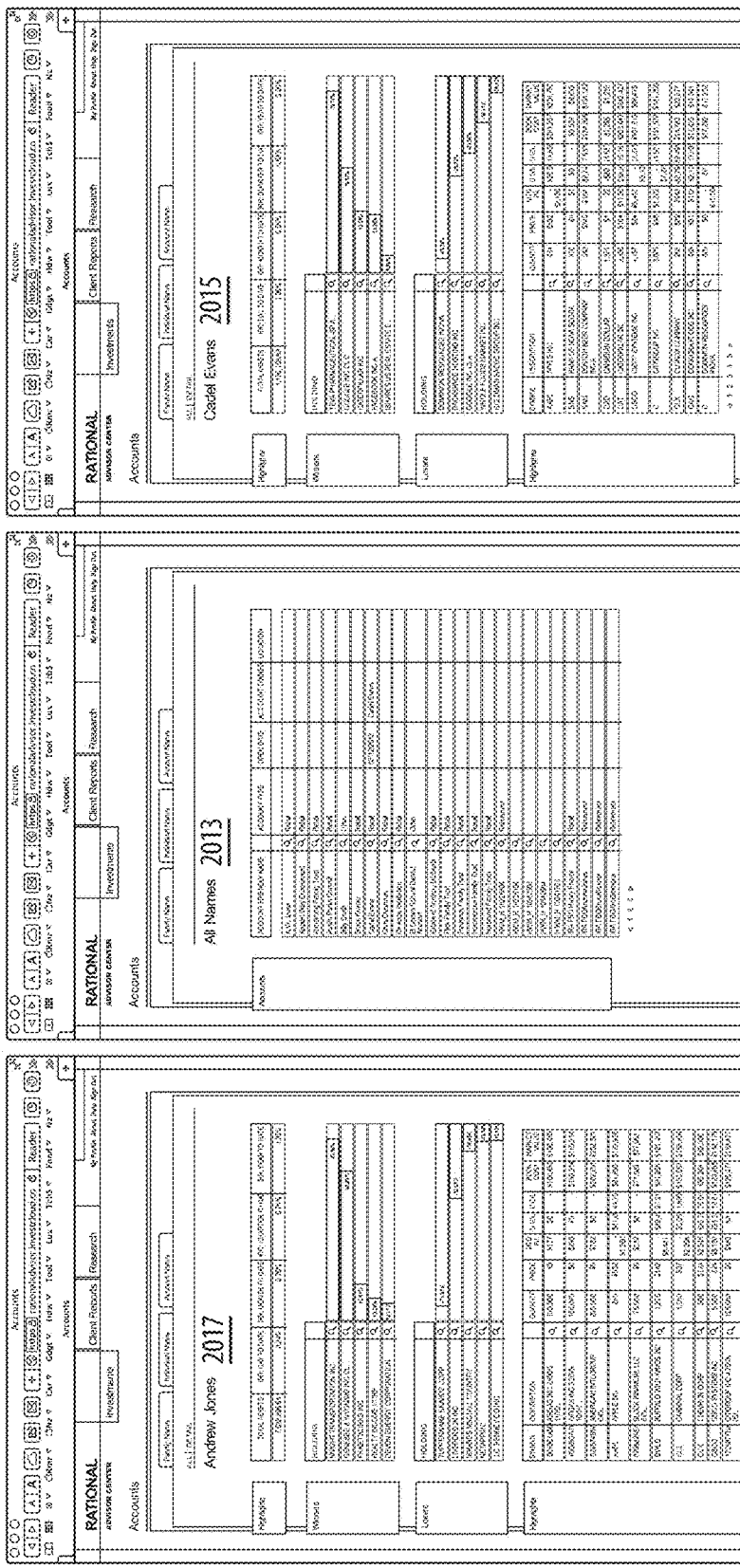
Fig. 20 MAMTP—UI Investments

Fig. 21: MAMTP—UI Holdings, Column Chooser

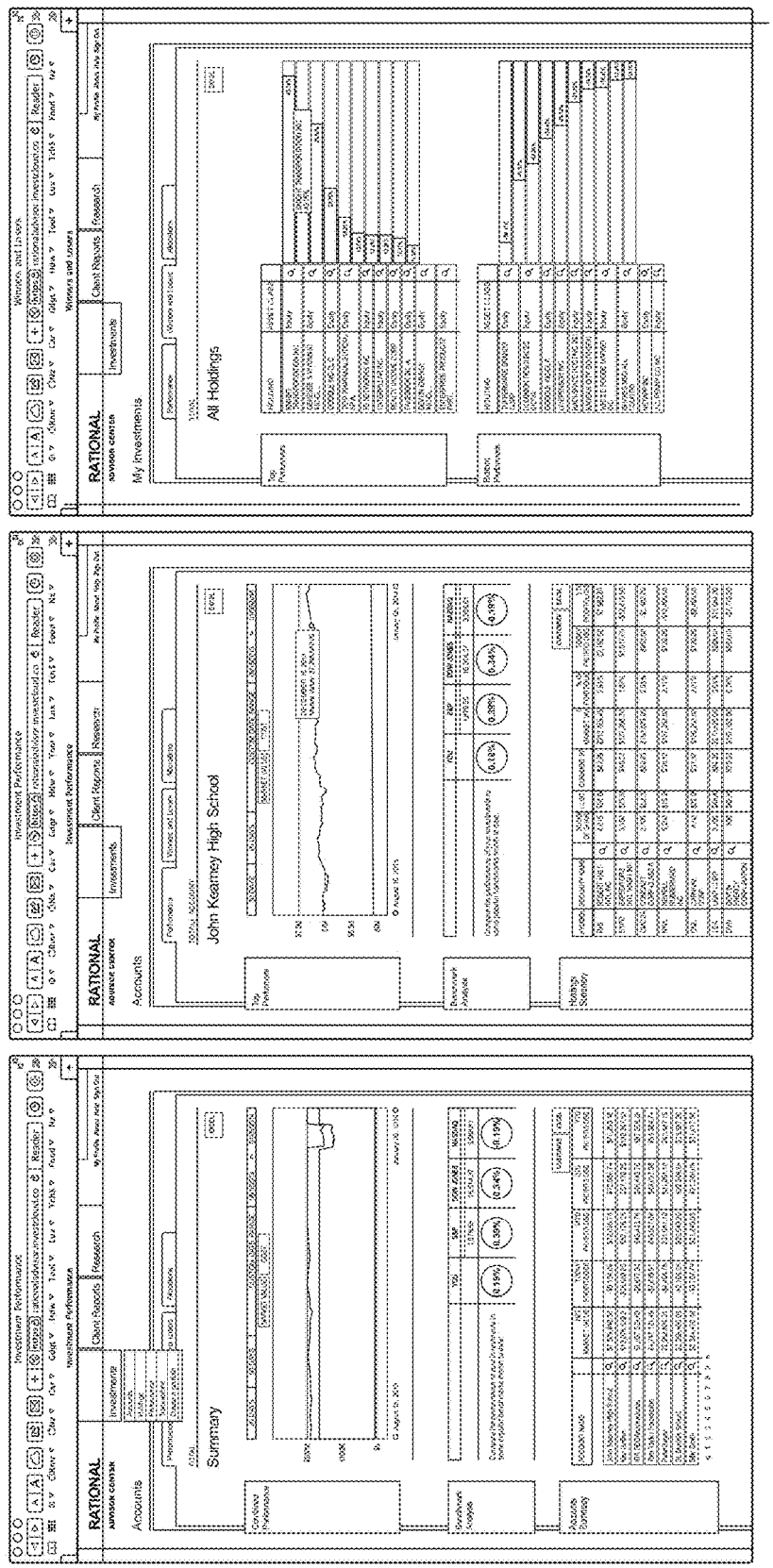
Fig. 22: MAMTP—UI Investments Summary/Overview

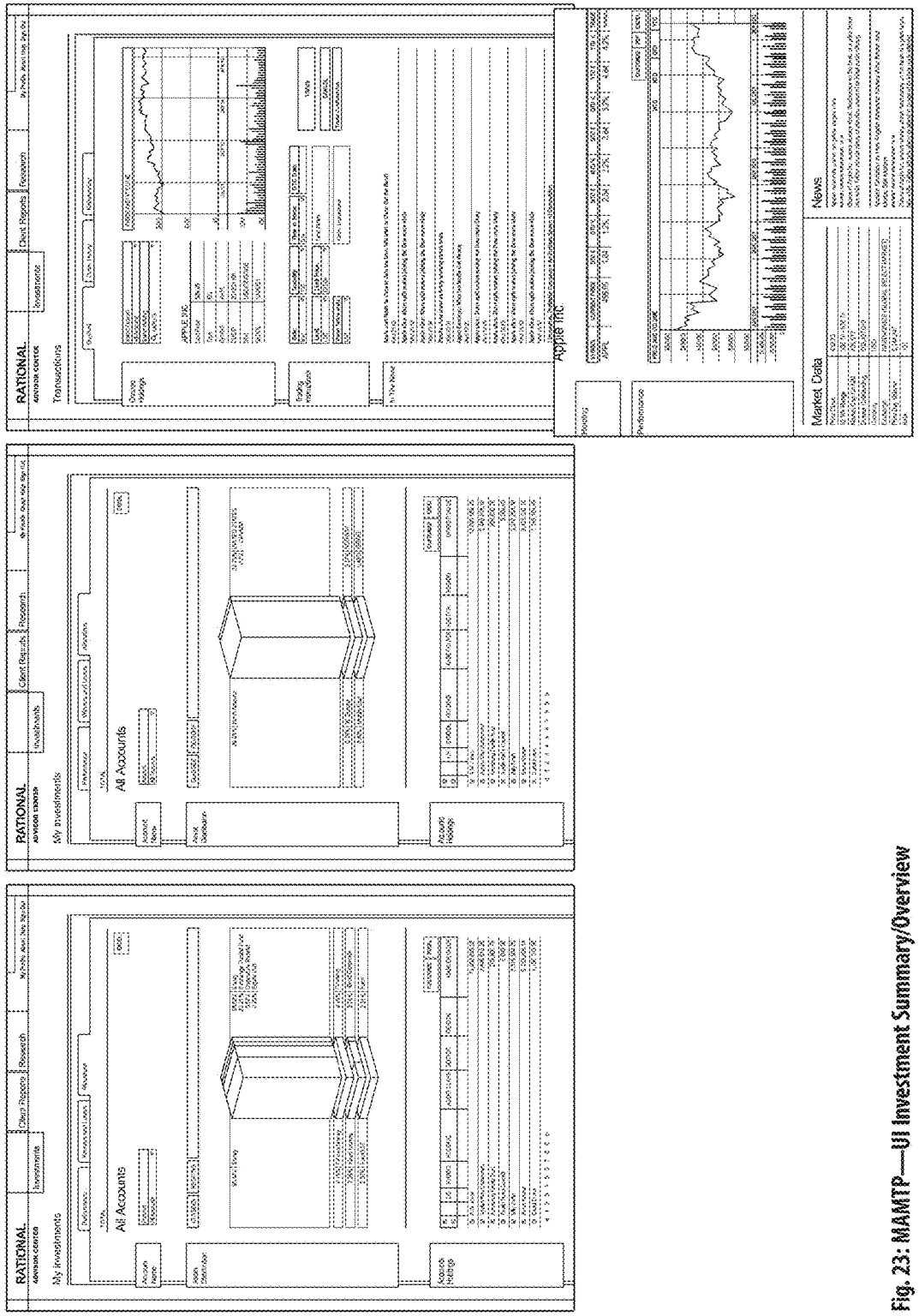
Fig. 23: MAMTP—UI Investment Summary/Overview

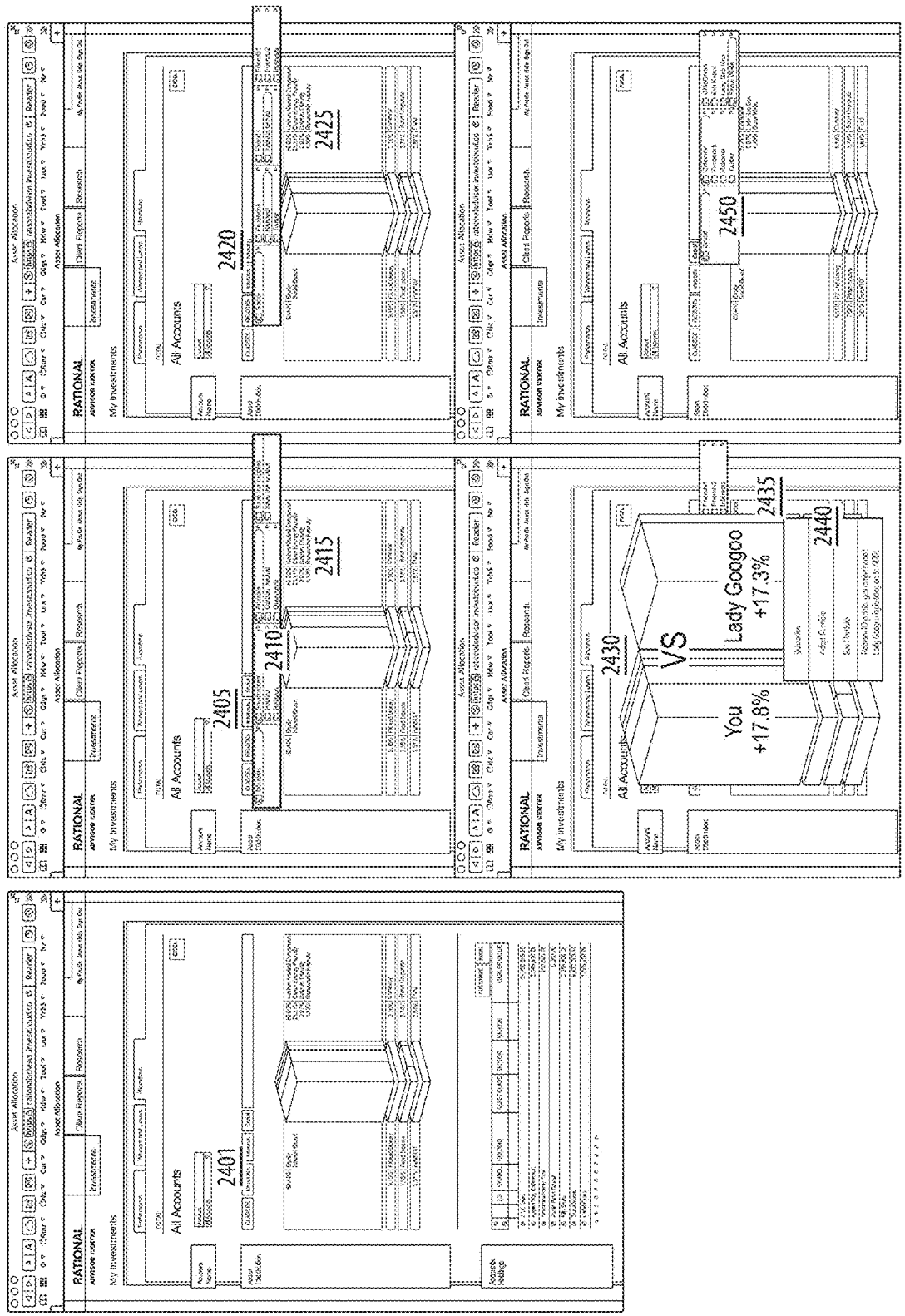
Fig. 24: MAMTP—UI Investments Interest, Social, Extras

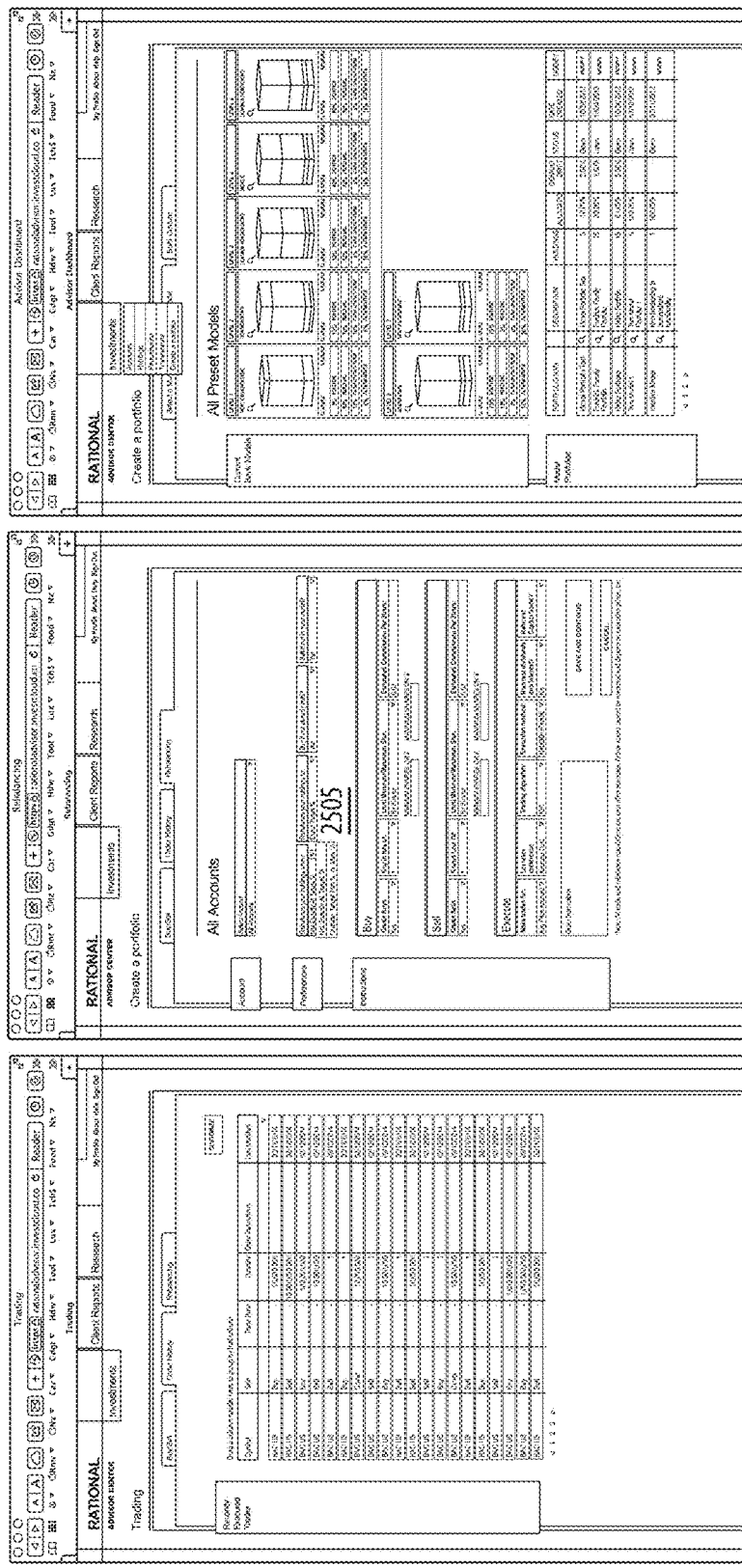
Fig. 25: MAMTP—UI History, Investments, Model Presets

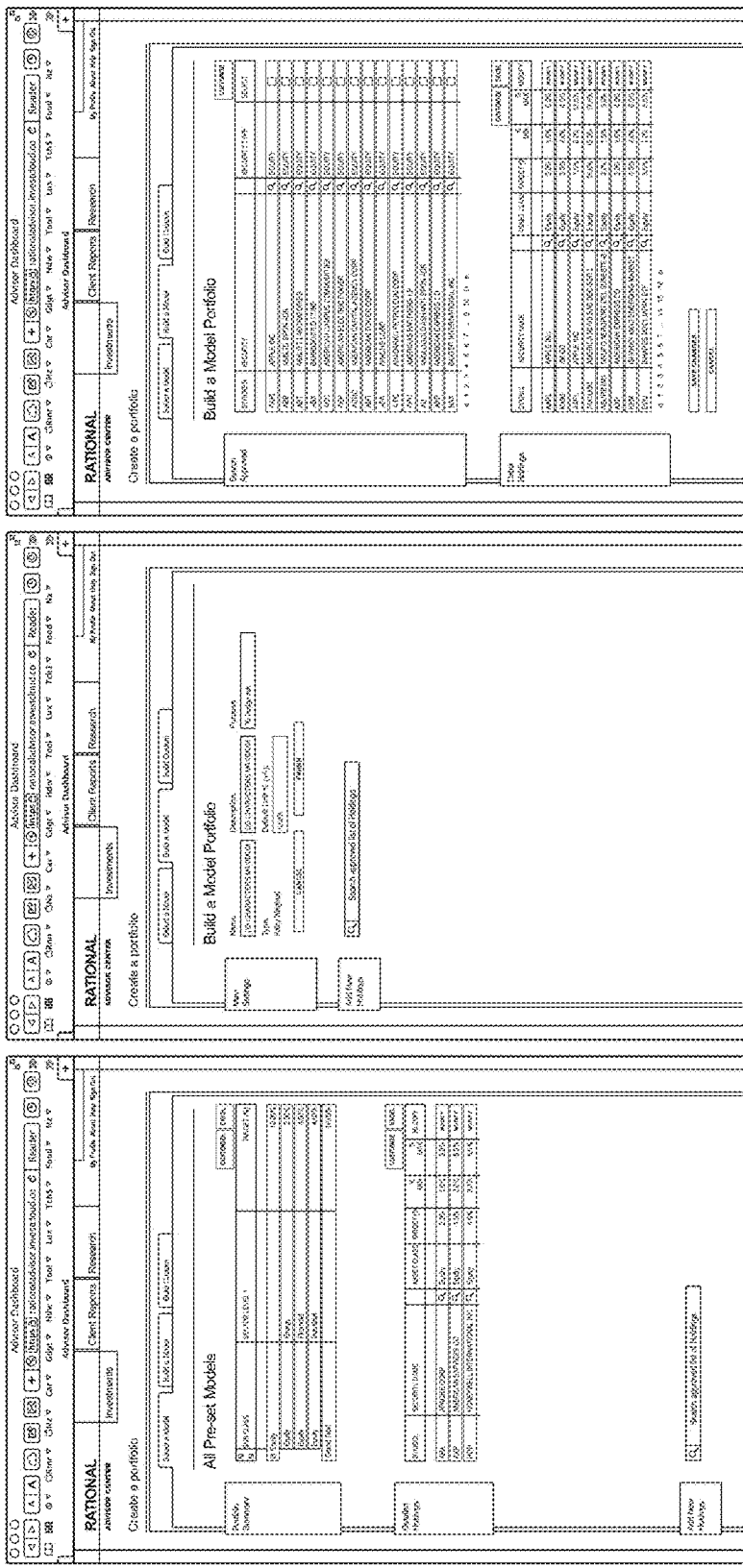
Fig. 26: MAMTP—UI Structure Pre-sets, Investments Model Portfolio

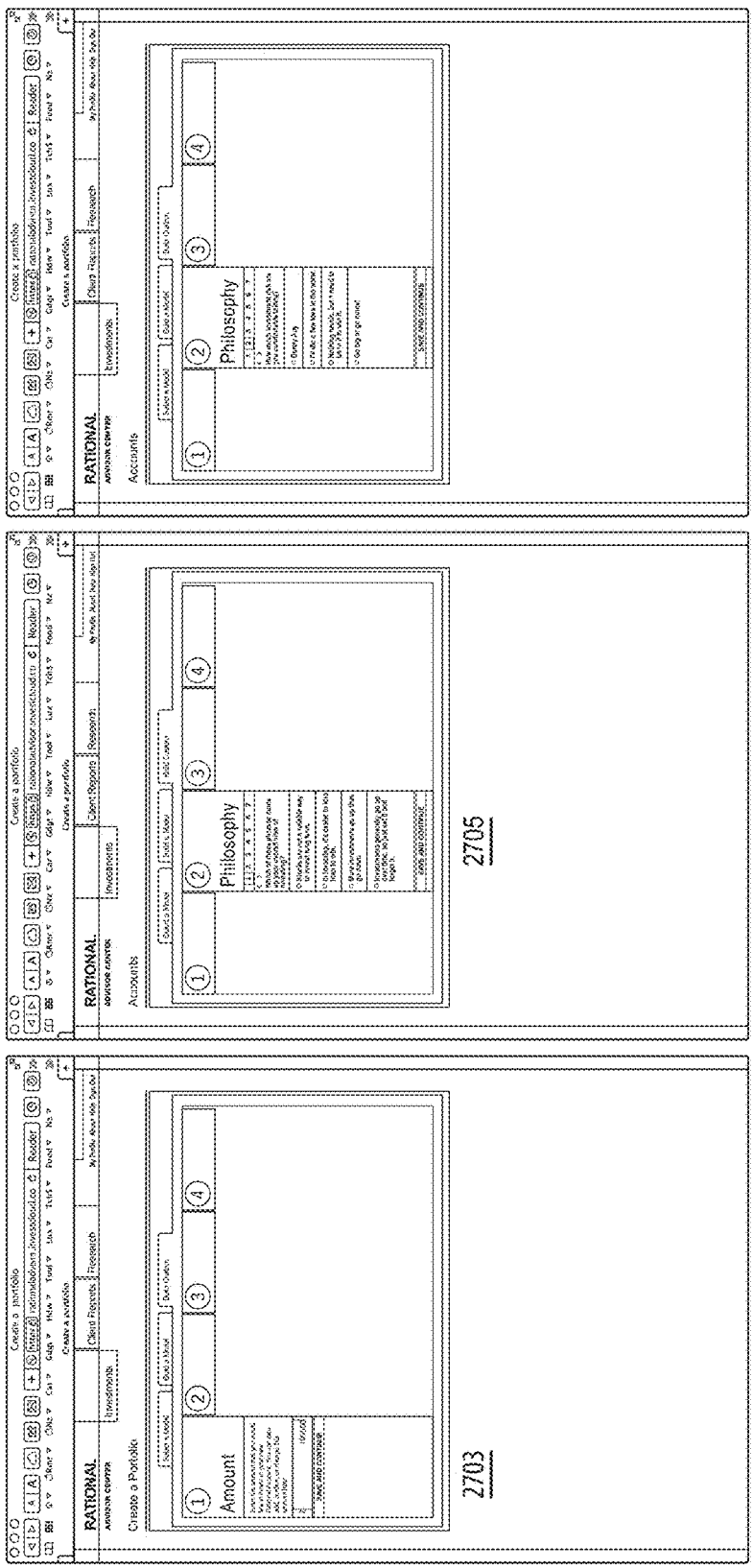
Fig. 27: MAMTP—UI Custom Investments (e.g., amount, philosophy)

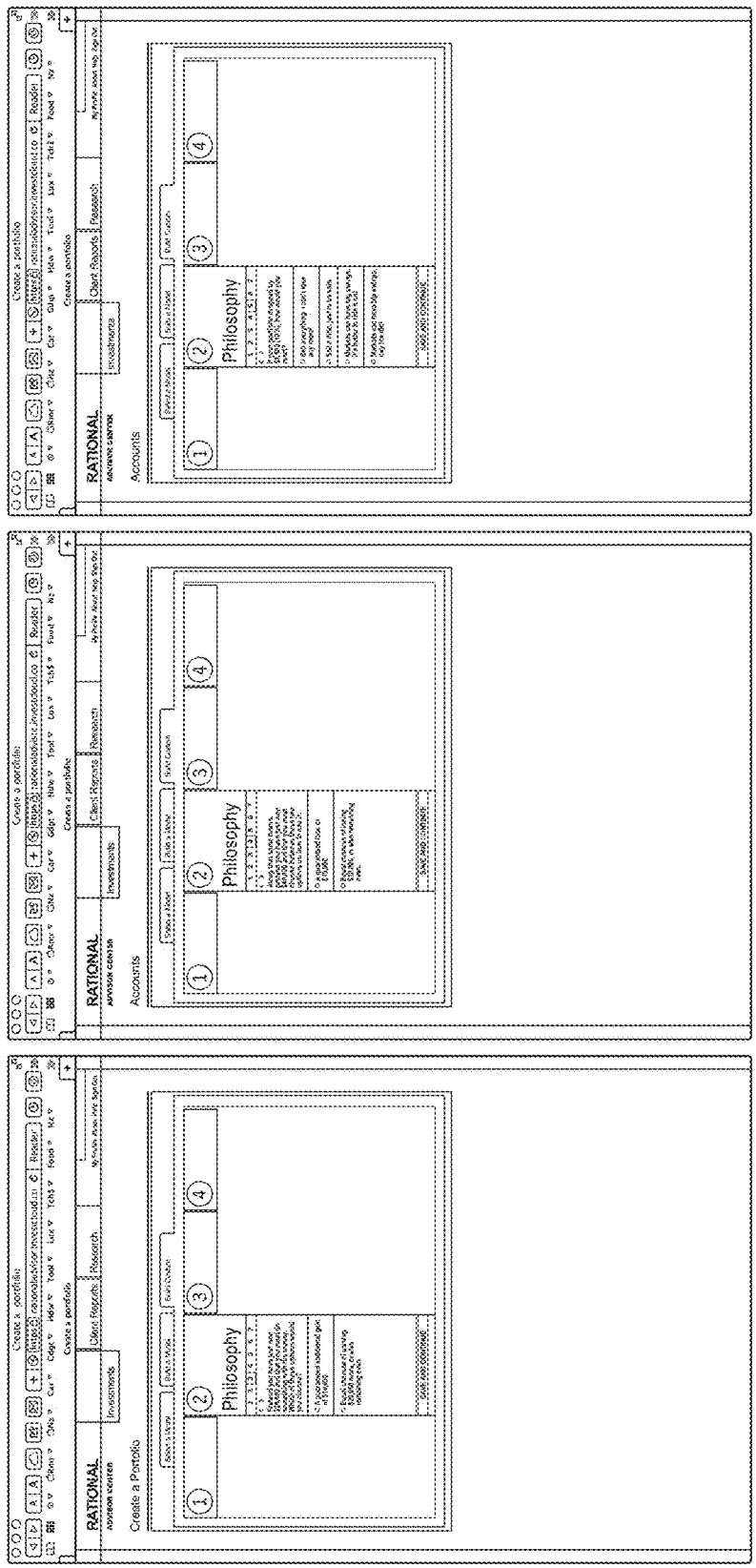
Fig. 28: MAMTP—UI Custom Investments (e.g., philosophy)

Fig. 29: MAMTP—UI Custom Investments (e.g., philosophy)

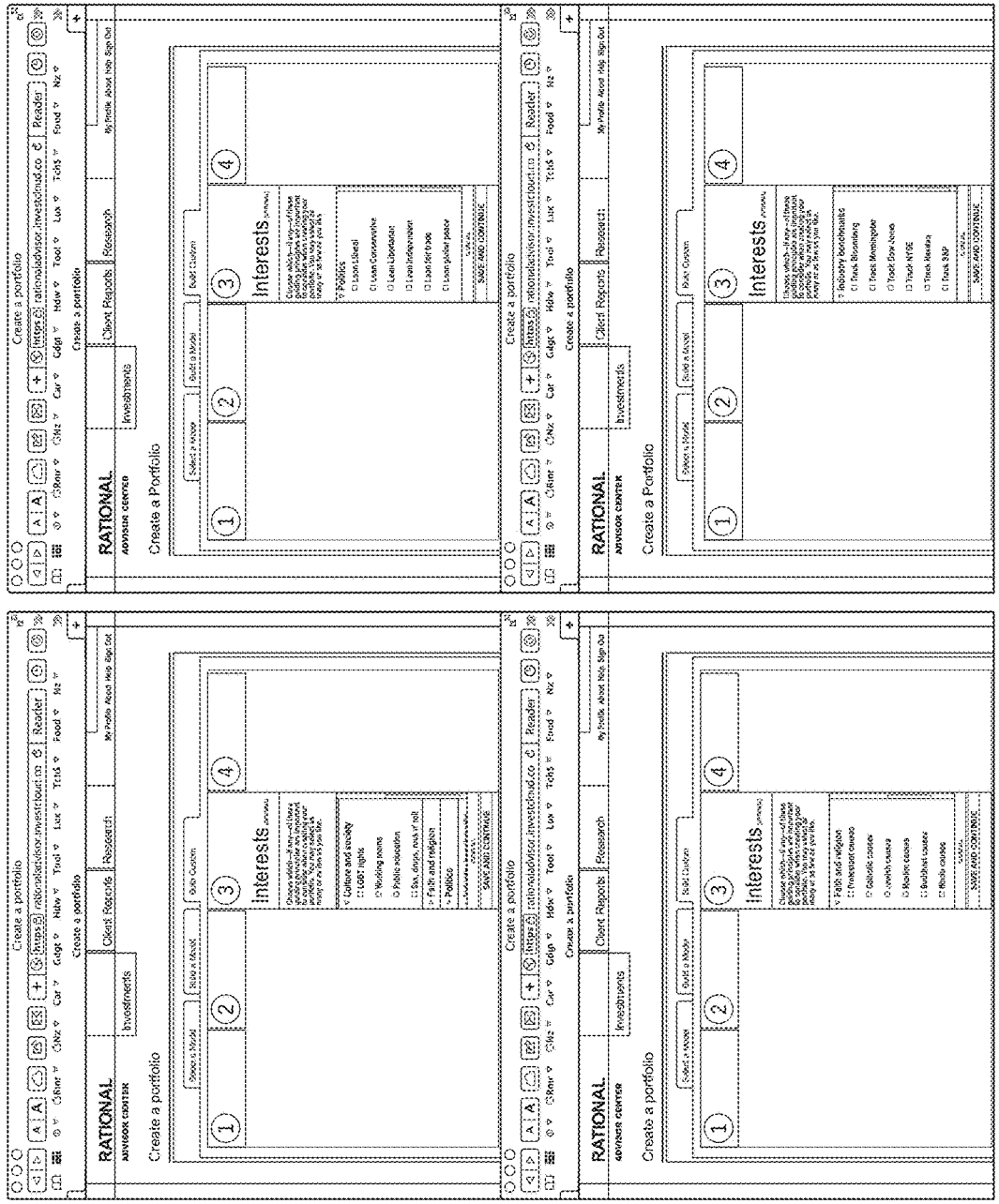
Fig. 30: MAMTP—UI Custom Investments (e.g., interests)

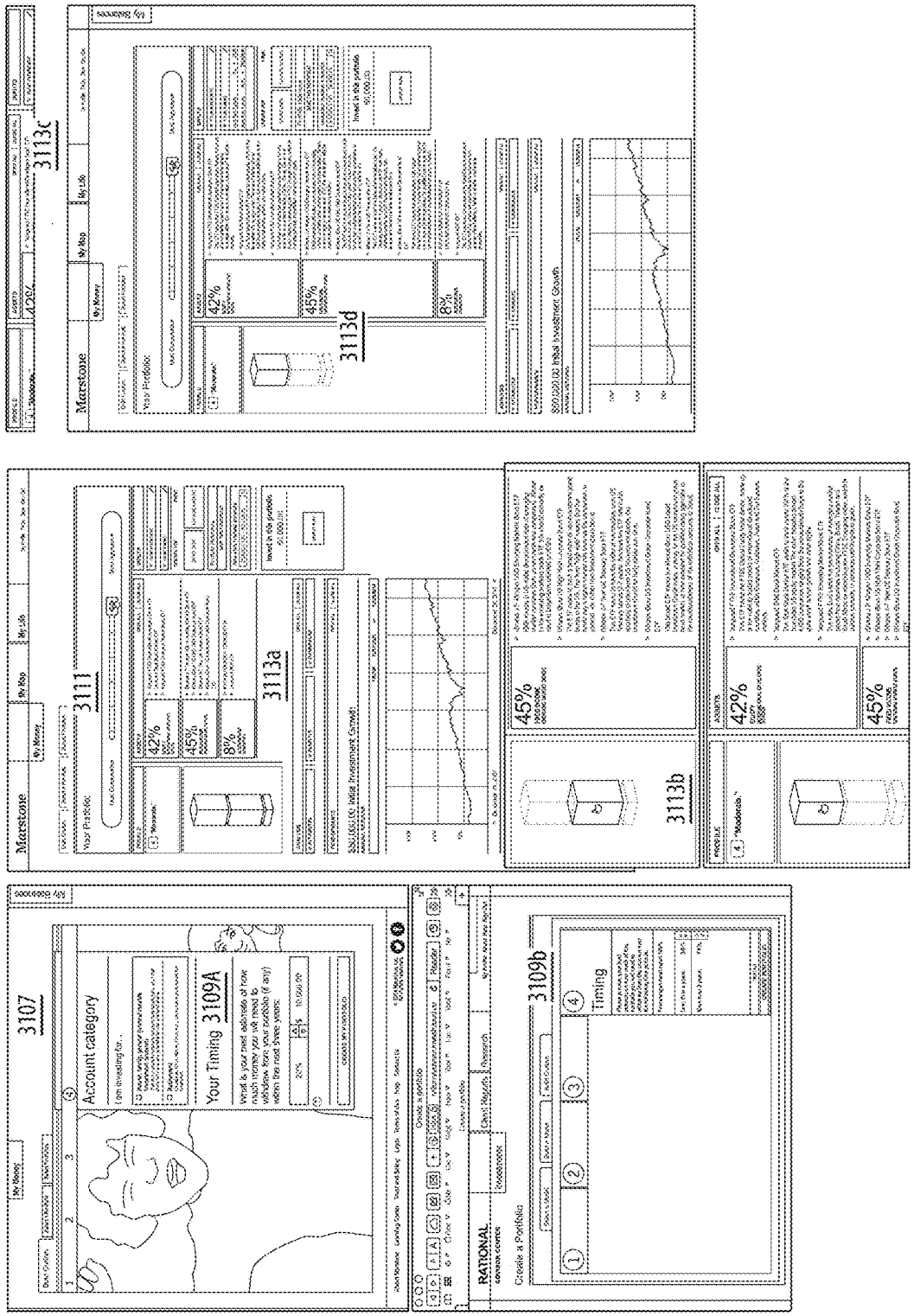
Fig. 31: MAMTP—UI Category, Timing, Portfolio Detail

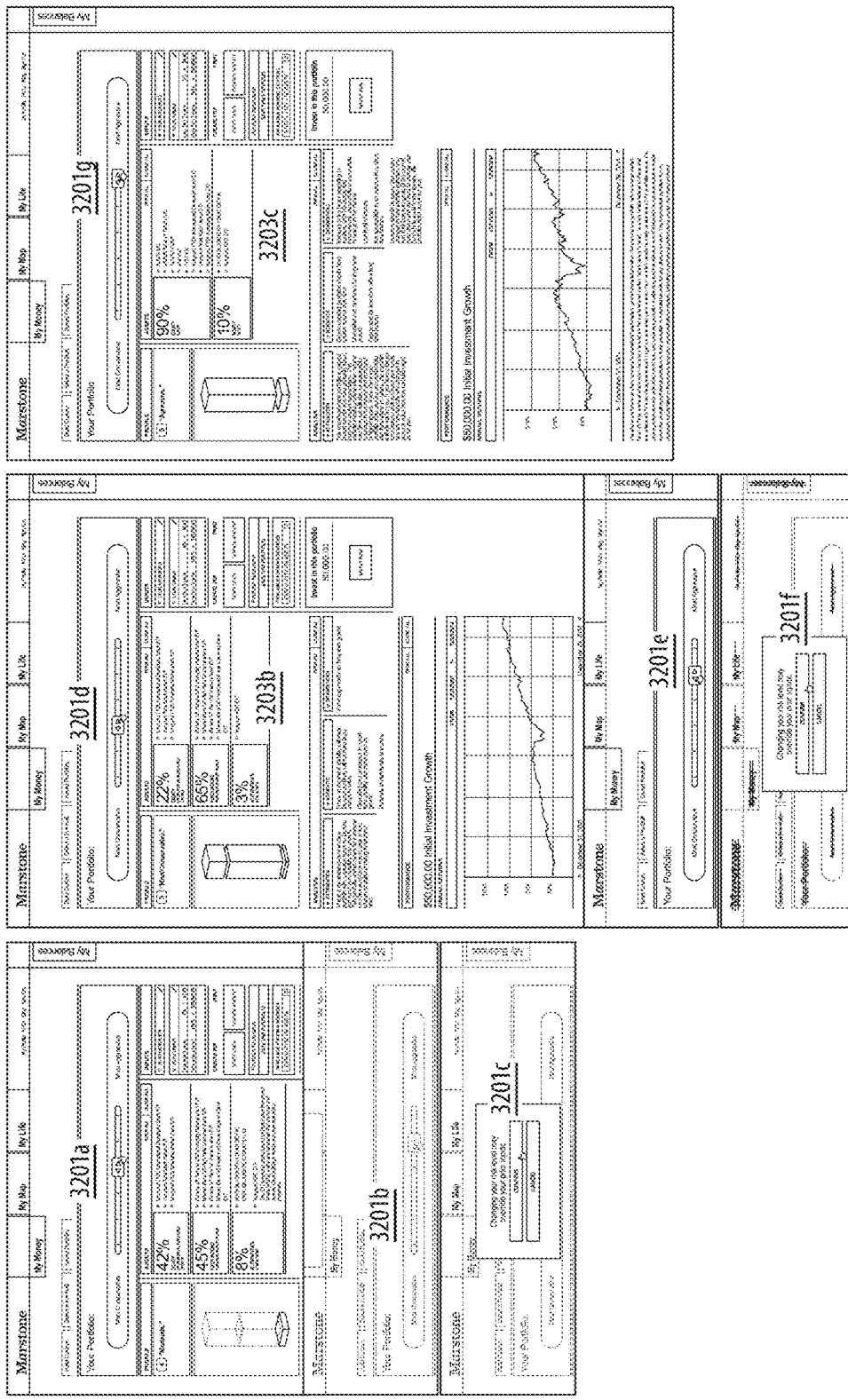
Fig. 32: MAMTP—UI Slicer Re Allocator

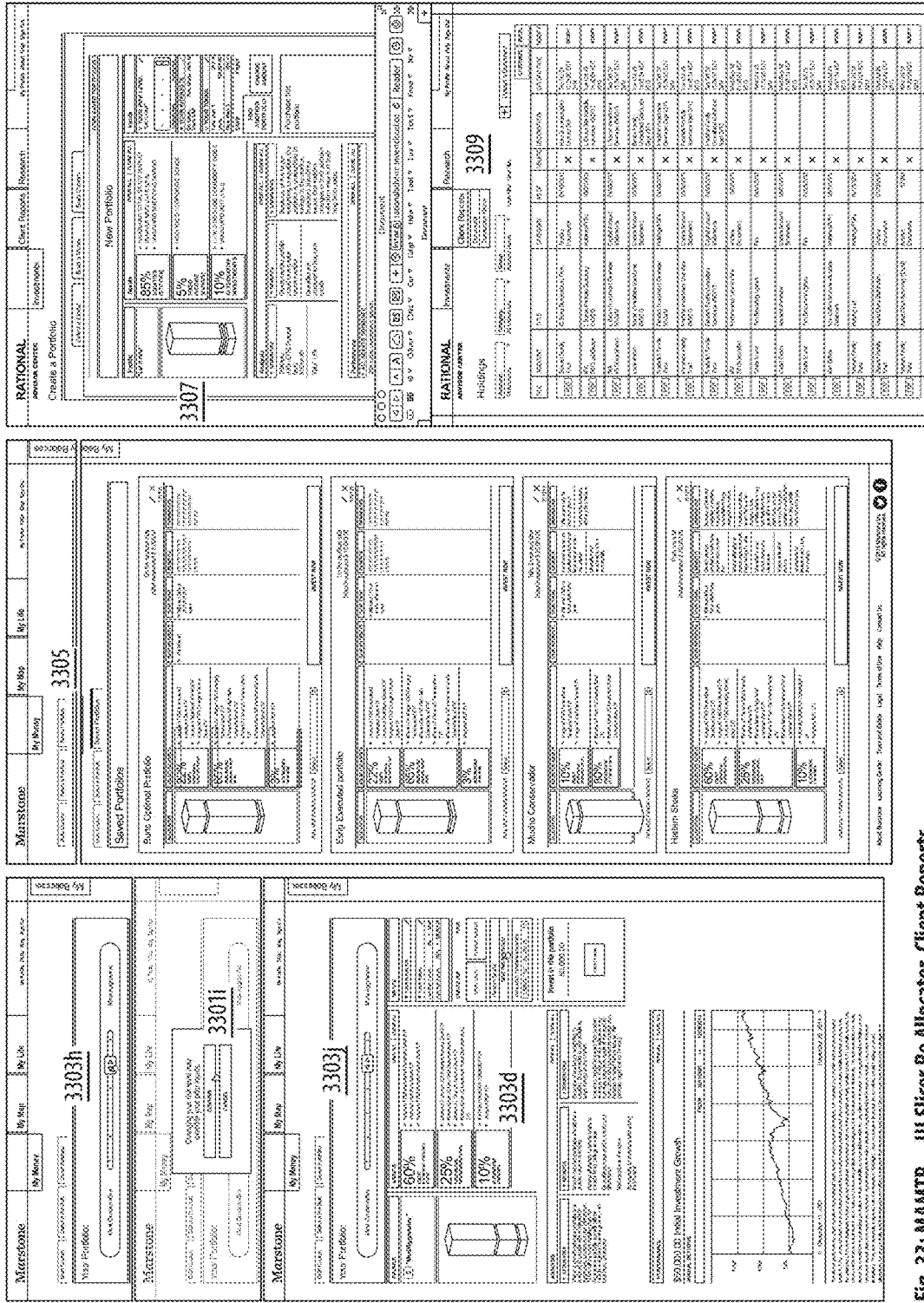
Fig. 33: MAMTP—UI Slicer Re Allocator, Client Reports

Fig. 34: MAMTP—UI Advisor, Client Reports, Research

Fig. 35: MAMTP—UI Alerts, Summary, Vacation, Buy & Sell

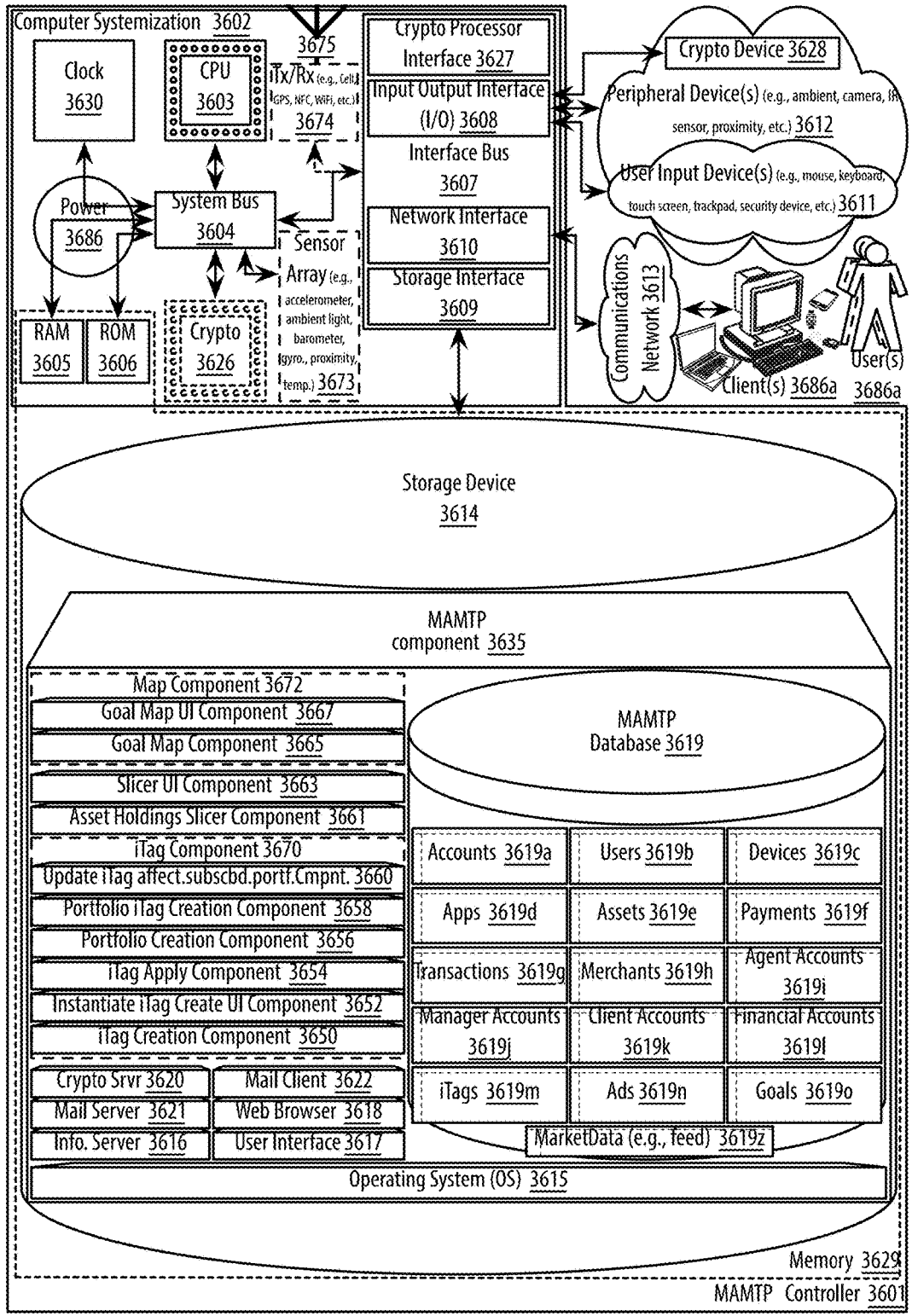
Fig.36: MAMTP—Controller

Figure 37A

Page 1 of 4

Figure 37B

| Cell | Result | Formula |
|---|---|---|
| F70 | Conservative | =H7 |
| F71 | Mod/ Conservative | =I7 |
| F72 | Moderate | =J7 |
| F73 | Mod/ Aggressive | =K7 |
| F74 | Aggressive | =L7 |
| H64 | -4 | =SUMPRODUCT($F$48:$F$51,H48:H51)+SUMPRODUCT($F$42:$F$45,H42:H45)+S |
| H65 | Conservative | =INDEX($F$70:$F$74,MATCH(H64,$H$70:$H$74,1)) |
| I64 | 5.5 | =SUMPRODUCT($F$48:$F$51,I48:I51)+SUMPRODUCT($F$42:$F$45,I42:I45)+SUM |
| I65 | Mod/ Conservative | =INDEX($F$70:$F$74,MATCH(I64,$H$70:$H$74,1)) |
| J64 | 13.5 | =SUMPRODUCT($F$48:$F$51,J48:J51)+SUMPRODUCT($F$42:$F$45,J42:J45)+SU |
| J65 | Moderate | =INDEX($F$70:$F$74,MATCH(J64,$H$70:$H$74,1)) |
| K64 | 19 | =SUMPRODUCT($F$48:$F$51,K48:K51)+SUMPRODUCT($F$42:$F$45,K42:K45)+S |
| K65 | Mod/ Aggressive | =INDEX($F$70:$F$74,MATCH(K64,$H$70:$H$74,1)) |
| L64 | 26.5 | =SUMPRODUCT($F$48:$F$51,L48:L51)+SUMPRODUCT($F$42:$F$45,L42:L45)+SU |
| L65 | Aggressive | =INDEX($F$70:$F$74,MATCH(L64,$H$70:$H$74,1)) |
| N64 | 22 | =SUMPRODUCT($F$48:$F$51,N48:N51)+SUMPRODUCT($F$42:$F$45,N42:N45)+S |
| N65 | Mod/ Aggressive | =INDEX($F$70:$F$74,MATCH(N64,$H$70:$H$74,1)) |
| O64 | 11 | =SUMPRODUCT($F$48:$F$51,O48:O51)+SUMPRODUCT($F$42:$F$45,O42:O45)+S |
| O65 | Moderate | =INDEX($F$70:$F$74,MATCH(O64,$H$70:$H$74,1)) |
| P64 | 15 | =SUMPRODUCT($F$48:$F$51,P48:P51)+SUMPRODUCT($F$42:$F$45,P42:P45)+S |
| P65 | Moderate | =INDEX($F$70:$F$74,MATCH(P64,$H$70:$H$74,1)) |

RATIONAL

Portfolio Allocations

Figure 38A

| | Ticker | Fees | Yield | Portfolio 1<br>Cash Mgmt<br>Put it under the mattress | Portfolio 2<br>Conservative<br>Better safe than sorry | Portfolio 3<br>Mod/Cons<br>Let's take it slow | Portfolio 4<br>Moderate<br>Middle of the road | Portfolio 5<br>Mod/Agg<br>Push me a bit | Portfolio 6<br>Aggressive<br>Let it ride! |
|---|---|---|---|---|---|---|---|---|---|
| Total Allocation | | | | 100% | 100% | 100% | 100% | 100% | 100% |
| Global Equities | | | | 0% | 10% | 22% | 42% | 60% | 90% |
| US Equity | VTI | 0.05% | 1.72% | 0% | 5% | 12% | 22% | 30% | 45% |
| Int'l Developed | VEA | 0.10% | 2.59% | 0% | 5% | 5% | 10% | 15% | 30% |
| Emerging Market | VWO | 0.15% | 2.87% | 0% | 0% | 5% | 10% | 15% | 15% |
| Fixed Income | | | | 0% | 80% | 65% | 45% | 25% | 0% |
| Corporates | LQD | 0.15% | 3.72% | 0% | 50% | 40% | 25% | 15% | 0% |
| Treasury (3-7 yr) | IEI | 0.15% | 0.80% | 0% | 30% | 15% | 10% | 0% | 0% |
| Other | | | | | | | | | |
| High Yield | HYG | 0.50% | 5.95% | 0% | 0% | 5% | 5% | 5% | 0% |
| Emerging Market | EMB | 0.60% | 4.66% | 0% | 0% | 5% | 5% | 5% | 0% |
| Cash-like | MMA | 0.00% | 0.02% | 100% | 10% | 10% | 5% | 5% | 0% |
| Alternatives | | | | 0% | 0% | 3% | 8% | 10% | 10% |
| Real Estate (REIT) | VNQ | 0.10% | 2.77% | 0% | 0% | 3% | 5% | 5% | 5% |
| Commodities | DJP | 0.75% | 0.00% | 0% | 0% | 0% | 3% | 5% | 5% |
| Total | | | | 100% | 100% | 100% | 100% | 100% | 100% |
| *Check* | | | | 0% | 0% | 0% | 0% | 0% | 0% |
| | | Fees | | 0.00% | 0.13% | 0.16% | 0.17% | 0.17% | 0.12% |
| | | Yield | | 0.02% | 2.32% | 2.70% | 2.60% | 2.56% | 2.12% |

Idea is to let people invest up to 20% in their interests - which allows them to have sizable positions but not so big that it would be detrimental to their long-term goals
If interest selection leads to greater than 20% allocation, decrease pro-rata 20%

Current Equity Weightings

| | % of US Equity | Mattress (1) | Better Safe (2) | Slow (3) | Middle (4) | Push (5) | Ride! (6) |
|---|---|---|---|---|---|---|---|
| VTI (US Eq) | | 0% | 5% | 12% | 22% | 30% | 45% |
| VEA (Int'l Eq) | | 0% | 5% | 5% | 10% | 15% | 30% |
| VWO (EM Eq) | | 0% | 0% | 5% | 10% | 15% | 15% |
| Total | | 0% | 10% | 22% | 42% | 60% | 90% |

Suggested Weightings for Belief Selections

| Interest | Name | Ticker | Equity | Mattress (1) | Better Safe (2) | Slow (3) | Middle (4) | Push (5) | Ride! (6) |
|---|---|---|---|---|---|---|---|---|---|
| Technology | Technology Select Sector | XLK | 11% | 0.0% | 0.6% | 1.3% | 2.4% | 3.3% | 5.0% |
| Gold Bug | COMEX Gold Trust | IAU | 9% | 0.0% | 0.5% | 1.1% | 2.0% | 2.7% | 4.1% |
| Farmer Joe | Agribusiness ETF | MOO | 9% | 0.0% | 0.5% | 1.1% | 2.0% | 2.7% | 4.1% |
| Internet | DJ Internet Index Fund Fundamentals | FDN | 9% | 0.0% | 0.5% | 1.1% | 2.0% | 2.7% | 4.1% |
| Bio Tech | S&P Biotech ETF | XBI | 9% | 0.0% | 0.5% | 1.1% | 2.0% | 2.7% | 4.1% |
| Clean Water | Water Resource Portfolio | PHO | 9% | 0.0% | 0.5% | 1.1% | 2.0% | 2.7% | 4.1% |
| Social Responsible Investing | KLD 400 Social Index | DSI | 33% | 0.0% | 1.7% | 4.0% | 7.3% | 9.9% | 14.9% |
| Alternative Energy | Cleantech Portfolio | QCLN | 9% | 0.0% | 0.5% | 1.1% | 2.0% | 2.7% | 4.1% |

Example Selection (1)

| | | | Mattress (1) | Better Safe (2) | Slow (3) | Middle (4) | Push (5) | Ride! (6) |
|---|---|---|---|---|---|---|---|---|
| Social Responsible Investing | KLD 400 Social Index | DSI | 0.0% | 1.7% | 4.0% | 7.3% | 9.9% | 14.9% |
| Alternative Energy | Cleantech Portfolio | QCLN | 0.0% | 0.5% | 1.1% | 2.0% | 2.7% | 4.1% |
| | | | 0.0% | 2.1% | 5.0% | 9.2% | 12.6% | 18.9% |
| | | New VTI | 0.0% | 2.9% | 7.0% | 12.8% | 17.4% | 26.1% |
| | | New VEA | 0.0% | 5.0% | 5.0% | 10.0% | 15.0% | 30.0% |
| | | New VWO | 0.0% | 0.0% | 5.0% | 10.0% | 15.0% | 15.0% |
| | | Total | 0.0% | 10.0% | 22.0% | 42.0% | 60.0% | 90.0% |

Example Selection (2)

| | | | Mattress (1) | Better Safe (2) | Slow (3) | Middle (4) | Push (5) | Ride! (6) |
|---|---|---|---|---|---|---|---|---|
| Internet | DJ Internet Index Fund Fundamentals | FDN | 0.0% | 0.5% | 1.1% | 2.0% | 2.7% | 4.1% |
| Bio Tech | S&P Biotech ETF | XBI | 0.0% | 0.5% | 1.1% | 2.0% | 2.7% | 4.1% |
| Clean Water | Water Resource Portfolio | PHO | 0.0% | 0.5% | 1.1% | 2.0% | 2.7% | 4.1% |
| Technology | Technology Select Sector | XLK | 0.0% | 0.6% | 1.3% | 2.4% | 3.3% | 5.0% |
| | | | 0.0% | 1.9% | 4.6% | 8.4% | 11.4% | 17.1% |
| | | New VTI | 0.0% | 4.1% | 7.4% | 13.6% | 18.6% | 27.9% |
| | | New VEA | 0.0% | 4.1% | 5.0% | 10.0% | 15.0% | 30.0% |
| | | New VWO | 0.0% | 0.0% | 5.0% | 10.0% | 15.0% | 15.0% |
| | | Total | 0.0% | 10.0% | 22.0% | 42.0% | 60.0% | 90.0% |

Example Selection (3)

| | | | Mattress (1) | Better Safe (2) | Slow (3) | Middle (4) | Push (5) | Ride! (6) |
|---|---|---|---|---|---|---|---|---|
| Social Responsible Investing | KLD 400 Social Index | DSI | 0.0% | 1.7% | 4.0% | 7.3% | 9.9% | 14.9% |
| Alternative Energy | Cleantech Portfolio | QCLN | 0.0% | 0.5% | 1.1% | 2.0% | 2.7% | 4.1% |
| Clean Water | Water Resource Portfolio | PHO | 0.0% | 0.5% | 1.1% | 2.0% | 2.7% | 4.1% |
| | | | 0.0% | 2.6% | 6.1% | 11.2% | 15.3% | 23.0% |
| | | New VTI | 0.0% | 3.7% | 5.9% | 10.8% | 14.7% | 12.9% | 65% |
| | | New VEA | 0.0% | 3.7% | 5.0% | 10.0% | 15.0% | 3.5% | 18% |
| | | New VWO | 0.0% | 0.0% | 5.0% | 10.0% | 15.0% | 3.5% | 18% |
| | | Total | 0.0% | 10.0% | 22.0% | 42.0% | 60.0% | 20.0% |
| | | | | | | | | 25.0% |
| | | | | | | | | 30.0% |
| | | | | | | | | 15.0% |
| | | | | | | | | 90.0% |

| Cell | Result | Formula |
|---|---|---|
| H12 | 0% | =SUM(H13:H15) |
| H17 | 0% | =SUM(H18:H23) |
| H27 | 0% | =SUM(H28:H29) |
| H31 | 100% | =H27+H25+H17+H12 |
| H32 | 0% | =H31-H10 |
| H34 | 0.00% | =H29*$E$29+H28*$E$28+H23*$E$23+H22*$E$22+H20*$E$20+H19*$E$19+H18*$E |
| H35 | 0.02% | =H29*$F$29+H28*$F$28+H23*$F$23+H22*$F$22+H20*$F$20+H19*$F$19+H18*$F$ |
| J12 | 10% | =SUM(J13:J15) |
| J17 | 80% | =SUM(J18:J23) |
| J27 | 0% | =SUM(J28:J29) |
| J31 | 100% | =J27+J25+J17+J12 |
| J32 | 0% | =J31-J10 |
| J34 | 0.13% | =J29*$E$29+J28*$E$28+J23*$E$23+J22*$E$22+J20*$E$20+J19*$E$19+J18*$E$18 |
| J35 | 2.32% | =J29*$F$29+J28*$F$28+J23*$F$23+J22*$F$22+J20*$F$20+J19*$F$19+J18*$F$18 |
| L12 | 22% | =SUM(L13:L15) |
| L17 | 65% | =SUM(L18:L23) |
| L27 | 3% | =SUM(L28:L29) |
| L31 | 100% | =L27+L25+L17+L12 |
| L32 | 0% | =L31-L10 |
| L34 | 0.16% | =L29*$E$29+L28*$E$28+L23*$E$23+L22*$E$22+L20*$E$20+L19*$E$19+L18*$E$1 |
| L35 | 2.70% | =L29*$F$29+L28*$F$28+L23*$F$23+L22*$F$22+L20*$F$20+L19*$F$19+L18*$F$18 |
| N12 | 42% | =SUM(N13:N15) |
| N17 | 45% | =SUM(N18:N23) |

Figure 38E

| Cell | Result | Formula |
|---|---|---|
| N27 | 8% | =SUM(N28:N29) |
| N31 | 100% | =N27+N25+N17+N12 |
| N32 | 0% | =N31-N10 |
| N34 | 0.17% | =N29*$E$29+N28*$E$28+N23*$E$23+N22*$E$22+N20*$E$20+N19*$E$19+N18*$E$ |
| N35 | 2.60% | =N29*$F$29+N28*$F$28+N23*$F$23+N22*$F$22+N20*$F$20+N19*$F$19+N18*$F$ |
| P12 | 60% | =SUM(P13:P15) |
| P17 | 25% | =SUM(P18:P23) |
| P27 | 10% | =SUM(P28:P29) |
| P31 | 100% | =P27+P25+P17+P12 |
| P32 | 0% | =P31-P10 |
| P34 | 0.17% | =P29*$E$29+P28*$E$28+P23*$E$23+P22*$E$22+P20*$E$20+P19*$E$19+P18*$E$ |
| P35 | 2.56% | =P29*$F$29+P28*$F$28+P23*$F$23+P22*$F$22+P20*$F$20+P19*$F$19+P18*$F$ |
| R12 | 90% | =SUM(R13:R15) |
| R17 | 0% | =SUM(R18:R23) |
| R27 | 10% | =SUM(R28:R29) |
| R31 | 100% | =R27+R25+R17+R12 |
| R32 | 0% | =R31-R10 |
| R34 | 0.12% | =R29*$E$29+R28*$E$28+R23*$E$23+R22*$E$22+R20*$E$20+R19*$E$19+R18*$E$ |
| R35 | 2.12% | =R29*$F$29+R28*$F$28+R23*$F$23+R22*$F$22+R20*$F$20+R19*$F$19+R18*$F$ |
| | | |
| B31 | Social Respons | =B25 |
| B32 | Alternative Ene | =B27 |
| B42 | Internet | =B19 |
| B43 | Bio Tech | =B21 |

| Cell | Result | Formula |
|---|---|---|
| B44 | Clean Water | =B23 |
| B45 | Technology | =B13 |
| B54 | Social Respons | =B25 |
| B55 | Alternative Ene | =B27 |
| B56 | Clean Water | =B23 |
| C31 | KLD 400 Socia | =C25 |
| C32 | Cleantech Port | =C27 |
| C42 | DJ Internet Indt | =C19 |
| C43 | S&P Biotech E | =C21 |
| C44 | Water Resourc | =C23 |
| C45 | Techonology S | =C13 |
| C54 | KLD 400 Socia | =C25 |
| C55 | Cleantech Port | =C27 |
| C56 | Water Resourc | =C23 |
| E31 | DSI | =D25 |
| E32 | QCLN | =D27 |
| E42 | FDN | =D19 |
| E43 | XBI | =D21 |
| E44 | PHO | =D23 |
| E45 | XLK | =D13 |
| E54 | DSI | =D25 |
| E55 | QCLN | =D27 |
| E56 | PHO | =D23 |
| F6 | 0% | =Base Allocations::Table 1::I13 |

Figure 38F

| Cell | Result | Formula |
|---|---|---|
| F7 | 0% | =Base Allocations::Table 1::I14 |
| F8 | 0% | =Base Allocations::Table 1::I15 |
| F9 | 0% | =SUM(F6:F8) |
| F12 | Mattress (1) | =F5 |
| F13 | 0.0% | =$E13*F$6 |
| F15 | 0.0% | =$E15*F$6 |
| F17 | 0.0% | =$E17*F$6 |
| F19 | 0.0% | =$E19*F$6 |
| F21 | 0.0% | =$E21*F$6 |
| F23 | 0.0% | =$E23*F$6 |
| F25 | 0.0% | =$E25*F$6 |
| F27 | 0.0% | =$E27*F$6 |
| F30 | Mattress (1) | =F5 |
| F31 | 0.0% | =F25 |
| F32 | 0.0% | =F27 |
| F33 | 0.0% | =SUM(F31:F32) |
| F35 | 0.0% | =F6-F33 |
| F36 | 0.0% | =F7 |
| F37 | 0.0% | =F8 |
| F38 | 0.0% | =SUM(F35:F37)+F33 |
| F41 | Mattress (1) | =F5 |
| F42 | 0.0% | =F19 |
| F43 | 0.0% | =F21 |
| F44 | 0.0% | =F23 |

| Cell | Result | Formula |
|---|---|---|
| F45 | 0.0% | =F13 |
| F46 | 0.0% | =SUM(F42:F45) |
| F48 | 0.0% | =F6-F46/2 |
| F49 | 0.0% | =F7-F46/2 |
| F50 | 0.0% | =F8 |
| F51 | 0.0% | =SUM(F48:F50)+F46 |
| F53 | Mattress (1) | =F5 |
| F54 | 0.0% | =F25 |
| F55 | 0.0% | =F27 |
| F56 | 0.0% | =F23 |
| F57 | 0.0% | =SUM(F54:F56) |
| F59 | 0.0% | =F6-F57/2 |
| F60 | 0.0% | =F7-F57/2 |
| F61 | 0.0% | =F8 |
| F62 | 0.0% | =SUM(F59:F61)+F57 |
| G6 | 5% | =Base Allocations::Table 1::J13 |
| G7 | 5% | =Base Allocations::Table 1::J14 |
| G8 | 0% | =Base Allocations::Table 1::J15 |
| G9 | 10% | =SUM(G6:G8) |
| G12 | Better Safe (2) | =G5 |
| G13 | 0.6% | =$E13*G$6 |
| G15 | 0.5% | =$E15*G$6 |
| G17 | 0.5% | =$E17*G$6 |
| G19 | 0.5% | =$E19*G$6 |

| Cell | Result | Formula |
|---|---|---|
| G21 | 0.5% | =$E$21*G$6 |
| G23 | 0.5% | =$E23*G$6 |
| G25 | 1.7% | =$E25*G$6 |
| G27 | 0.5% | =$E27*G$6 |
| G30 | Better Safe (2) | =G5 |
| G31 | 1.7% | =G25 |
| G32 | 0.5% | =G27 |
| G33 | 2.1% | =SUM(G31:G32) |
| G35 | 2.9% | =G6-G33 |
| G36 | 5.0% | =G7 |
| G37 | 0.0% | =G8 |
| G38 | 10.0% | =SUM(G35:G37)+G33 |
| G41 | Better Safe (2) | =G5 |
| G42 | 0.5% | =G19 |
| G43 | 0.5% | =G21 |
| G44 | 0.5% | =G23 |
| G45 | 0.6% | =G13 |
| G46 | 1.9% | =SUM(G42:G45) |
| G48 | 4.1% | =G6-G46/2 |
| G49 | 4.1% | =G7-G46/2 |
| G50 | 0.0% | =G8 |
| G51 | 10.0% | =SUM(G48:G50)+G46 |
| G53 | Better Safe (2) | =G5 |
| G54 | 1.7% | =G25 |

| Cell | Result | Formula |
|---|---|---|
| G55 | 0.5% | =G27 |
| G56 | 0.5% | =G23 |
| G57 | 2.6% | =SUM(G54:G56) |
| G59 | 3.7% | =G6-G57/2 |
| G60 | 3.7% | =G7-G57/2 |
| G61 | 0.0% | =G8 |
| G62 | 10.0% | =SUM(G59:G61)+G57 |
| H6 | 12% | =Base Allocations::Table 1::L13 |
| H7 | 5% | =Base Allocations::Table 1::L14 |
| H8 | 5% | =Base Allocations::Table 1::L15 |
| H9 | 22% | =SUM(H6:H8) |
| H12 | Slow (3) | =H5 |
| H13 | 1.3% | =$E$13*H$6 |
| H15 | 1.1% | =$E$15*H$6 |
| H17 | 1.1% | =$E$17*H$6 |
| H19 | 1.1% | =$E$19*H$6 |
| H21 | 1.1% | =$E$21*H$6 |
| H23 | 1.1% | =$E$23*H$6 |
| H25 | 4.0% | =$E$25*H$6 |
| H27 | 1.1% | =$E$27*H$6 |
| H30 | Slow (3) | =H5 |
| H31 | 4.0% | =H25 |
| H32 | 1.1% | =H27 |
| H33 | 5.0% | =SUM(H31:H32) |

| Cell | Result | Formula |
|---|---|---|
| H35 | 7.0% | =H6-H33 |
| H36 | 5.0% | =H7 |
| H37 | 5.0% | =H8 |
| H38 | 22.0% | =SUM(H35:H37)+H33 |
| H41 | Slow (3) | =H5 |
| H42 | 1.1% | =H19 |
| H43 | 1.1% | =H21 |
| H44 | 1.1% | =H23 |
| H45 | 1.3% | =H13 |
| H46 | 4.6% | =SUM(H42:H45) |
| H48 | 7.4% | =H6-H46 |
| H49 | 5.0% | =H7 |
| H50 | 5.0% | =H8 |
| H51 | 22.0% | =SUM(H48:H50)+H46 |
| H53 | Slow (3) | =H5 |
| H54 | 4.0% | =H25 |
| H55 | 1.1% | =H27 |
| H56 | 1.1% | =H23 |
| H57 | 6.1% | =SUM(H54:H56) |
| H59 | 5.9% | =H6-H57 |
| H60 | 5.0% | =H7 |
| H61 | 5.0% | =H8 |
| H62 | 22.0% | =SUM(H59:H61)+H57 |
| I6 | 22% | =Base Allocations::Table 1::N13 |

Figure 38K

| Cell | Result | Formula |
|---|---|---|
| I7 | 10% | =Base Allocations::Table 1::N14 |
| I8 | 10% | =Base Allocations::Table 1::N15 |
| I9 | 42% | =SUM(I6:I8) |
| I12 | Middle (4) | =I5 |
| I13 | 2.4% | =$E13*I$6 |
| I15 | 2.0% | =$E15*I$6 |
| I17 | 2.0% | =$E17*I$6 |
| I19 | 2.0% | =$E19*I$6 |
| I21 | 2.0% | =$E21*I$6 |
| I23 | 2.0% | =$E23*I$6 |
| I25 | 7.3% | =$E25*I$6 |
| I27 | 2.0% | =$E27*I$6 |
| I30 | Middle (4) | =I5 |
| I31 | 7.3% | =I25 |
| I32 | 2.0% | =I27 |
| I33 | 9.2% | =SUM(I31:I32) |
| I35 | 12.8% | =I6-I33 |
| I36 | 10.0% | =I7 |
| I37 | 10.0% | =I8 |
| I38 | 42.0% | =SUM(I35:I37)+I33 |
| I41 | Middle (4) | =I5 |
| I42 | 2.0% | =I19 |
| I43 | 2.0% | =I21 |
| I44 | 2.0% | =I23 |

| Cell | Result | Formula |
|---|---|---|
| I45 | 2.4% | =I13 |
| I46 | 8.4% | =SUM(I42:I45) |
| I48 | 13.6% | =I6-I46 |
| I49 | 10.0% | =I7 |
| I50 | 10.0% | =I8 |
| I51 | 42.0% | =SUM(I48:I50)+I46 |
| I53 | Middle (4) | =I5 |
| I54 | 7.3% | =I25 |
| I55 | 2.0% | =I27 |
| I56 | 2.0% | =I23 |
| I57 | 11.2% | =SUM(I54:I56) |
| I59 | 10.8% | =I6-I57 |
| I60 | 10.0% | =I7 |
| I61 | 10.0% | =I8 |
| I62 | 42.0% | =SUM(I59:I61)+I57 |
| J6 | 30% | =Base Allocations::Table 1::P13 |
| J7 | 15% | =Base Allocations::Table 1::P14 |
| J8 | 15% | =Base Allocations::Table 1::P15 |
| J9 | 60% | =SUM(J6:J8) |
| J12 | Push (5) | =J5 |
| J13 | 3.3% | =$E13*J$6 |
| J15 | 2.7% | =$E15*J$6 |
| J17 | 2.7% | =$E17*J$6 |
| J19 | 2.7% | =$E19*J$6 |

Figure 38N

| Cell | Result | Formula |
|---|---|---|
| J21 | 2.7% | =$E$21*J$6 |
| J23 | 2.7% | =$E$23*J$6 |
| J25 | 9.9% | =$E$25*J$6 |
| J27 | 2.7% | =$E$27*J$6 |
| J30 | Push (5) | =J5 |
| J31 | 9.9% | =J25 |
| J32 | 2.7% | =J27 |
| J33 | 12.6% | =SUM(J31:J32) |
| J35 | 17.4% | =J6-J33 |
| J36 | 15.0% | =J7 |
| J37 | 15.0% | =J8 |
| J38 | 60.0% | =SUM(J35:J37)+J33 |
| J41 | Push (5) | =J5 |
| J42 | 2.7% | =J19 |
| J43 | 2.7% | =J21 |
| J44 | 2.7% | =J23 |
| J45 | 3.3% | =J13 |
| J46 | 11.4% | =SUM(J42:J45) |
| J48 | 18.6% | =J6-J46 |
| J49 | 15.0% | =J7 |
| J50 | 15.0% | =J8 |
| J51 | 60.0% | =SUM(J48:J50)+J46 |
| J53 | Push (5) | =J5 |
| J54 | 9.9% | =J25 |

Figure 38O

| Cell | Result | Formula |
|---|---|---|
| J55 | 2.7% | =J27 |
| J56 | 2.7% | =J23 |
| J57 | 15.3% | =SUM(J54:J56) |
| J59 | 14.7% | =J6-J57 |
| J60 | 15.0% | =J7 |
| J61 | 15.0% | =J8 |
| J62 | 60.0% | =SUM(J59:J61)+J57 |
| K6 | 45% | =Base Allocations::Table 1::R13 |
| K7 | 30% | =Base Allocations::Table 1::R14 |
| K8 | 15% | =Base Allocations::Table 1::R15 |
| K9 | 90% | =SUM(K6:K8) |
| K12 | Ride! (6) | =K5 |
| K13 | 5.0% | =$E$13*K$6 |
| K15 | 4.1% | =$E$15*K$6 |
| K17 | 4.1% | =$E$17*K$6 |
| K19 | 4.1% | =$E$19*K$6 |
| K21 | 4.1% | =$E$21*K$6 |
| K23 | 4.1% | =$E$23*K$6 |
| K25 | 14.9% | =$E$25*K$6 |
| K27 | 4.1% | =$E$27*K$6 |
| K30 | Ride! (6) | =K5 |
| K31 | 14.9% | =K25 |
| K32 | 4.1% | =K27 |
| K33 | 18.9% | =SUM(K31:K32) |

Figure 38P

| Cell | Result | Formula |
|---|---|---|
| K35 | 26.1% | =K6-K33 |
| K36 | 30.0% | =K7 |
| K37 | 15.0% | =K8 |
| K38 | 90.0% | =SUM(K35:K37)+K33 |
| K41 | Ride! (6) | =K5 |
| K42 | 4.1% | =K19 |
| K43 | 4.1% | =K21 |
| K44 | 4.1% | =K23 |
| K45 | 5.0% | =K13 |
| K46 | 17.1% | =SUM(K42:K45) |
| K48 | 27.9% | =K6-K46 |
| K49 | 30.0% | =K7 |
| K50 | 15.0% | =K8 |
| K51 | 90.0% | =SUM(K48:K50)+K46 |
| K53 | Ride! (6) | =K5 |
| K54 | 14.9% | =K25 |
| K55 | 4.1% | =K27 |
| K56 | 4.1% | =K23 |
| K57 | 23.0% | =SUM(K54:K56) |
| L54 | 65% | =K54/$K$57 |
| L55 | 18% | =K55/$K$57 |
| L56 | 18% | =K56/$K$57 |
| M54 | 12.9% | =L54*$D$3 |
| M55 | 3.5% | =L55*$D$3 |

Figure 38Q

| Cell | Result | Formula |
|---|---|---|
| M56 | 3.5% | =L56*$D$3 |
| M57 | 20.0% | =SUM(M54:M56) |
| M59 | 25.0% | =K6-M57 |
| M60 | 30.0% | =K7 |
| M61 | 15.0% | =K8 |
| M62 | 90.0% | =SUM(M59:M61)+M57 |

MULTIDIMENSIONAL ASSET MANAGEMENT TAG PIVOT APPARATUSES, METHODS AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

PRIORITY CLAIM

Applicant hereby claims benefit to priority under 35 USC § 119 as a non-provisional conversion of U.S. provisional patent application Ser. No. 62/008,625, filed Jun. 6, 2014, entitled "Multidimensional Asset Management Tag Pivot Apparatuses, Methods and Systems".

The entire contents of the aforementioned applications are herein expressly incorporated by reference.

FIELD

The present innovations generally address asset management information technology, and more particularly, include Multidimensional Asset Management Tag Pivot Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

People own all types of assets, some of which are secured instruments to underlying assets. People have used exchanges to facilitate trading and selling of such assets. Computer information systems, such as NAICO-NET, Trade*Plus and E*Trade allowed owners to trade securities assets electronically.

BRIEF DESCRIPTION OF THE DRAWINGS

Appendices and/or drawings illustrating various, non-limiting, example, innovative aspects of the Multidimensional Asset Management Tag Pivot Apparatuses, Methods and Systems (hereinafter "MAMTP") disclosure, include:

FIG. 1 shows a datagraph diagram illustrating embodiments of iTag apply for the MAMTP;

FIG. 2 shows a datagraph diagram illustrating embodiments of iTag asset balancing for the MAMTP;

FIG. 3 shows a logic flow diagram illustrating embodiments of tag application and asset rebalancing for the MAMTP;

FIG. 4 shows a screenshot diagram illustrating embodiments of an iTagger for the MAMTP;

FIG. 5 shows a screenshot diagrams illustrating embodiments of asset holding slicer user interface for the MAMTP;

FIG. 6 shows a datagraph diagram illustrating embodiments of asset holdings slicing for the MAMTP;

FIG. 7 shows a logic flow diagram illustrating embodiments of an asset holdings slicer component for the MAMTP;

FIGS. 8-13 show screenshot diagrams illustrating embodiments of an holdings goal mapping for the MAMTP;

FIG. 14 shows a datagraph diagram illustrating embodiments of goal mapping for the MAMTP;

FIG. 15 shows a logic flow diagram illustrating embodiments of map component for the MAMTP;

FIGS. 16-35 shows screenshot diagrams illustrating embodiments of for the MAMTP;

FIG. 36 shows a block diagram illustrating embodiments of a controller for the MAMTP;

Figure 37A:
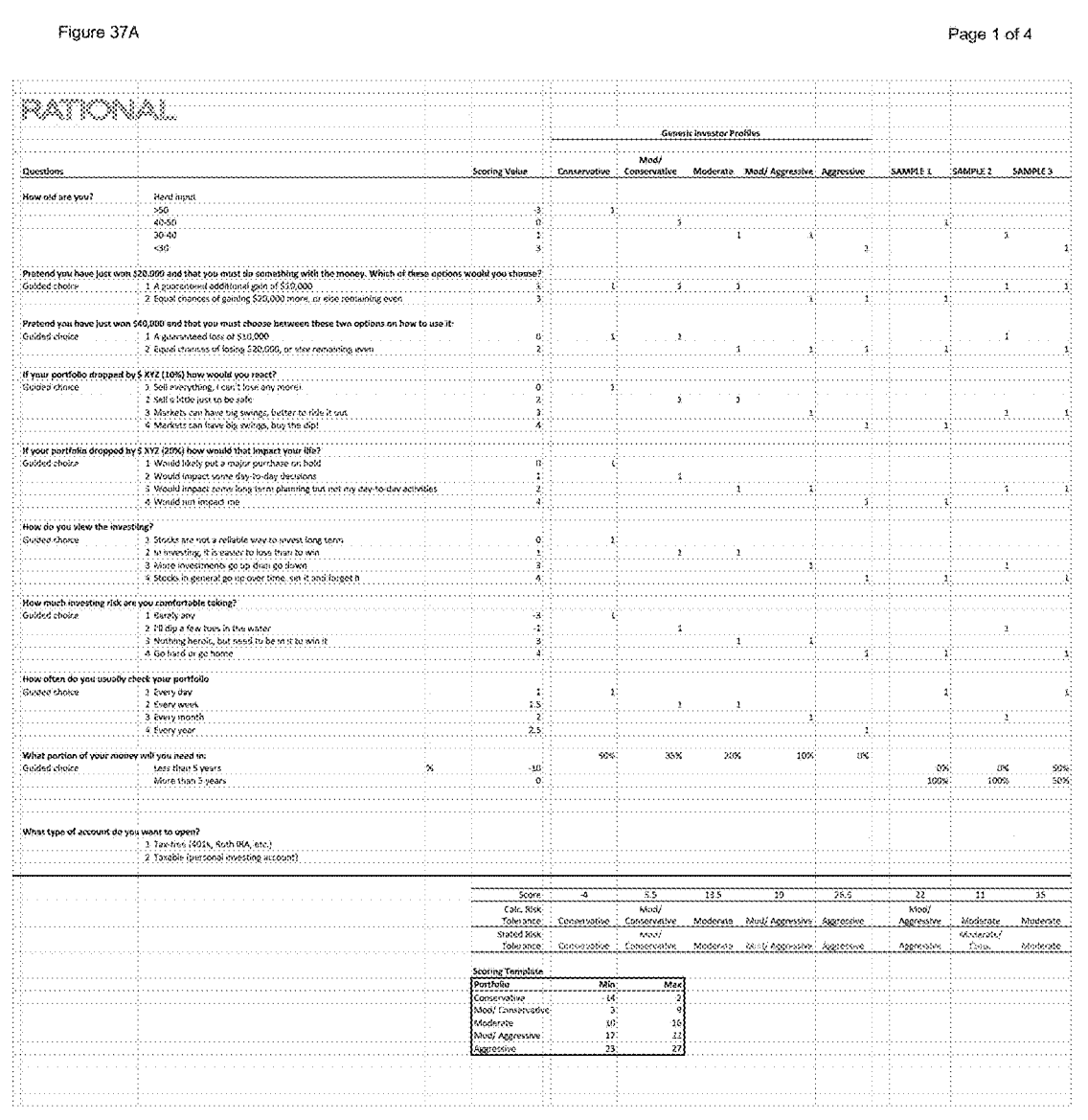
Figure 37C:
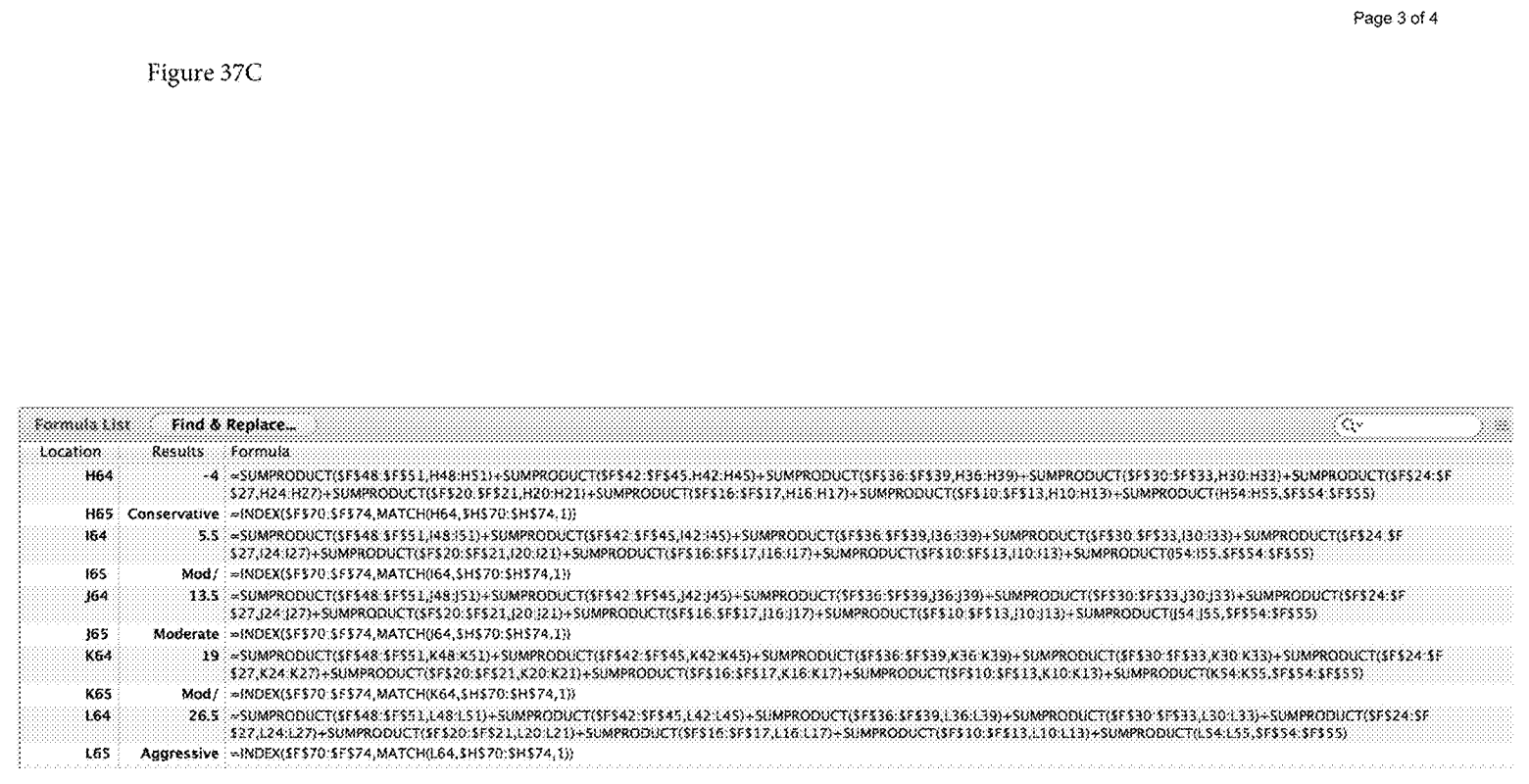

FIGS. 37A-D illustrates example risk tolerance scoring calculations, e.g., based on iTag/risk profile answers (e.g., FIGS. 27-31), which may be used by MAMTP components for risk tolerance calculations in the MAMTP; and FIGS. 38A-Q illustrates example affinity allocations and base allocation calculations, e.g., based on iTag/risk profile answers (e.g., FIGS. 27-31), which may be used by MAMTP components for risk tolerance calculations in the MAMTP;

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citation and/or reference numbers are not necessarily sequences but rather just example orders that may be rearranged and other orders are contemplated.

DETAILED DESCRIPTION

The Multidimensional Asset Management Tag Pivot Apparatuses, Methods and Systems (hereinafter "MAMTP") transforms iTag Creation Request and iTag Creation Responses, holdings selections, allocation splits, goal map selections, goal option selections, account links inputs, via MAMTP components (e.g., iTag creation, instantiate iTag create UI, iTag apply, portfolio create, portfolio iTag create, iTag, asset holdings slicer, slicer UI, goal map, goal map UI, map, etc.), into iTag records, iTagged asset information, asset buy/sell approval, asset order, map goal add, tracking, outputs. The MAMTP components, in various embodiments, implement advantageous features as set forth below.

INTRODUCTION

The MAMTP introduces a new platform with fundamentally different information technology "plumbing" allowing unique and more human tailored experiences and interactions with asset management for "mere mortals." MAMTP works with both consumer end users wishing to manage their assets, and, similarly, provides professional asset managers with access to asset holding consumers who would otherwise not be able to afford or obtain the services of such sophisticated professionals. Such professionals normally only manage very large and wealthy asset holders, but the MAMTP brings end users the ability to obtain professional asset management that was only available to the rich. No other tool provides ease of use, and power for the user when desired, tools to allow investments to aligning with interests and philosophies, and social collaboration tools for asset management and planning.

MAMTP provides an online investment and financial-services platform focused on the needs and expectations of busy wealth managers and their modern, technology-savvy clients. In one embodiment, MAMTP combines a leading cloud-based financial technology platform with an exceptional user experience. In some embodiments, MAMTP, may use InvestCloud components. In other embodiments, MAMTP, may use IBM components.

Contemporary asset managers face two classic challenges: Overall productivity and client engagement. These two factors alone can have huge impacts on revenue and client retention. MAMTP provides a holistic, cloud-based, enterprise-level investment platform that revolutionizes both the advisor and client experience. With MAMTP's innovative and intuitive wealth-management solutions, managers finally have access to business and productivity tools that are truly designed around their most important daily activities. Rebalancing, trading, client relationship management (CRM), and portfolio tools have been thoughtfully constructed to be more intuitive, more accessible, and simpler to use. And with their own customized dashboard, every manager can easily view all their most important daily metrics and updates.

MAMTP's empowers team members at every level to have improved client interactions. MAMTP is a platform not only around the needs of advisors themselves, but also for the people who help support them.

MAMTP

MAMTP provides tools to let people see their assets, track their investments, and to communicate with their wealth-management advisors. The needs, demands, and behaviors of the new generation of investors are different than those of previous generations. No longer passive, today's investor requires complex information to be broken down into normal language and clear visuals. MAMTP provides innovative tools and methods that enable clients to gather the intelligence that they require—quickly, easily, and with greater trust and confidence.

Non-limiting example features of an MAMTP advisor portal include:
 Comprehensive, simple-to-use, graphical client views and reporting
 Easy access to advisor's own revenue information and business metrics
 Accurate detailed performance data at all levels: Aggregated, Account, and Holdings
 Elegant tools to manage individual clients, as well as customized client groupings
 Innovative Trading and Rebalancing tools
 One-stop-shop for custom portfolios, corporate products, and personalized blends
 A CRM solution specifically designed around the needs of supporting team members and their complex document-management challenges
 Allows advisors to track their client's online experience- to monitor, assess, and proactively address their client's needs.
 Integrates with your existing research and analysis materials
 CFO-level reporting tools for macro and micro financial advisory metrics—including advisors' AUM, revenue, etc.

Non-limiting example features of an MAMTP client portal include:
 Personalized, advisor-created portfolios
 Clear financial dashboards for comprehensive user engagement and control
 Innovative account aggregation tools for abroad view of both external and internal accounts
 Detailed, multi-tiered investment analysis
 Clear and intuitive displays of transaction histories
 Customizable views of information and preferences
 Easy-to-manage documentation and reporting
 Easy of access to seasoned investors and experienced wealth-management advisors iTagger

FIG. 1 shows a datagraph diagram illustrating embodiments of iTag apply for the MAMTP. A user 186a client 186b, 186c, 186d may engage with the MAMTP 199 by providing a user indication of interest to create an interest tag (iTag) 101 via a user interaction interface at a client 186b-d. In one embodiment, the client interface is provided via web interface from the MAMTP server 199 and indication to create an iTag may be obtained via a user interface button pressed by the user 186a. Upon the client obtaining the iTag creation indication 101, the client may generate and relay an iTag creation request 102 to the MAMTP server 199.

For example, the client may provide a (Secure) Hypertext Transfer Protocol ("HTTP(S)") POST message including data formatted according to the eXtensible Markup Language ("XML"). An example iTag creation request 102, substantially in the form of a HTTP(S) POST message including XML-formatted data, is provided below:

```
POST /authrequest.php HTTP/1.1
Host: www.server.com
Content-Type: Application/XML
Content-Length: 667
<?XML version = "1.0" encoding = "UTF-8"?>
<iTag_create-update_request>
    <timestamp>2020-12-31 23:59:59</timestamp>
    <user_accounts_details>
        <user_account_credentials>
            <user_name>JohnDaDoeDoeDoooe@gmail.com</account_name>
            <password>abc123</password>
            <account_type>manager</account_type>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-
XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <iTag_request_details>
        <iTag_request_type>update</iTag_request_type>
        <iTag_selection_ID>iTagID0123</iTag_selection_ID>
    </iTag_request_details>
</iTag_create-update_request>
```

Figure 4:
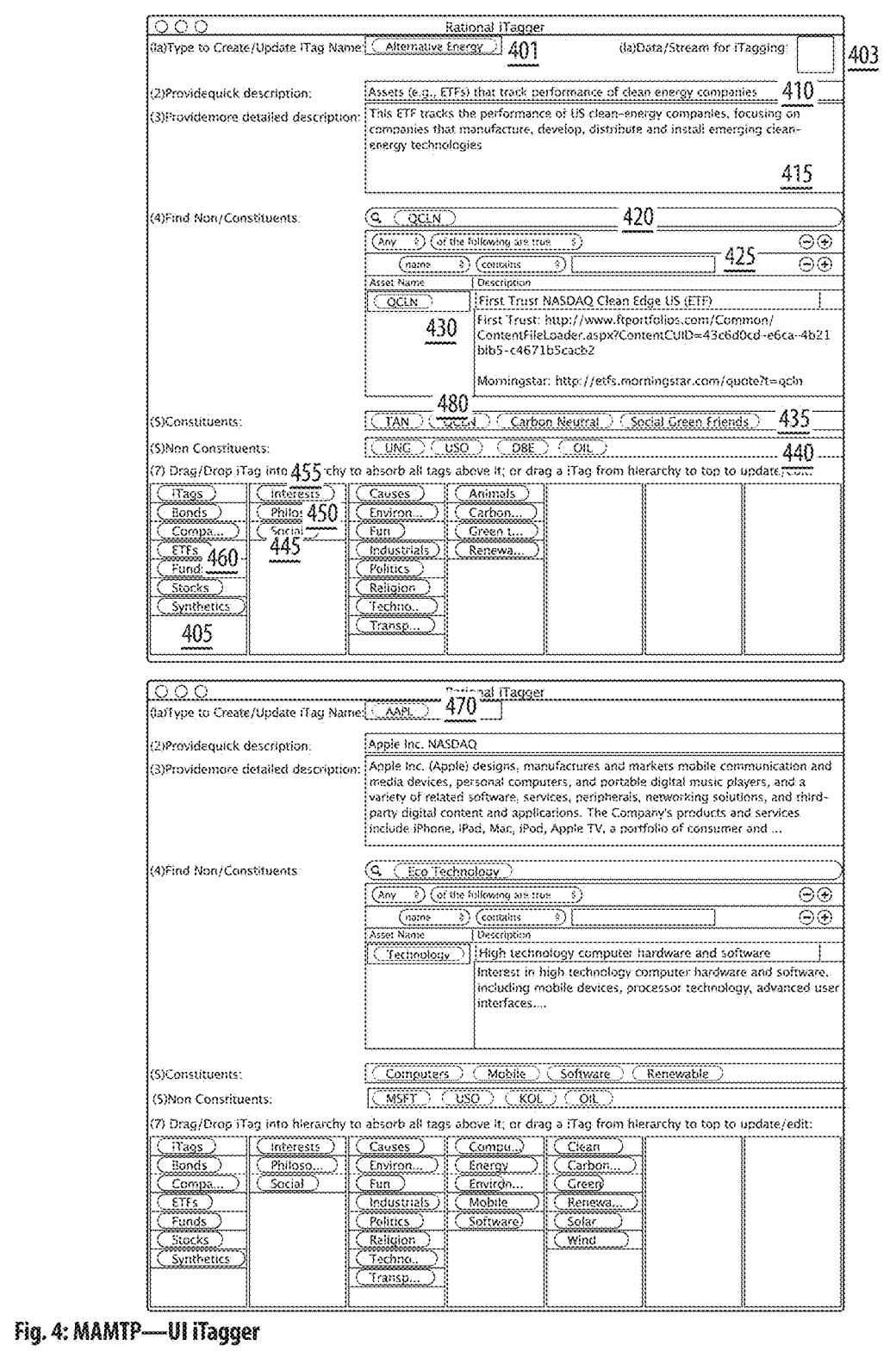

Upon receiving the iTag creation request 102, the MAMTP 199 may provide that as an input to an iTag creation component 150. The component may use that to identify, retrieve and/or generate a user interface for the user's 186*a* client(s) 186*a-c*. The user interface may either be provided directly 104 and/or a message with a user interface object identifier corresponding to an appropriate application interface already stored on the clients may be passed 104. This user interface may then be instantiated on the client for interaction with the user to provide parameters constituting an interest tag 152. An example iTagger user interface may be seen in FIG. 4 (e.g., the user interface may also take the form of a web interface, a mobile app interface, and/or the like). Upon the iTagger UI's instantiation 152 and obtaining inputs from the user, the iTagger will generate an iTag inputs create response 106.

For example, the client may provide a (Secure) Hypertext Transfer Protocol ("HTTP(S)") POST message including data formatted according to the eXtensible Markup Language ("XML"). An example iTag creation response 106, substantially in the form of a HTTP(S) POST message including XML-formatted data, is provided below:

```
POST /authrequest.php HTTP/1.1
Host: www.server.com
Content-Type: Application/XML
Content-Length: 667
<?XML version = "1.0" encoding = "UTF-8"?>
<iTag_create-update_request>
    <timestamp>2020-12-31 23:59:59</timestamp>
    <user_accounts_details>
        <user_account_credentials>
            <user_name>JohnDaDoeDoeDoooe@gmail.com</account_name>
            <password>abc123</password>
            <account_type>manager</account_type>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
//
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXXZ</client_serial_number>
        <client_UDID>FXXXXXXXXX-XXXX-XXXX-XXXX-
XXXXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
//
    <iTag_create-update_response>
        <iTag_request_type>update</iTag_request_type>
        <iTag_selection_ID>iTagID0123</iTag_selection_ID>
        <iTag_Datasource>
/HardDrive/Pathpart/Pathpart/File.doc</iTag_datasource>
        //<iTag_Datasource>
feed://rss.cnn.com/rss/cnn_world.rss</iTag_datasource>
        //<iTag_Datasource>
//    <?PHP
//        header('Content-Type: text/plain');
//        // access database server
//        mysql_connect("10.0.0.222",$DBserver,$password);
//        // select database table to search
//        mysql_select_db("AssetProfile.SQL");
//        //create query for Assetprofile data
//        $query = "SELECT Asset_details FROM AssetProfileTable
WHERE asset_ID LIKE '%' $AAPL";
//        // perform the search query
//        $result = mysql_query($query);
//        // close database access
//        mysql_close("AssetProfile.SQL");
//    ?>
//    </iTag_datasource>
        <iTag_selection_Name>Alternative Energy</iTag_selection_Name>
        <iTag_superclass_inherit>
iTags:Interests:Environment</iTag_superclass_inherit>
        <iTag_brief_description>Assets (e.g., ETFs) that track performance
of clean energy companies</iTag_brief_description>
        <iTag_description>First Trust:
http://www.ftportfolios.com/Common/ContentFileLoader.aspx?Con-
tentGUID=43c6d0cd-e6ca-4b21-b1b5-c4671b5cacb2
Morningstar: http://etfs.morningstar.com/quote?t=qcln</iTag_description>
        <iTag_constituents>TAN 50%, QCLN 20%, Carbon Neutral 10%,
Social:Green Friends 20%</iTag_constituents>
        <iTag_not_constituents>UNG, USO, DBE, OIL</iTag_not_con-
stituents>
    </iTag_create-update_response>
</iTag_create-update_request>
```

Upon sending the iTag create response 106, the MAMTP server 199 may parse the response and generate a record to be stored in its database 108. In one implementation, after receiving the new information request iTag create response 106, the MAMTP server may parse the message, and retrieve/update/store the iTag record from the one or more databases and/or tables (e.g., iTag database). An exemplary listing, written substantially in the form of PHP/SQL commands, to update the iTag record in the iTag database, is provided below:

```
<?PHP
header('Content-Type: text/plain');
// store input data in a database
mysql_connect("10.0.0.222",$DBserver,$password);   // access database server
mysql_select("iTag_DB.SQL"); // select database to append
mysql_query("UPDATE iTagTable
SET iTagName='Alternative Energy',
    iTagSuperClass='iTags:Interests:Environment',
    BriefDescription='Assets (e.g., ETFs) that track performance of clean energy companies',
    Description='First Trust: http://www.ftportfolios.com/Common/ContentFileLoader.aspx?ContentGUID=43c6d0cd-e6ca-4b21-b1b5-c4671b5cacb2
Morningstar: http://etfs.morningstar.com/quote?t=qcln'
    timestamp='2020-12-31 23:59:59',
    iTagConstituents='TAN 50%, QCLN 20%, Carbon Neutral 10%, Social:Green Friends 20%',
    iTagNonConstituents='UNG, USO, DBE, OIL'
WHERE iTagName='Alternative Energy'");
mysql_close("iTag_DB.SQL"); // close connection to database
?>
```

The MAMTP server 199 may receive asset information from a number of sources including financial data servers 198, 110, 112. As it continually receives such asset information (e.g., financial news, kicker updates, etc.) and iTag apply component 154 may process this information and apply tagging. In one embodiment, auto-tagging may be applied 126*b*. Otherwise information may be forwarded for tagging to clients 186*b-c*. Again, the user interface for asset iTag application 123 may be provided to the clients. Also, the user may have shown an interest to apply iTag to information that was received with the system 120, which will generate an iTag apply request 122, similar to the data structure already discussed above for the iTag creation request 102. In either case, once the user interface for asset tag application is provided to the user 123, the user may interact with the user interface (e.g., see FIG. 4), and iTag application selections may be generated and captured by the user interface 124. Such iTag apply requests will have data structure similar to those already discussed in the iTag create response 106, 126*a*, and may be sent back to the MAMTP server 199 for the iTag apply component 154 to finish processing received iTags. Such iTagged asset information 128 may be stored at the MAMTP server 199 and may otherwise be provided to other systems.

FIG. 2 shows a datagraph diagram illustrating embodiments of iTag asset balancing for the MAMTP. A user may show an interest in creating or updating a portfolio 201. After engaging with an interface to make a request, a portfolio creation update request 202 (e.g., similar in structure to the iTag creation request 102) may be sent to a MAMTP server 299 and processed by a portfolio profile component 250. The MAMTP server 299 may provide a user interface for creating and/or updating the constituents of the portfolio 204 (e.g., see FIG. 4 for an example).

Once the user specifies the iTag's for a portfolio, a profile/portfolio response message may be sent back to the server 299, 206 (e.g., similar in structure to the iTag create response 106). The portfolio creation component 252 may then process any user responses, and determine and generate the appropriate asset orders to rebalance the portfolio to match the suggested proportions and/or harder constraints of the newly applied tags 252. For example, a user may tag their portfolio showing a desire to have investments that include solar power and remove a previous tag that the portfolio include investments in wind power; as such the portfolio creation component 252 would rebalance the portfolio to include holdings that comport with the newly applied tags and other account profile constraints. Upon this determination, any necessary asset sales and/or purchases may be compiled into an asset order 208 and that asset order may be placed with a financial system server 298.

For example, the client may provide a (Secure) Hypertext Transfer Protocol ("HTTP(S)") POST message including data formatted according to the eXtensible Markup Language ("XML"). An example asset order 208, substantially in the form of a HTTP(S) POST message including XML-formatted data, is provided below:

```
POST /authrequest.php HTTP/1.1
Host: www.server.com
Content-Type: Application/XML
Content-Length: 667
<?XML version = "1.0" encoding = "UTF-8"?>
<asset_order_request>
    <timestamp>2020-12-31 23:59:59</timestamp>
    <user_accounts_details>
        <user_account_credentials>
            <user_name>JohnDaDoeDoeDoooe@gmail.com</account_name>
            <password>abc123</password>
            <account_type>manager</account_type>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXXZ</client_serial_number>
        <client_UDID>FXXXXXXXXX-XXXX-XXXX-XXXX-
XXXXXXXXXXXXX</client_UDID>
```

-continued

```
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <asset_order>
        <Buy1>AAPL</Buy1>
        <Buy1Limit>1000.01</Buy1Limit>
        <Buy1LimitTime>Today</Buy1LimitTime>
        <Buy1LimitQuantity>100</Buy1LimitQuantity>
        <Buy2>TSLA</Buy2>
        <Buy2Limit>500.01</Buy2Limit>
        <Buy2LimitTime>Today</Buy2LimitTime>
        <Buy2LimitQuantity>100</Buy2LimitQuantity>
...
        <Sell1>MSFT</Sell1>
        <Sell1Limit>100.01</Sell1Limit>
        <Sell1LimitTime>Today</Sell1LimitTime>
        <Sell1LimitQuantity>100</Sell1LimitQuantity>
    </asset_order>
</asset_order_request>
```

Also, account managers 286 may make account edit inquiries 220, which are provided to the MAMTP server 299. A portfolio iTag management component may receive these account edit inquiries 254, 220, and return iTag portfolio management user interface 222 (e.g., see FIG. 4) to allow the asset manager to make changes to iTags, portfolios, assets, etc. The asset manager may then provide these changes back to the MAMTP server 299, 224 (e.g., similar in structure profile/portfolio response 206), and the MAMTP server 299 may then employ an update iTag component 256, which will rebalance and change any affected subscribe portfolios. So, for example, an asset manager may be in charge of an "alternative energy" iTag, and may determine that a company that is a constituent of that iTag has changed its policies so it is no longer environmentally friendly and should no longer be associated with the "alternative energy" iTag. The asset manager may thereby provide an indication to remove that constituent from any association with the iTag (e.g., see FIG. 4). The portfolio manager may provide an alternative company to take its place. As such, any users portfolios that subscribe to the alternative energy iTag will be rebalanced to exclude the former holdings, and now include the new holdings as indicated by the asset manager 256. As a consequence, orders for all the portfolios including the "alternative energy" iTag may need to be rebalanced, and asset orders selling the old stock and purchasing the new stock (e.g., in prorated proportions) may be generated and issued so that all such actively managed iTag portfolio subscribers will have portfolios automatically reconstituted to comport with the iTag constraints 226. Should conflicts arise, the portfolio creation and update components 252, 254, 256 (see FIG. 3) will resolve such conflicts and/or present them to users (e.g., portfolio managers and/or owners) for resolution.

FIG. 3 shows a logic flow diagram illustrating embodiments of tag application and asset rebalancing for the MAMTP. In one embodiment, upon instantiation, a portfolio creation and update component may begin processing at a MAMTP server 399, 305. The MAMTP server may provide a display having iTag interest options for selection at a client 386, 310. Users may then supply interest selections and portfolio inputs via supplied user interface, 315 (e.g. see FIG. 4). After users supply their interest selections, the selections will be provided back to the MAMTP server 399, which will obtain iTag proportions 320; for example when a user selects iTag interests for "alternative energy" and applies those to their portfolio, the MAMTP server 399 will retrieve a record associated with that iTag having appropriate proportions of constituents to be applied to that portfolio. The server 399 will also obtain access to the relevant client account(s) 325 through any user (e.g., account holder, account manager, etc.) supplied account identifying indicia. The server may then determine if conflicts exist based on the newly supplied interest inputs 315, 330. For example, if a user selects tags that are inherently conflicting (e.g. "renewable energy" and "oil energy" tags), MAMTP will seek to resolve the conflict 330. In one embodiment, if a conflict exists the conflict and potential resolutions to the conflict may be provided to the user for display 335, where the user may then provide indication of their preference for how such resolutions may be resolved 340 (e.g., a user indicating they prefer "renewable energy" holdings over "oil energy" tagged holdings). Also, the MAMTP may provide examples of how others with similar holdings have resolved such conflicts (e.g., if a user is subscribed to a celebrity portfolio, they may see how such conflicts and what holdings the celebrity chose, and may decide to follow suit). If no conflict exists 330 and/or after providing the user with the option of supplying a preference 340, the MAMTP 399 may determine if the preference is to be taken into account for conflict resolution 345. If no preferences have been expressed 340, 345, the MAMTP may determine if a synthetic iTag and/or instrument is possible 350. For example, although a "renewable energy" tag and an "oil-based energy" tag may inherently be conflicting, the MAMTP 399 may generate a basket full of assets/equities having no-oil based holdings, yet the basket would otherwise closely track the performance (e.g., in proportionate value, risk, velocity of trades, velocity of price movement, volatility, overall value, etc.) of the "oil-based energy" tagged portfolio 350. If such a synthetic is not possible as the tracking constraints exceed desired thresholds, and error handler may be employed for further resolution 395 (e.g., contacting an account manager to provide further guidance). Otherwise, the MAMTP will continue to generate a synthetic basket to resolve the conflict 355. If no preferences were supplied 345, and otherwise after generating a conflict resolving synthetic 355, the MAMTP will generate/update and rebalance asset holdings for the client account to comport with the iTag proportions that were retrieved 320, 360. The MAMTP may then provide a display to the user to show the resulting holdings for user approval 365. Upon the user's response 370 being obtained, the MAMTP will determine if approval is obtained 375. If so, the server will rebalance the client account to the iTag proportions as has been computed 360 and generate/issue the appropriate asset trades to financial service trading servers 385. Additionally, upon rebalancing the account 380, the MAMTP will determine if additional changes are necessary (e.g., are there other subscribing accounts, or parts of an iTag hierarchy that need further rebalancing) 390, and if so the iTag component will continue to iterate 305 (e.g., see 3670 of FIG. 36), otherwise processing will cease 305. In one embodiment, the iTag component may search the database for any accounts/holdings tagged with a the changed tag, and place all such affected accounts in a queue for additional processing 390, 305 and effect purchases to buy/sell trades needed to comply 385 with the new tag proportions. For example, if a iTag for "green tech" investments is initially structured to make equity investments 100% in wind-powered institutions, but is changed to have holdings 50% in wind-powered institutions and 50% in solar-powered institutions (wherein, e.g., this change may be effected by an investment specialist that may specify other constituent iTags as new proportions for the "green tech" tag, and/or other specific equity/investment vehicle holdings as constituents for the new tag), then 50% of the holdings tagged "green tech" will be sold off and proceeds from the sales and other money on account (if needed) will be used to purchase 50% (e.g., in value) of holdings in solar-powered institutions; and this would occur to any account/holdings subscribed to the 'green tech' iTag.

FIG. 4 shows a screenshot diagram illustrating embodiments of an iTagger for the MAMTP. In one embodiment, the MAMTP provides a user interface to allow users to establish iTags. In one embodiment, a user may generate a new and/or update an existing interest tag/iTag 401 by typing in a value in a field. For example, a user may navigate the multicolumn browser that holds various tags, assets, etc. 405 and drag a desired tag up to the create/update section of the interface 401, which will load any associated information/fields for updating. For any tag that is being created/updated 401, a user may enter both quick 410 and more detailed descriptions 415 that are to be associated. Additionally, any incoming data files/queries/streams/sets may be attached (e.g., via drag and drop) for tagging in the datawell 403. In one example, the datawell may be a receptacle for a user and/or set of user accounts and/or portfolio holdings, thereby allowing users and/or managers to apply iTags to holdings as parameter constraints. For example, a database table and/or database table record may be linked through an adaptor and encapsulated SQL query for tagging via the datawell. For example, in one embodiment, the record is read and matched against keywords/tags of all the tags in the tag collection 405; the highest frequency occurrence of matching terms may be ranked higher, and the top 1 or more matches automatically selected as tags for the data linked in the datawell. In this manner, a stream of information inflowing into a database/datasource may be continuously and automatically tagged. A user may then find new constituents to be associated with the tag 410 by entering queries in a search box 420. More sophisticated Boolean operators may be stacked and built to help the user search for information, assets, tags, etc. 425. The search results may be listed and asset tags 430 may be grabbed, retrieved, and/or updated 430. The user may then grab, drag-and-drop any of the tags that are uncovered through the search results section 420, 430 and move those into any of the receiving wells 401, 403, 435, 440. For example, user may specify the tags that are part of the constituents 435, or to be considered non-constituents 440. Constituents 435 may show the types of other entities that comply with the tags 401 being created, while non-constituents 440 are entities 460, philosophies 450, social circles 445, and interests 455 that are not related to the iTag being created. Additionally, a popup slider mechanism 480 may appear when selecting a constituent tag, which allows a user to establish a proportion/constraint for the constituent 435 of a tag/datasource 401, 403 being created/updated. It should be noted that while in one example the iTagger is used to create an interest tag 401, the iTagger may also be used to create associations for an asset, e.g., such as a stock (AAPL), 470. Similar user interactions can generate associations on any of the entities including: bonds, companies, ETF's, funds, stocks, synthetics, etc. 460. This can be useful in generating an inter-associated graph of entities and interests for further searching, associations, and interactions. Once the iTagger has been used to generate these associations through user interactions, an iTag creation response 106 may be sent, as already discussed above.

Slicer

FIG. 5 shows a screenshot diagrams illustrating embodiments of asset holding slicer user interface for the MAMTP. In one embodiment, the interface 502 may operate as a pop-up window/menu having a slider 520 and identifying the current selection asset holding type 523 (e.g., in this case the holding type is an iTag for a somewhat aggressive investment risk profile 525) for a given holding (e.g., in this case a US equity slice 522 of account holdings for an investor). The asset holder slicer interface and component(s) may be use to take any holdings, and allow a user to split (and/or consolidate) the holdings between the current constituent assets within the holdings and some specified proportion of new holdings. So for example, in the next example, a client currently has selected a part of their holdings dedicated to carbon neutral company investments 501a, 501b, and the slicer interface 503 shows that the user is contemplating splitting that 56.02% block of their equity interest to be only 79% of its current size, 501c by moving the slider, and choosing a drop-down menu 505a allowing the user to browse through other iTag (e.g., in this case social tracking iTags) to make up the remainder (i.e., 21%) of the asset block. It should be noted any asset class and/or iTag may be used/combined as shown in 405 of FIG. 4. It should be noted, this change may be considered an encapsulation holdings within the current selection tag, or, when tags are mutually exclusive, may cause an outright split in holdings (e.g., and the user may be asked to confirm suck split in holdings). For example, if the user would like the 21% of the selected holdings to follow Snow White's iTag, that tag may already be an iTag subclass of the already selected "Carbon Neutral" tag, and/or its holdings may be compatible with the "Carbon Neutral" tag; in such a case, the selected block of holdings will stay a coherent block, but with a sub-portion of the constituents following the more specific holding recipe of holdings specified in the Snow White iTag. For example, the "Carbon Neutral" tag may specify only holdings that are environmentally sound (e.g., renewable energy institutions) may form its holdings, while the "Snow White" tag may require only solar energy institutions may make up its investments. This would result in the block getting a color stripe 505b. Such compatible selection, also, allows for 'stacking' tags where a user can first specify that 100% of the investment should be in equities (e.g., as opposed, say, fixed interest) assets, and then specify 100% of the holdings are to be "green tech" iTags). It should be noted, in some embodiments the block slices 522 are moveable 'Jenga' style from one holdings type region to another without requiring the slicer (e.g., when a user wishes to reallocate an entire holdings block. For example, the user may click and drag the equities holding block 522a and reposition that block somewhere else in to the cash portion 522b of asset cube where all the blocks will align them selves proportional to their new holding size/values (e.g., by moving slice 522a from the equities block into cash block 522b, then the block would be reconstituted to cash holdings otherwise complying with noted tags); with such holding type movements, iTags would be preserved, e.g., if the equities required "Carbon Neutral" holdings, the cash holdings might be moved to bank accounts of banks that operate with a more carbon neutral philosophy and/or an error showing conflict will be presented to the user, e.g., requiring they update their tags. Whereas, if the user selected the "Evil Knievel" tag that requires some holdings in fossil fuel institutions, as such a holding would be in conflict and incompatible with the current "Carbon Neutral" iTag class, the blue slice 505b would be broken off and form a new holdings segment in the equity holdings class. It should be noted that classes may be join, where if for example, the user selected won of the other holdings slices, e.g., "renewable friendly" 506, and used the slicer 503 to change some or all of its holdings to be of "Carbon Neutral" tag type, then as there are already holdings of that tag type, the 0.23% of "renewable friendly" holdings would be changed to and added to the large block of "Carbon Neutral" tagged holdings 501a, 501b and a graphical updated would reflect such change. In one embodiment, Highcharts graphical toolkit libraries may be used to generate numerous chart types including: pie, bar, point, line, 3D, etc. Open GL toolkits can be used to make real time 3D block representations of asset slices. Although popup menus and sliders and drop down menus were used for the illustrated example embodiment of the slicer, numerous embodiments are contemplated using any varied number of widget interface constituents.

The asset holdings slicer is an orthogonal tool. As long as it attaches to any object having constituent holding data outlets, it may operate to slice and change the holding's constituents. In one embodiment, goal map interface 501, having assets placed on its time line path 512 (e.g., an Acura car) allows a user to engage (e.g., right click) on the asset and bring up the slicer 507. As has and will be discussed throughout, map goals 'destinations' represent desired asset/holdings that a user is trying to fund at some point in their life and helps the user plan what needs to be done/saved in order to obtain their goals within their specified time horizon; as such, it does not represent asset holdings per se as much as it represents source of funding and current asset holdings accrued in pursuit of that goal. Here we see an asset that was to be funded by holdings that were originally 100% in fixed income instruments and the user is using the slicer to reduce those holdings and sources of funding, e.g., down to 81% 509a (e.g., which may be show as proportionally colored rings 509b) and to apply 19% future funding and current holdings to the "Save the puppies" interest iTag (e.g., which may allow investment in institutions that donate to local ASPCA causes) 511a (e.g., which may be highlighted visually with an updated color ring on the goal map time line 511b.

FIG. 6 shows a datagraph diagram illustrating embodiments of asset holdings slicing for the MAMTP. As such, in one embodiment, a user may make a selections 601 of holdings, where the holdings object may have an outlet representing current constituent asset holdings, tags, etc. (e.g., example objects may be a 3D asset cube, a bar graph, pie graph, line chart, scatter chart, goal map destination, etc.). For example, a user may right-click on a block/slice value (e.g., 501a of FIG. 5) or value, select a "split this" menu option, and then have options to resize that asset block (e.g., then apply a slider on how aggressive or not we want that block invested, apply an interest tag to it, etc. see FIG. 5), etc. as seen in FIG. 5. This selection 601 may be provide to the MAMTP server (e.g., via the slicer UI component 663; see FIGS. 7 and 3663 of FIG. 36 for more detail), which may receive a resulting cube slice request 602.

In one embodiment, the client may provide the following example cube slice request 602, substantially in the form of a HTTP(S) POST message including XML-formatted data, as provided below:

```
POST /authrequest.php HTTP/1.1
Host: www.server.com
Content-Type: Application/XML
Content-Length: 667
<?XML version = "1.0" encoding = "UTF-8"?>
<cube_slice_request>
    <timestamp>2020-12-31 23:59:59</timestamp>
    <user_accounts_details>
        <user_account_credentials>
            <user_name>JohnDaDoeDoeDoooe@gmail.com</account_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further messages will include only on to save
        //space
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MAMTP.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus
S Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <selectedDataObjectID>3DCube123</selectedDataObjectID>
```

```xml
<outletTypes>asset,iTags</outletTypes>
<objectType>3DCubeChart</objectType>
<objectHoldingsID>accountID123</objectHoldingsID>
</cube_slice_request>
```

Using the request, the MAMTP server 699 may retrieve (e.g., query the MAMTP database) to pull allocations for the selected object (e.g., all the asset slices for account holdings; see FIGS. 7 and 3661 of FIG. 36 for more details) 661. The holdings slicer component may then use the allocation values to generate a display interface showing the asset holdings to the client and send that in an allocation UI type message 604.

In one embodiment, the client may provide the following example allocation UI type message 604, substantially in the form of a HTTP(S) POST message including XML-formatted data, as provided below:

```
POST /authrequest.php HTTP/1.1
Host: www.server.com
Content-Type: Application/XML
Content-Length: 667
<?XML version = "1.0" encoding = "UTF-8"?>
<allocationUIType>
    <timestamp>2020-12-31 23:59:59</timestamp>
    <user_accounts_details>
    ...
    </user_accounts_details>
    <client_details> //iOS Client with App and Webkit
    ...
    </client_details>
    <UIobject>
        <selectedDataObjectID>3DCube123</selectedDataObjectID>
        <outletTypes>asset,iTags</outletTypes>
        <objectType>3DCubeChart</objectType>
        <objectHoldingsID>accountID123</objectHoldingsID>
    </UIobject>
    <payloadDataforObject>
        <equitiesAllocation>
            <USEquity>30.4%</USEquity>
            <InternationaEquity>14.49%</InternationEquity>
            <EmergingMarketEquity>11.24%<EmergingMarketEquity>
        </equitiesAllocation>
        <fixedIncome>
            <CorporateBonds>16.71%</CorporateBonds>
            <USTreasuryBonds>5.29%</USTreasuryBonds>
            <EmergingMarketBonds>2.98%</EmergingMarketBonds>
        </fixedIncome>
        <Cash>8.4%</Cash>
        <RealEstate>4.8%</RealEstate>
    </payloadDataforObject>
    <iTags>
        <payloadID>USEquity</payloadID>
        <iTag>Aggressive</iTag>
    </iTags>
</allocationUIType>
```

The client 686 may then receive the allocation UI type message 604 and the client may instantiate (if it has not already been instantiated) the Slicer UI Component 663 (See FIGS. 7 and 3663 of FIG. 36 for more detail), which may then composite and render the UI for display and interaction for the user 606, 686*a*, FIG. 5. The user 686*a* may then interact with the display interface 606 and designate the portion and type of allocation of an asset holding (e.g., a holding block); see FIGS. 5 and 405 of FIG. 4 to see the asset types (e.g., fixed, equity, money market, cash equivalents, alternatives, etc.) and iTags (e.g., philosophy, interest, social, conservative vs. aggressive, etc.), etc. 607. The slicer 663 may take these user inputs and generate an allocation adjustment message 608 to provide to the MAMTP server's 699 holding slicer component 661, which in turn will determine what allocation adjustments need to be made and if there are any conflicts 661.

In one embodiment, the client may provide the following example allocation adjustment message 608, substantially in the form of a HTTP(S) POST message including XML-formatted data, as provided below:

```
POST /authrequest.php HTTP/1.1
Host: www.server.com
Content-Type: Application/XML
Content-Length: 667
<?XML version = "1.0" encoding = "UTF-8"?>
<allocationAdjustment>
    <timestamp>2020-12-31 23:59:59</timestamp>
    <user_accounts_details>
    ...
    </user_accounts_details>
    <client_details> //iOS Client with App and Webkit
    ...
    </client_details>
    <UIobject>
        <selectedDataObjectID>3DCube123</selectedDataObjectID>
        <outletTypes>asset,iTags</outletTypes>
        <objectType>3DCubeChart</objectType>
        <objectHoldingsID>accountID123</objectHoldingsID>
        <objectSliceSelection>equitiesAllocation</objectSliceSelection>
    </UIobject>
    <selectedValue>
        <equitiesAllocation>
            <USEquity>30.4%</USEquity>
        </equitiesAllocation>
    </selectedValue>
    <adjustedValue>
        <objectSliceSelection>equitiesAllocation</objectSliceSelection>
//      <newValue>24.4%</newValue>
//can specify new % for iTagsNew to apply to
    <adjustedValue>
    <iTagsOriginal>
        <payloadID>USEquity</payloadID>
        <iTag>Aggressive</iTag>
    </iTagsOriginal>
    <iTagsNew>
        <payloadID>USEquity</payloadID>
        <iTag>MostAggressive</iTag>
    </iTagsNew>
</allocationAdjustment>
```

The MAMTP 699 will then generate an allocation adjusted financial data request 610 (e.g., either through linked accounts, through REST APIs, and/or via 3rd party 698 financial asset trading services (e.g., investment banks), etc.).

In some embodiments, the MAMTP then query a data store for assets relating to the new holdings type/iTag. An example PHP/SQL listing for querying a database for a card image is provided below:

```
<?PHP
header('Content-Type: text/plain');
mysql_connect("254.93.179.112",$DBserver,$password); // access database server mysql_select_db("Assets.SQL"); //select database table to search //create query for token arbitrators
$query="SELECT iTags, assetIDs FROM assetTable WHERE assets LIKE '%' $iTagsNew";
```

$result=mysql_query($query); // perform the search query
mysql_close("Assets.SQL"); // close database access
?>

The 3rd party financial institution 698 may provide an allocation adjusted financial data response 611 showing the costs/availability of reallocation/rebalancing of specified holdings to the MAMTP server 699. In turn, the MAMTP server's 699 holdings slicer component 661 may determine if any conflicts in holdings have occurred and create investment options and provide such options via an allocation UI investment options message 613 to the client's 686 slicer UI component 663 which will generate a UI for display having the investment options and updated allocation apportionment for display 615 and selection 616 by the user.

In one embodiment, the client may provide the following example allocation UI investment options message 613, substantially in the form of a HTTP(S) POST message including XML-formatted data, as provided below:

```
POST /authrequest.php HTTP/1.1
Host: www.server.com
Content-Type: Application/XML
Content-Length: 667
<?XML version = "1.0" encoding = "UTF-8"?>
<allocationUIinvestmentOptions>
    <timestamp>2020-12-31 23:59:59</timestamp>
    <user_accounts_details>
    ...
    </user_accounts_details>
    <client_details> //iOS Client with App and Webkit
    ...
    </client_details>
    <UIobject>
       <selectedDataObjectID>3DCube123</selectedDataObjectID>
       <outletTypes>asset,iTags</outletTypes>
       <objectType>3DCubeChart</objectType>
       <objectHoldingsID>accountID123</objectHoldingsID>
       <objectSliceSelection>equitiesAllocation</objectSliceSelection>
    </UIobject>
    <selectedValue>
       <equitiesAllocation>
          <USEquity>30.4%</USEquity>
       </equitiesAllocation>
    </selectedValue>
    <adjustedValue>
       <objectSliceSelection>equitiesAllocation</objectSliceSelection>
//     <newValue>24.4%</newValue>
//can specify new % for iTagsNew to apply to
    <adjustedValue>
    <iTagsOriginal>
       <payloadID>USEquity</payloadID>
       <iTag>Aggressive</iTag>
    </iTagsOriginal>
    <iTagsNew>
       <payloadID>USEquity</payloadID>
       <iTag>MostAggressive</iTag>
    </iTagsNew>
    <oldAssetsToBeReplaced>
       <assetType>Aggressive</assetType>
       <asset1>Microsoft</asset1>
       <asset2>Adobe</asset2>
       <asset3>moderatelyAggressiveCo</asset3>
    </oldAssetsToBeReplaced>
    <replacementAssets>
       <assetType>MostAggressive</assetType>
       <asset1>Apple</asset1>
       <asset2>superAggressiveCo</asset2>
    </replacementAssets>
</allocationUIinvestmentOptions>
```

Upon obtaining the users desired re-apportionment selections 616, the slicer UI component 663 may provide approval to buy/sell and reallocate holdings via the asset buy/sell approval/request message 618 to the MAPTP 699, which may in turn place orders for rebalancing trades with the 3rd party provider 698 and/or save the changes in allocation to the MAMTP database 619 (e.g., in some optional embodiments, such approval request messages 618 may be sent directly to the 3rd party 698 and/or database 619).

In one embodiment, the client may provide the following example asset buy/sell approval/request message 618, substantially in the form of a HTTP(S) POST message including XML-formatted data, as provided below:

```
POST /authrequest.php HTTP/1.1
Host: www.server.com
Content-Type: Application/XML
Content-Length: 667
<?XML version = "1.0" encoding = "UTF-8"?>
<approval>
    <timestamp>2020-12-31 23:59:59</timestamp>
    <user_accounts_details>
    ...
    </user_accounts_details>
    <client_details> //iOS Client with App and Webkit
    ...
    </client_details>
    <UIobject>
       <selectedDataObjectID>3DCube123</selectedDataObjectID>
       <outletTypes>asset,iTags</outletTypes>
       <objectType>3DCubeChart</objectType>
       <objectHoldingsID>accountID123</objectHoldingsID>
       <objectSliceSelection>equitiesAllocation</objectSliceSelection>
    </UIobject>
    <selectedValue>
       <equitiesAllocation>
          <USEquity>30.4%</USEquity>
       </equitiesAllocation>
    </selectedValue>
    <adjustedValue>
       <objectSliceSelection>equitiesAllocation</objectSliceSelection>
//     <newValue>24.4%</newValue>
//can specify new % for iTagsNew to apply to
    <adjustedValue>
    <iTagsOriginal>
       <payloadID>USEquity</payloadID>
       <iTag>Aggressive</iTag>
    </iTagsOriginal>
    <iTagsNew>
       <payloadID>USEquity</payloadID>
       <iTag>MostAggressive</iTag>
    </iTagsNew>
    <oldAssetsToBeReplaced>
       <assetType>Aggressive</assetType>
       <asset1>Microsoft</asset1>
       <asset2>Adobe</asset2>
       <asset3>moderatelyAggressiveCo</asset3>
    </oldAssetsToBeReplaced>
    <replacementAssets>
       <assetType>MostAggressive</assetType>
       <asset1>Apple</asset1>
       <asset2>superAggressiveCo</asset2>
    </replacementAssets>
    <userApprovalStatus>Approved</userApprovalStatus>
</approval>
```

FIG. 7 shows a logic flow diagram illustrating embodiments of an asset holdings slicer component for the MAMTP. The MAMTP server 799 may instantiate (and terminate) 705 its asset holdings slicer component(s) (e.g., see 3661 of FIG. 36). Upon instantiation, the MAMTP server may provide display asset holdings objects (e.g., 3d asset cubes, pie charts, bar charts, goal maps, etc. having asset and iTag outlets) 707 to a client 786. When the client selects such an object having allocations 709, the client can provide indication of which allocation object, slice, subportion with which they wish to interact 709 back to the MAMTP server 799. In one embodiment, the MATP server may discern between different objects such as charts (e.g., asset cubes) and goal map entries, which in addition to an asset holdings portion also include future funding allocations which must be properly guided by any user selections 710. In the case of charts (e.g., asset cubes) 710, the MAMTP server 799 may generate a query and request market data and portfolio allocation proportions 711 from its own and/or a 3rd party database 719. In this way, the MMTP can apportion the current value of the different groups and/or slices of holdings within an account. Upon obtaining the query response 721, the MAMTP server 799 may then generate and provide a UI to display the various metrics, proportions and values of allocations 723 and provide the updated holdings for display and slicer interactions (e.g., see FIG. 5) 723 to the client 786 for display 725 and user selections to interact with desired portions (e.g., slices) of holdings 727. Upon obtaining the user's desired slice selections 727, 729, the MAMTP server 799 may use the sections to generate a query and request market data for the selection allocation 731 from the MAMTP and/or market database(s) 719; this may hold true for a goal map destination 710 as well. Upon obtaining the query response from the database, the MATP server 799 may determine and generate slicer allocation bar option UI to provide to the client 733 for display 735 (e.g., see FIG. 5) (e.g., allowing a user to specify changes in holdings between current and: e.g., asset type (e.g., fixed, equity, money market, cash-equivalents, alternatives, etc.); iTag (e.g., philosophy; interest; social; conservative vs. aggressive; etc.); etc.) and to obtain user adjustments in allocation from the slicer 737. Upon obtaining the adjustments 737, the MAMTP server 799 may determine if there is a conflict between the new allocations. For example, the MAMTP may generate a query on the original holdings type/iTag to and a select on the new target holdings type/iTag and perform a select/comparison to determine if the new tag's constituent holdings are subsumed/allowed by the original holding's type/iTag; if they are compatible, flow will continue 739, 745. If not compatible 739, the conflict will be displayed to the user 741, e.g., in one embodiment, for resolution and/or confirmation 743. In one embodiment, the user may just select a preference to re-specify. In another embodiment, the user may select that the selected apportionment is not a further stacked subportion beholding to the constraints of the original holding type/iTag, but sliced off as a new holding slices (e.g., this would allow for 'good' (e.g., environmentally friendly) holdings and 'not so good' (e.g., environmentally unfriendly) holdings within the same portfolio and apportionments therebetween. Upon obtaining user confirmation 743 and/or adjustment allocations 737, the MAMTP server 799 then generate a rebalance scenario and confirmation UI 745 presenting details of what the new allocation would allow, and provide those details 747 for confirmation/approval by the client 749 (e.g., showing the purchase prices, equity costs, funds/costs, etc. and quantities, etc. for a specific reallocation, etc.). If approval is not obtained 751, the MAMTP server 799 may generate an error handler event adjusting the rebalance holdings and/or allowing reallocation 737. Upon obtaining approval 751, the MAMTP server 799 may generate a client account rebalance event (e.g., querying market data, e.g., to determine that values haven't significantly changed since approval) and effect trades 753 with 3$^{rd}$ party financial service/trading providers 753, which will cause rebalance orders to be received at the 3$^{rd}$ parties and effected 755.

Holdings Goal Map

FIGS. 8-13 show screenshot diagrams illustrating embodiments of an holdings goal mapping for the MAMTP.

In FIG. 8, a user may provide indication to the MAMTP interface, a desire to build a holdings/goals life map 801, which in turn will load in a map builder interface 802, having a time line 803 (e.g., denoted in units representing the age of the user). The user may select one of many holdings/life goals that they are interested in funding/working towards obtaining (e.g., automobile, chattels (e.g., boats, computers, jewelry, fur coats, etc.), celebration, education, family (e.g., events, outings, etc.), general, home (e.g., new, beach, improvement, etc.), sabbatical, retirement, travel, etc.) from the map destination builder palette 802. The user may select any one of the constituents from the palette 805 (e.g., auto) and drag 807 and drop it 809 onto the map timeline near the time horizon where they would like to enjoy the obtaining of the goal (e.g., new car at age 36) 809. Upon placing the map destination 809, a contextually relevant form/template/wizard for the destination will be brought up for the user to specify the details of their goal (e.g., for a car, the make, model, year, color, options, etc. may be supplied and relayed, e.g., via back end API (e.g., Edmunds, cars.com, etc.) as a query to a 3$^{rd}$ party supplier which will provide further options 813 as the user specifies their goals. Upon providing their specification, the goal map may obtain information about costs and options for financing 815, which will let the map goal tool show how much must be saved per month by the user if they wish to save/earn/invest enough to reach their goal 816. Upon completing the specification 815, the user's holdings goal (e.g., a new car) is instantiated as a 'destination' object on the users time line map 817.

In FIG. 9, the user selects another goal from the palette 919 (e.g., a home) and places it further on the time line 921 thereby instantiating a context template 923 allowing them to look up a particular residence 925 (e.g., with look up via API to Zillow.com) and thereby retrieving the costs, financing options and again presenting the amount of savings required per month to obtain the goal within the time horizon 927. Upon instantiating the new goal (e.g., for a new beach home) on the map, the map will adjust the size to show the relatively greater cost in obtaining the home 928 vs. the car 929 goal for their specified time horizons; for example, moving the beach home out by drag-and-drop out a few years will show the size of the beach home destination getting smaller, as the monthly funding commitment will go down. Furthermore, the map may show overall and constituent goal financial details and break downs in a summary portion of the display 931.

In FIG. 10, another goal for education is added 1033, and contextual specifications form 1035 retrieved, and information populated 1037, with calculations on monthly funding requirements shown 1039. As such the user can continue to add additional goals (e.g., travel) 1041 to the map 1043 and result in retrieving numerous holiday options 1045 and funding costs 1047. In one embodiment, a JSONAPI may be employed to retrieve vacation options. In another embodiment, the MAMTP may query advertising networks to replace and/or supplement vacation options such as via REST API. In another embodiment, the MAMTP may request such bids for travel option placements itself. The goal map allows may then instantiate the trip (e.g., a safari) 1049 on the map. The goal map allows users to select any goal 1051, 1052 and see details 1053 about the goal and make adjustments (e.g., by changing supplied values, drag and drop/moving the goal destination along the map, etc.). And the user is able to see a summary and relative costs snapshot of all their destination and changes as they make such changes 1055 allowing for 'what if' play scenarios.

In FIG. 11, a user has brought up details about their travel plans 1157, then their (or their kids) education goals 1161, and home 1159. There are numerous presentation options for the goal map, and many variations are contemplated. Different interface views for the goal map and car detail 1163 and home 1165 are shown as examples.

FIG. 12 shows a life goal map user interface 1205 and web browser open side-by-side 1210. The life goals may be items like obtaining a car, education, home, paying for kids, college, vacations, etc. These life milestones are positioned and interconnected much like a subway map; the financial requirements and iTags associated with each milestone are interconnected and affect one another. In one embodiment, we see a user performing a search for a car on a website 1220, and dragging 225 a desired car onto one of the "stops" on the map 1230; after which, the costs and other information are pulled from the website and used to populate the MAMTP milestone 1235. In one embodiment, after drag-dropping 1220, 1225, 1230 an item into a milestone map element, a user may right-click on that item to obtain various interaction options (e.g., request a chat with a vendor dealer 1240, link a bank account for down-payment/loan fulfillment 1245, obtain offers/advertising for finance options (e.g., the MAMTP may auction ad space for vendors wishing to provide ancillary services like financing through such a mechanism) 1250, see sources for the goods or services (e.g., again offering advertising opportunities) 1255, request to chat with others in related interest/social tag groups, etc.). In another embodiment, an option to chat with members of an iTag interest and/or social group may be engaged 1260. Upon doing so, those in the interest group that were granted privileges (e.g., in some examples the privileges would be limited, but in others, users may wish to share the information with all members of the group) may obtain basic information about the milestone 1270, and anyone may make comments, share information, provide "likes" and ratings of the car 1275, and have a conversation with the user 1280. Also, other members from the group that may have achieved this milestone (e.g., already own this car) may have their ratings and related information (e.g., finance sources, source of purchase, etc.) shared with the current user so they may benefit from the experience.

FIG. 13 shows additional embodiments of the goal map user interface 1381. In addition, the goal map employ a datastructure taxonomy saved in the MAMTP database 1383 having a graph relationship between various map goal destination. This taxonomy, in addition to bringing up the correct contextual detail specifying form templates, can have connections to the forms and service allowing for richer form specifications and more advertising opportunities right at the point of time when the user is making goals. In one embodiment, iTags and/or keyword tags are included in the goal objects in the tool palette and those keywords can be used to query for other related tool palette objects for incorporation into compound goals (e.g., a trip may include flight, hotel, ground transportation, restaurants, shows, events, etc.), which all may be brought in for cost calculation swell as advertising 1383. In another embodiment, an artificial intelligence (AI) adapter for MAMTP may provide insights and analytics. For example, a database adaptor may provide a connection to IBM's Watson AI big data parsing datapath so that Watson can run MAMTP data for personality insights, message resonance, concept expansion, visualization rendering, tradeoff analytics, sentiment analysis, question and answer facilities which may be presented throughout the MAMTP platform via embedded applets/APIs, the website, mobile apps, the goal maps interface, and/or the like.

FIG. 14 shows a datagraph diagram illustrating embodiments of goal mapping for the MAMTP. A MAMTP server 1499 may provide a map UI component 1467 (e.g., see FIGS. 8 and 3667 of FIG. 36 for details) to a user's 1486a client device(s) 1486 for instantiation and thereby providing a goal map time line topography and goal destination tool palette (e.g., see FIGS. 8-13 for examples) for interaction. The user may then make goal map selections (e.g., selecting new goal destinations, existing and instantiated goals, etc.) 1401. The client's 1486 map UI component 1467 may generate and provide a goal type request selection (e.g., car, home, vacation, education, etc.) message 1402 to the MAMTP server 1499.

In one embodiment, the client may provide the following example asset goal type request 1402, substantially in the form of a HTTP(S) POST message including XML-formatted data, as provided below:

```
POST/authrequest.php HTTP/1.1
Host: www.server.com
Content-Type: Application/XML
Content-Length: 667
<?XML version="1.0" encoding="UTF-8"?>
<goalRequest>
  <timestamp>2020-12-31 23:59:59</timestamp>
  <user_accounts_details>
    . . .
  </user_accounts_details>
  <client_details>//iOS Client with App and Webkit
    . . .
  </client_details>
  <UIobject>
    <selectedDataObjectID>autoTemplate</selectedDataObjectID>
    <outletTypes>asset,iTags</outletTypes>
    <objectType>auto</objectType>
    <objectHoldingsID>accountID123</objectHoldingsID>
  </UIobject>
</goalRequest>
```

The MAMTP server 1499 may query for its own and/or 3rd party database (e.g., for goal specification form templates for the selected goal type) 1419 and/or a 3rd party information provider for information relevant to the goal specification form (e.g., Zillow.com for homes, Edmunds API for autos, etc.) 1403. The MAMTP server will obtain the goal specification form and related information from the 3rd party information service 1404.

In some embodiments, the card image server may then query a data store for an option selection template 1403. An example PHP/SQL listing for querying a database for a card image is provided below:

```
<?PHP
header('Content-Type: text/plain');
mysql_connect("254.93.179.112",$DBserver,$password); // access database server mysql_select_db
("GOAL.SQL"); //select database table to search //create query for token arbitrators
$query="SELECT goalType, goalID, goalTemplate FROM goalTable WHERE goalTyep LIKE '%' $auto";
$result=mysql_query($query); // perform the search query
mysql_close("GOAL.SQL"); // close database access
?>
```

It should be noted, as the user continues to make additional entries within the provided goal specification form, additional information queries 1403 may be made to the information providers to iteratively update the goal specification form to make data entry easier for the user (e.g., when the user specifies Acura as a car make, all the Acura models may be loaded in a drop down menu to make it easier for the user to specify their desired model, etc.; e.g., see FIGS. 8-13 for additional detail). Upon obtaining the goal specification form and 3$^{rd}$ party information for the form 1404, the goal map component (e.g., see FIG. 8 and 3665 for additional details) can combine/composite the information into the form and provide that as an options UI message/update (e.g., car model options) 1406 to the map UI component 1467 for generating and displaying the UI and options detail, etc. to the user 1408 and obtain further user UI option selections/changes 1409, which the map UI component can in return generate UI selections messages (e.g., specifying Acura as an auto make) 1410 back to the goal map component 1465, which may continue to iterate more queries 1403 and option details 1404 as long as the user wishes to make changes.

In one embodiment, the client may provide the following example options UI message/update 1406, substantially in the form of a HTTP(S) POST message including XML-formatted data, as provided below:

```
POST /authrequest.php HTTP/1.1
Host: www.server.com
Content-Type: Application/XML
Content-Length: 667
<?XML version = "1.0" encoding = "UTF-8"?>
<optionsUpdate>
    <timestamp>2020-12-31 23:59:59</timestamp>
    <user_accounts_details>
    ...
    </user_accounts_details>
    <client_details> //iOS Client with App and Webkit
    ...
    </client_details>
    <UIobject>
        <selectedDataObjectID>autoTemplate</selectedDataObjectID>
        <outletTypes>asset,iTags</outletTypes>
        <objectType>auto</objectType>
        <objectHoldingsID>accountID123</objectHoldingsID>
    </UIobject>
    <optionsForm>
        <optionsTemplateID>template123</optionsTemplateID>
        <optionsUpdateTemplateLocation>./templates/
carOptionsTemplate.htm/</optionsUpdateTemplateLocation>
        <templateFields>
            <make></make>
            <model></model>
            <year></year>
            ...
        <templateFields
        <fieldValuesSource>http://Edmunds.com/place</fieldValuesSource>
        <fieldValue1>
            <fieldValueField>make</fieldValueField>
            <fieldValuePayload>Acura, Bently,
Chrysler ...Zonda</fieldValuePayload>
        </fieldValue1>
        ...
        </fieldValue3>...
    </optionsForm>
</optionsUpdate>
```

In one embodiment, the client may provide the following example UI selections messages 1410, substantially in the form of a HTTP(S) POST message including XML-formatted data, as provided below:

```
POST /authrequest.php HTTP/1.1
Host: www.server.com
Content-Type: Application/XML
Content-Length: 667
<?XML version = "1.0" encoding = "UTF-8"?>
<optionSelection>
    <timestamp>2020-12-31 23:59:59</timestamp>
    <user_accounts_details>
    ...
    </user_accounts_details>
    <client_details> //iOS Client with App and Webkit
    ...
    </client_details>
    <UIobject>
        <selectedDataObjectID>autoTemplate</selectedDataObjectID>
        <outletTypes>asset,iTags</outletTypes>
        <objectType>auto</objectType>
        <objectHoldingsID>accountID123</objectHoldingsID>
    </UIobject>
    <selection>
        <fieldValue1>
            <fieldValueField>make</fieldValueField>
            <fieldSelection>Zonda</fieldSelection>
        </fieldValue1>
        ...
        </fieldValue3>...
    </selection>
</ optionSelection >
```

When the user becomes satisfied with the option selections, the goal map component 1465 may then calculate costs (e.g., how much funding per month is required for the new options/goal type, obtain financing option/costs, and generate monthly and/or total funding requirements for the goal, etc.). Upon making the cost calculations 1465, the goal map component may provide a UI cost update message 1412 to the map UI component 1467 for updated display 1408, 1409. Once the user provides 1409 indication of approval, the map UI component 1467 will generate an approval/update message 1415 and the goal map component 1465 may add the goal to the map and issue UI display updates evincing the instantiation of the goal, and/or save 1417 the instantiated goal in the MAMTP database 1419. As such, users may continue to use the goal map interface to add more and more goals, and if more goals are desired, iteration and instantiation of additional goals will continue 1418.

The goal map component 1465 may then allow the user to link their financial institutions to the MAMTP and/or goal map (e.g., including accounts at the MAMTP as well as outside 3$^{rd}$ party holdings) to refine calculations on goal facilitation. As such, the goal map component and or the MAMTP server may generate an account link UI request 1420 (e.g., see FIGS. 16-17 for examples). The map UI component (and/or other MAMTP UI components) may obtain the request 1420 and generate a UI for account linking to goals and display the account linker 1422 to the user. The user may then make an account link (e.g., selecting an outside account provider and supplying their credentials (e.g., username, password, etc.) 1423 and the map UI component 1467 may then send the response as a UI link selections message 1425 to the goal map component and/or MAMTP 1499, which in turn can use those credentials to access the user's 3rd (or local) provider 1498 with a data request 1426 and obtain access authorization and/or any requested/needed data and access to holdings 1427.

In one embodiment, the client may provide the following example UI link selections message 1425, substantially in the form of a HTTP(S) POST message including XML-formatted data, as provided below:

```
POST /authrequest.php HTTP/1.1
Host: www.server.com
Content-Type: Application/XML
Content-Length: 667
<?XML version = "1.0" encoding = "UTF-8"?>
<linkSelection>
    <timestamp>2020-12-31 23:59:59</timestamp>
    <user_accounts_details>
    ...
    </user_accounts_details>
    <client_details> //iOS Client with App and Webkit
    ...
    </client_details>
    <selection>
      <fieldValue1>
        <institution>Bank of America</institution>
        <userName>jDoe</userName>
        <password>doedeedododooo</password>
        <accountNumber>1234567890</accountNumber>
        <accountID>123abc</accountID>
        <APIhandlerID>abc123</APIhandler>
        <APIaddressLocation>http://somedoman.com/loca-
tionSecret</APIaddressLocation>
      </fieldValue1>
      ...
      </fieldValue3>...
    </selection>
</linkSelection>
```

The goal map component may use the obtained response 1427 to recalculate funding availability for the goals and also to track activity and pull advertisement for such activity 1465. As the goal map component tracks goal activity, it can use iTags, keywords and other selections from user goal selections as ad (e.g., network) requests and/or offers for bid in the form of an ad request 1429 to a 3$^{rd}$ party and/or optionally to a 3$^{rd}$ party ad database 1419. The 3$^{rd}$ party may generate ad responses 1430 to the ad request 1429 and the goal map component can integrate the ads responses for UI updates and/or complements to goal selection forms. As such, the goal map component may provide a progress tracking and ad UI message update 1431 to the map UI component 1467 for display 1422 and additional user selection updates 1434. These tracking messages 1435 may be used by the MAMTP for future mining of user behavior analytics (e.g., AI analysis).

In one embodiment, the client may provide the following example tracking messages 1435, substantially in the form of a HTTP(S) POST message including XML-formatted data, as provided below:

```
POST /authrequest.php HTTP/1.1
Host: www.server.com
Content-Type: Application/XML
Content-Length: 667
<?XML version = "1.0" encoding = "UTF-8"?>
<tracking>
    <timestamp>2020-12-31 23:59:59</timestamp>
    <user_accounts_details>
    ...
    </user_accounts_details>
    <client_details> //iOS Client with App and Webkit
    ...
    </client_details>
    <activity>
      <action1>
        <timestamp>2020-12-31 23:58:59</timestamp>
        <actionType>click</actionType>
        <targetObjectID>objectID123</targetObjectID>
        <hoverDuration>1.3s</hoverDuration>
        <targetObjectType>ad<targetObjectType>
      </action1>
      <action2>
        <timestamp>2020-12-31 22:58:59</timestamp>
        <actionType>drag</actionType>
        <targetObjectID>objectID123</targetObjectID>
        <hoverDuration>0.3s</hoverDuration>
        <targetObjectType>Jenga asset slice move<targetObjectType>
        <targetDestinatObject>object456</targetDestinationObject>
        <targetDestinationType>Fixed Income
Assets</targetDestinationType>
      </action2>
      <action3>
        <timestamp>2020-12-31 22:57:59</timestamp>
        <actionType>slice</actionType>
        <targetObjectID>objectID789</targetObjectID>
        <hoverDuration>5.5s</hoverDuration>
        <targetObjectType>3D Cube<targetObjectType>
        <targetOrigiTag>Carbon Neutral</targetOrigiTag>
        <targetDestinationiTag>Save the Puppies</targetDestinationiTag>
      </action3>...
    </activity>
</tracking>
```

FIG. 15 shows a logic flow diagram illustrating embodiments of map component for the MAMTP. The map component (e.g., see 3672, including goal map UI 3667 and goal map components 3665 of FIG. 36) may be instantiated 1505 on the MAMTP server 1599 (e.g., the goal map component 3665 of FIG. 36) and client 1586 (e.g., goal map UI component 3667 of FIG. 36). The MAMTP server 1599 may provide the client's goal map UI component with an initial map display (e.g., map time line and goal palette selection interface, e.g., see FIGS. 8-13) 1507. The user may select a desired goal type (e.g., auto, home, education, travel, etc.) 1509 from the goal tool palette and placement on the time line goal horizon 1509. The MAMTP server 1599 may then initiate a query on its own and to 3$^{rd}$ parties/databases 1519 to retrieve contextually relevant option selection forms, advertisements, and financial/cost and option information (e.g., querying the DB for the form and Edmunds API for the makes of cars, etc.) 1511, 1519. Upon obtaining the goal options selection form and accompanying market information response 1521, the MAMTP server 1599 may use the returned form and information to composite the information within the form, generate a UI for user display with populated options 1523. In one embodiment, the options selection form fields are tagged with keywords (e.g., embedded XML field names) and those are used as the query tokens, and responses on those keywords are then use to populate the returned values into the XML fields) 1523. The composited goal option selection form may be composited as a display layer (e.g., via javascript) above the current map and atop of the current goal, thereby overlaying the option forms goal with populated options atop the map and goal 1525 and allowing the user to make further option selections 1527. It should be noted that these option selections 1527 may cause additional queries 1511, that add/update additional options from responses 152 causing UI updates 1523, 1525. When the user is satisfied with the options selected 1527, the MAMTP server 1599 may take the selections and calculate the amount of funding/savings required to fund the selected goal, by the specified time horizon, and with the selected options, and this calculation may cause an update to the map UI component on the client 1586 so that the display may then show the amount of funding/savings required to obtain the goal 1531. If the user does not approve the selections/costs (e.g., they realize the funding costs may be too much to bear) 1535, the user may continue to iterate by changing options/goals 1523. Once the user approves the selections with the funding costs 1533, 1535, the MAMTP may then instantiate the goal to the map (e.g., by having it stored to the MMTP database, and causing a display update on the client 1586 showing the goal destination's updated placement on the map 1537. If the user wishes to add more goals 1539, iteration and addition/instantiation of more goals may continue 1505. If the user does not wish to add more goals 1539, the MAMTP server 1599 may determine the funding/savings required and provide the user the ability to link (e.g., 3rd party) funding account sources and provide a UI to make such links 1543. The client may display the link UI 1544 (see FIGS. 16-17 for examples) allowing the user to specify the institution and provide access credentials 1545. The MAMTP may then take the institution selection and credentials and generate new account data connecting to the financial institution (e.g., via Yodlee API) and making a request to gain account information and holdings access 1549. When the MAMTP server 1599 obtains the updated external account holdings and information access, it may calculate adjusted funding/savings required based on the new/updated account detail information 1551. The MAMPT server may then generate a progress update of how close the users funding goal is; e.g., if it is only 50% funded, or 9% funded, and whether they are falling behind, at, or ahead of their funding goals based on their time line horizon for the goal. 1555. The MATP server 1599 may then generate a map goal interface update incorporating the progress update, and it may generate ad queries (e.g., if the user is falling behind on saving for a home, but ads of better financing options are available, such ad/bid for information may help the user reach their goal) 1557. The updated information may then be provided to the user, including any incorporated ads 1559.

Additional MAMTP User Interface Embodiments

FIGS. 16-35 shows screenshot diagrams illustrating example embodiments of for the MAMTP. FIG. 16 shows account login/menu option overviews 1602a, 1602b. The account linking interface shows a number of added/existing accounts 1605a, and the interface for stepping through adding a new account 1605b. A user can type in 1605b in the name of a financial institution 1605c resulting in a query returning the bank information and enter their username/password credentials 1605d, resulting in the ability to checkbox select 1605e accounts the user wishes to connect 1605f. In one embodiment, the MAMTP uses the credentials to login and parses account listings from the site to generate an options list 1605e, while in other embodiments, and API allows for obtaining and/or projecting an account views for use selection. Additional account detail may then be obtained and shown to the user 1607, 1609.

FIG. 17 shows additional alternative link interface embodiments 1705a, 1705b. In addition, FIG. 17 shows additional dashboard 1707, account 1713, summary/overview 1715 and client activity 1711 and alerts 1709 interfaces.

FIG. 18 shows account summary, benchmark 1805, and time slice performance 1803 interfaces. In addition allocation 1807, all account 1811, benchmark 1809 and winners and loser performance analytics 1813 are shown.

FIG. 19 shows family accounts 1915, individual account holder 1913, and account overview interfaces 1911.

FIG. 20 shows account name lists 2013, and example over views for individual account holders 2015, 2017 (e.g., that may be viewed by an account manager and/or owner).

Figure 21:
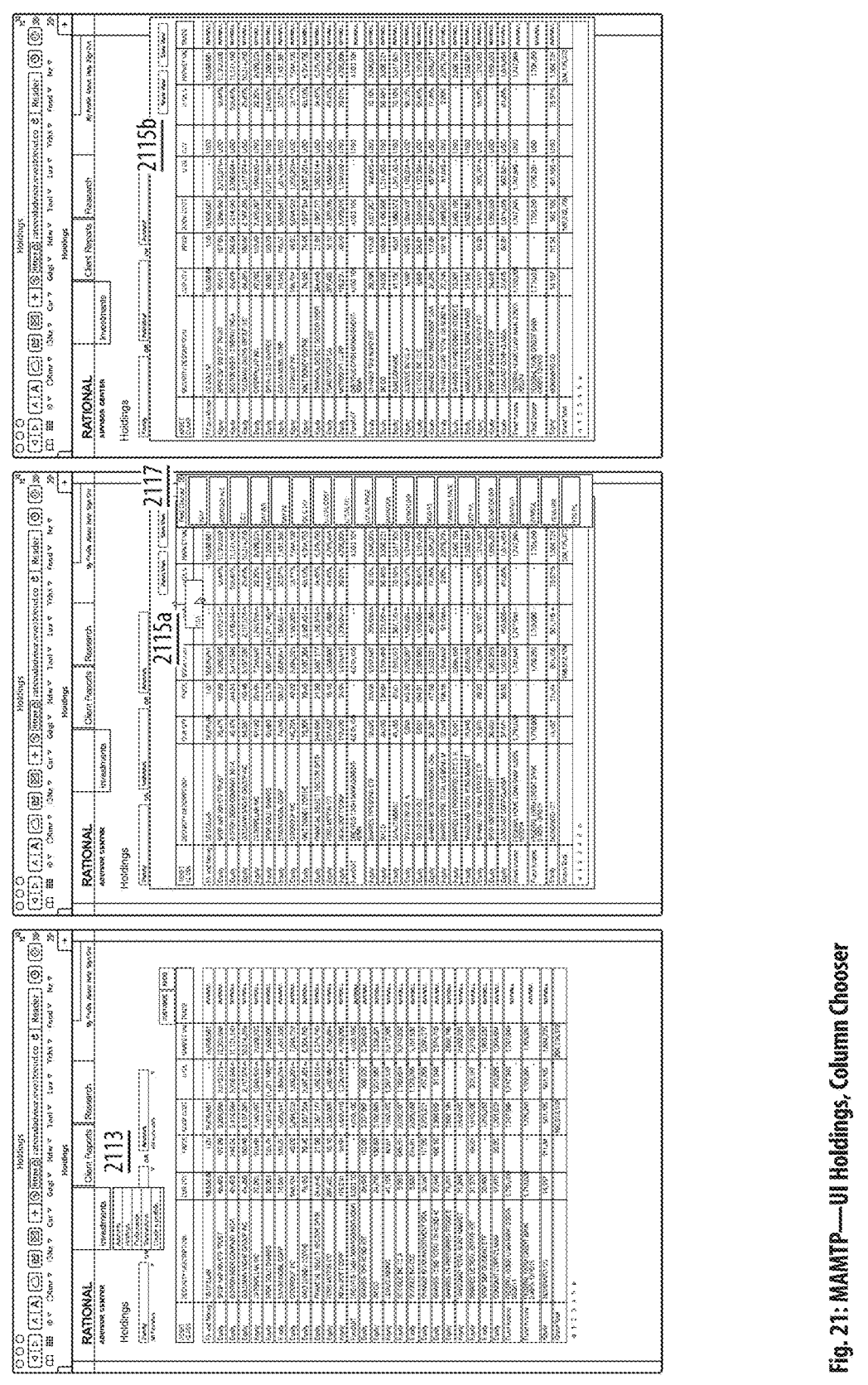

FIG. 21 shows advisory view holdings screen 2113, and a field chooser 2117 interface allowing and advisor/user to drag and drop addition fields of interest into the holdings and/or other views 2115a causing an update in the view 2115b.

FIG. 22 shows advisor performance for their various user accounts.

FIG. 23 shows various account and holdings and market data overview screens for an advisor over numerous accounts. It should be noted that in one embodiment, that any creator of an iTag may be viewed as an 'advisor' as they will be responsible for the constituent makeup of their iTag and as such can see how the holdings of their iTag subscribers are doing. In one embodiment users would have to confirm that use of the iTag allows the owner to see their holdings; in another embodiment, such holdings would be anonymized so the identity of the owner would not be discernable; in another embodiment, iTag owners would only be able to view owners providing consent. This has great social effect where friends can subscribe to each others iTags and cooperate to perform better and better. In one embodiment, iTags can become indices of their own, and the more successful ones can become 'instant fund' subscription tags for any user wishing to participate. In one embodiment, iTag owners may only allow subscription/viewing of the iTag upon a fee; and in one embodiment, a portion of such a fee may be collected by MAMTP for the underlying service.

FIG. 24 shows embodiments allowing a user to view a portfolio viewable from equity class, region, interest and social perspectives 2401 (see also 2505 of FIG. 25). In one embodiment, a user may select interests 2405, 2410 and the chart will update to show constituent 2415. In one embodiment, similarly, a user may take a social view 2420 of a portfolio's constituent make up 2425. In another embodiment, a user may view a comparison of their portfolio (e.g., and any constituent makeup) compared against another portfolio (e.g., someone from their social graph, a celebrity, and/or the like (where the other person provides access privileges for friends and/others to access/view parts of their portfolio so that others can track there constituent holdings)) 2430, 2450. In one embodiment, a user may right click on the comparative portfolio 2435 and see additional detail and engage in additional options (e.g., they may subscribe to the constituent make up of that portfolio and rebalance their own, see additional details, adopt the portfolio makeup for subcomponents of their own portfolio, status of competitions, etc.) 2440. For example, such interworking between social and interest iTags allows for gamification; for example, a user may share their portfolio with friends and/or analogues having similar iTag portfolio constraints and can show that they outperformed one another based on some market moves they made that were not made by their friends and/or iTag portfolio analogues 2440; in this example, a user may redeem points offered (e.g., and/or wagered) for outperforming a celebrity portfolio, with an explanation in the redemption menu showing that continuing to hold onto an asset (e.g., AAPL) accounted for the superior performance during the gaming period.

FIG. 25 shows trading, investment and portfolio creation interfaces for an advisor.

FIG. 26 shows portfolio creation screens for an advisor.

FIGS. 27-31 show creation of an investment structure for a user (e.g., which may be created/used by the user and/or an advisor). In addition to a funding amount 2703, the user may supply answers about their investment philosophy 2705, FIGS. 28-29, investment interests 2905a, 2905b of FIG. 29, FIG. 30, and their account category type 3109a and timing horizon 3109b of FIG. 31. FIG. 31 also shows a widget made from an iTag (e.g., a conservativeness iTag) 3111, allowing a user to scrub along the slider and thereby, in effect select, in one embodiment, different iTags from, e.g., most conservative to, e.g., most aggressive. The user may click on any asset projection information 3113a and get expanded vies 3113b or expand all of them 3113c to see all at once 3113d as they scrub the iTag conservativeness widget 3111 and see the changes in results.

FIG. 32 shows that when the user moves the conservativeness iTag widget 3201a, to a more conservative position 3201b, and confirm they wish to make the change 3201c, that the updated position 3201d results in a change in allocation 3203a to 3203b in positions. Similarly, moving the widget 3201e and confirming the change 3201f shows the more aggressive equity position 3203c when at the most aggressive position 3201g. In one embodiment, such changes show projections of the asset change. In another, the user can have the changes affected either automatically with widget movement and/or after a confirmation/commit, e.g., button, confirmation. FIG. 33 shows moving of the widget 3303h down to a slightly more conservative setting and confirmation thereof 3301i, and the new holdings positions 3303d at the new position 3303j. FIG. 33 also shows numerous saved portfolios 3305 and overview 3307 and client report screens 3309.

Figure 34:
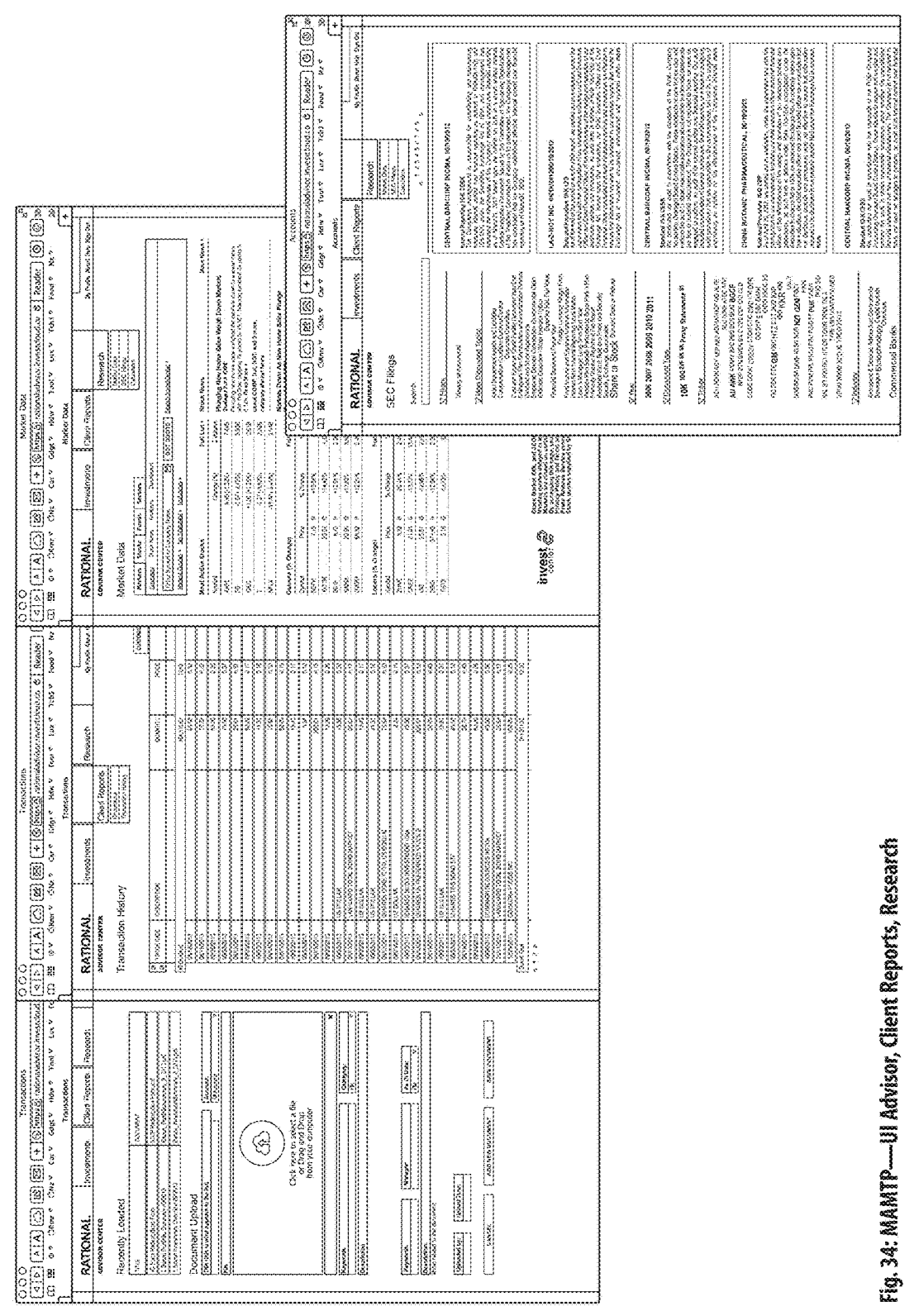

FIG. 34 shows document upload, client transaction history, market data research screens for an advisor.

Figure 35:
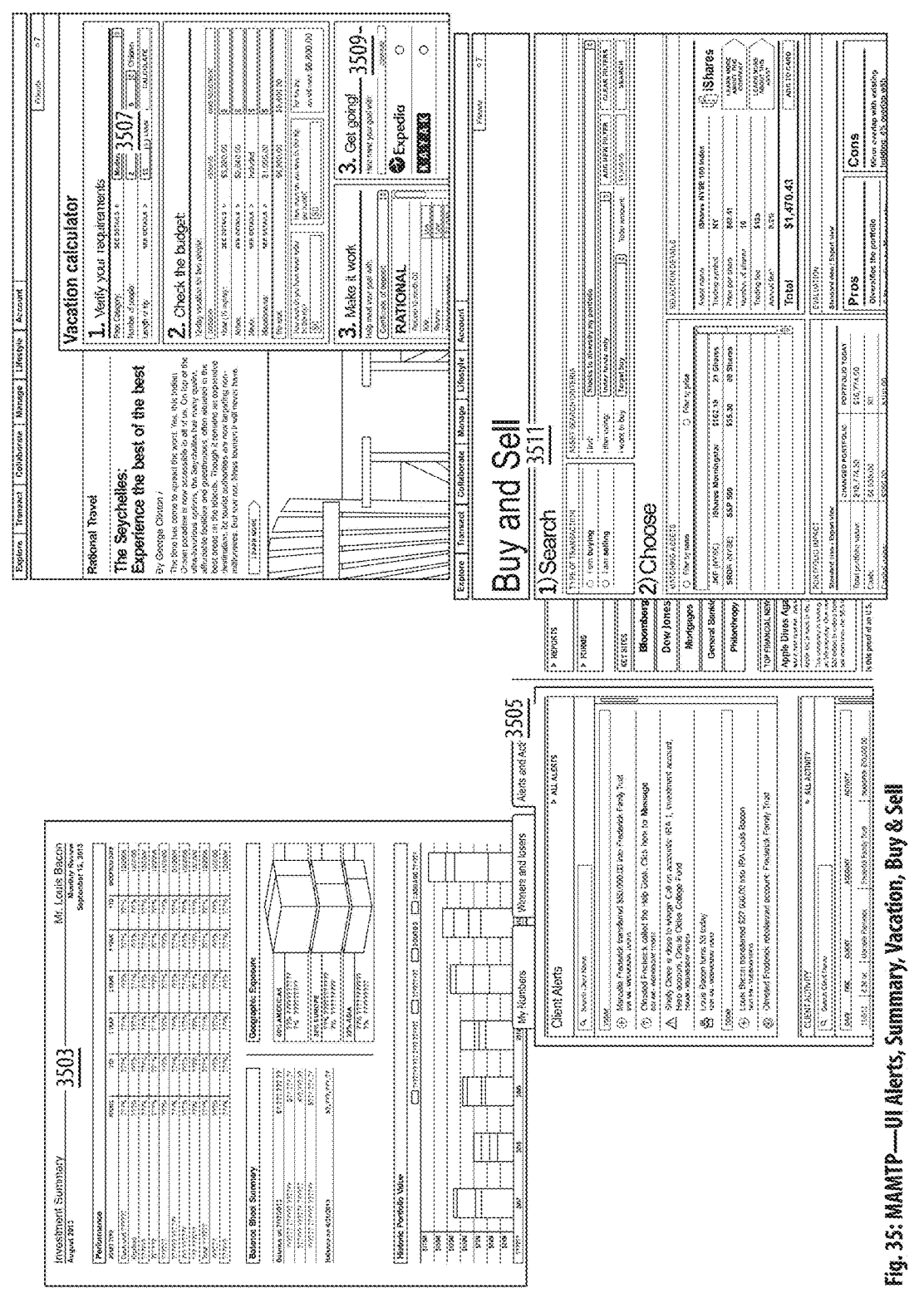

FIG. 35 shows investment summary, client alert activity vacation calculator 3507, ads, and asset buy/sell/search screens 3511.

MAMTP Controller

FIG. 36 shows a block diagram illustrating embodiments of a MAMTP controller. In this embodiment, the MAMTP controller 3601 may serve to aggregate, process, store, search, serve, identify, instruct, generate, match, and/or facilitate interactions with a computer through asset management information technology technologies, and/or other related data.

Typically, users, which may be people and/or other systems, may engage information technology systems (e.g., computers) to facilitate information processing. In turn, computers employ processors to process information; such processors 3603 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 3629 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the MAMTP controller 3601 may be connected to and/or communicate with entities such as, but not limited to: one or more users from peripheral devices 3612 (e.g., user input devices 3611); an optional cryptographic processor device 3628; and/or a communications network 3613.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The MAMTP controller 3601 may be based on computer systems that may comprise, but are not limited to, components such as: a computer systemization 3602 connected to memory 3629.

Computer Systemization

A computer systemization 3602 may comprise a clock 3630, central processing unit ("CPU(s)" and/or "processor(s)" (these terms are used interchangeable throughout the disclosure unless noted to the contrary)) 3603, a memory 3629 (e.g., a read only memory (ROM) 3606, a random access memory (RAM) 3605, etc.), and/or an interface bus 3607, and most frequently, although not necessarily, are all interconnected and/or communicating through a system bus 3604 on one or more (mother)board(s) 3602 having conductive and/or otherwise transportive circuit pathways through which instructions (e.g., binary encoded signals) may travel to effectuate communications, operations, storage, etc. The computer systemization may be connected to a power source 3686; e.g., optionally the power source may be internal. Optionally, a cryptographic processor 3626 may be connected to the system bus. In another embodiment, the cryptographic processor, transceivers (e.g., ICs) 3674, and/or sensor array (e.g., accelerometer, altimeter, ambient light, barometer, global positioning system (GPS) (thereby allowing MAMTP controller to determine its location), gyroscope, magnetometer, pedometer, proximity, ultra-violet sensor, etc.) 3673 may be connected as either internal and/or external peripheral devices 3612 via the interface bus I/O 3608 (not pictured) and/or directly via the interface bus 3607. In turn, the transceivers may be connected to antenna (s) 3675, thereby effectuating wireless transmission and reception of various communication and/or sensor protocols; for example the antenna(s) may connect to various transceiver chipsets (depending on deployment needs), including: Broadcom BCM4329FKUBG transceiver chip (e.g., providing 802.11n, Bluetooth 2.1+EDR, FM, etc.); a Broadcom BCM4752 GPS receiver with accelerometer, altimeter, GPS, gyroscope, magnetometer; a Broadcom BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom BCM43341 transceiver chip (e.g., providing 2G, 3G and 4G LTE cellular communications; 802.11 g/, Bluetooth 4.0, near field communication (NFC), FM radio); an Infineon Technologies X-Gold 618-PMB9800 transceiver chip (e.g., providing 2G/3G HSDPA/HSUPA communications); a MediaTek MT6620 transceiver chip (e.g., providing 802.11a/ac/b/g/n, Bluetooth 4.0 LE, FM, GPS; a Lapis Semiconductor ML8511 UV sensor; a maxim integrated MAX44000 ambient light and infrared proximity sensor; a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks), netbooks, tablets (e.g., Android, iPads, and Windows tablets, etc.), mobile smartphones (e.g., Android, iPhones, Nokia, Palm and Windows phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 3629 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; Apple's A series of processors (e.g., A5, A6, A7, A8, etc.); ARM's application, embedded and secure processors; IBM and/or Motorola's DragonBall and PowerPC; IBM's and Sony's Cell processor; Intel's 80×86 series (e.g., 80386, 80486), Pentium, Celeron, Core (2) Duo, i series (e.g., i3, i5, i7, etc.), Itanium, Xeon, and/or XScale; Motorola's 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the MAMTP controller and beyond through various interfaces. Should processing requirements dictate a greater amount speed and/or capacity, distributed processors (e.g., see Distributed MAMTP below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the MAMTP may be achieved by implementing a microcontroller such as CAST's R8051XC2 microcontroller; Intel's MCS 51 (i.e., 8051 microcontroller); and/or the like. Also, to implement certain features of the MAMTP, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the MAMTP component collection (distributed or otherwise) and/or features may be implemented via the microprocessor and/or via embedded components; e.g., via ASIC, coprocessor, DSP, FPGA, and/or the like. Alternately, some implementations of the MAMTP may be implemented with embedded components that are configured and used to achieve a variety of features or signal processing.

Depending on the particular implementation, the embedded components may include software solutions, hardware solutions, and/or some combination of both hardware/software solutions. For example, MAMTP features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the MAMTP features. A hierarchy of programmable interconnects allow logic blocks to be interconnected as needed by the MAMTP system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the MAMTP may be developed on regular FPGAs and then migrated into a fixed version that more resembles ASIC implementations. Alternate or coordinating implementations may migrate MAMTP controller features to a final ASIC instead of or in addition to FPGAs. Depending on the implementation all of the aforementioned embedded components and microprocessors may be considered the "CPU" and/or "processor" for the MAMTP.

Power Source

The power source 3686 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 3686 is connected to at least one of the interconnected subsequent components of the MAMTP thereby providing an electric current to all subsequent components. In one example, the power source 3686 is connected to the system bus component 3604. In an alternative embodiment, an outside power source 3686 is provided through a connection across the I/O 3608 interface. For example, a USB and/or IEEE 1394 connection carries both data and power across the connection and is therefore a suitable source of power.

Interface Adapters

Interface bus(ses) 3607 may accept, connect, and/or communicate to a number of interface adapters, conventionally although not necessarily in the form of adapter cards, such as but not limited to: input output interfaces (I/O) 3608, storage interfaces 3609, network interfaces 3610, and/or the like. Optionally, cryptographic processor interfaces 3627 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 3609 may accept, communicate, and/or connect to a number of storage devices such as, but not limited to: storage devices 3614, removable disc devices, and/or the like. Storage interfaces may employ connection protocols such as, but not limited to: (Ultra) (Serial) Advanced Technology Attachment (Packet Interface) ((Ultra) (Serial) ATA(PI)) (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 3610 may accept, communicate, and/or connect to a communications network 3613. Through a communications network 3613, the MAMTP controller is accessible through remote clients 3633b (e.g., computers with web browsers) by users 3633a. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed MAMTP below), architectures may similarly be employed to pool, load balance, and/or otherwise decrease/increase the communicative bandwidth required by the MAMTP controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 3610 may be used to engage with various communications network types 3613. For example, multiple network interfaces may be employed to allow for the communication over broadcast, multicast, and/or unicast networks.

Input Output interfaces (I/O) 3608 may accept, communicate, and/or connect to user, peripheral devices 3612 (e.g., input devices 3611), cryptographic processor devices 3628, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

Peripheral devices 3612 may be connected and/or communicate to I/O and/or other facilities of the like such as network interfaces, storage interfaces, directly to the interface bus, system bus, the CPU, and/or the like. Peripheral devices may be external, internal and/or part of the MAMTP controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 3611 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the MAMTP controller may be embodied as an embedded, dedicated, and/or monitor-less (i.e., headless) device, wherein access would be provided over a network interface connection.

Cryptographic units such as, but not limited to, microcontrollers, processors 3626, interfaces 3627, and/or devices 3628 may be attached, and/or communicate with the MAMTP controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 3629. However, memory is a fungible technology and resource, thus, any number of memory embodiments may be employed in lieu of or in concert with one another. It is to be understood that the MAMTP controller and/or a computer systemization may employ various forms of memory 3629. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 3629 will include ROM 3606, RAM 3605, and a storage device 3614. A storage device 3614 may be any conventional computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (W, DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 3629 may contain a collection of program and/or database components and/or data such as, but not limited to: operating system component(s) 3615 (operating system); information server component(s) 3616 (information server); user interface component(s) 3617 (user interface); Web browser component(s) 3618 (Web browser); database(s) 3619; mail server component(s) 3621; mail client component(s) 3622; cryptographic server component(s) 3620 (cryptographic server); the MAMTP component(s) 3635; and/or the like (i.e., collectively a component collection). These components may be stored and accessed from the storage devices and/or from storage devices accessible through an interface bus. Although non-conventional program components such as those in the component collection, typically, are stored in a local storage device 3614, they may also be loaded and/or stored in memory such as: peripheral devices, RAM, remote storage facilities through a communications network, ROM, various forms of memory, and/or the like.

Operating System

The operating system component 3615 is an executable program component facilitating the operation of the MAMTP controller. Typically, the operating system facilitates access of I/O, network interfaces, peripheral devices, storage devices, and/or the like. The operating system may be a highly fault tolerant, scalable, and secure system such as: Apple's Macintosh OS X (Server); AT&T Plan 9; Be OS; Google's Chrome; Microsoft's Windows 7/8; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/Mobile/NT/Vista/XP (Server), Palm OS, and/or the like. Additionally, for robust mobile deployment applications, mobile operating systems may be used, such as: Apple's iOS; China Operating System COS; Google's Android; Microsoft Windows RT/Phone; Palm's WebOS; Samsung/Intel's Tizen; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the MAMTP controller to communicate with other entities through a communications network 3613. Various communication protocols may be used by the MAMTP controller as a subcarrier transport mechanism for interaction, such as, but not limited to: multicast, TCP/IP, UDP, unicast, and/or the like.

Information Server

An information server component 3616 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the MAMTP controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the MAMTP database 3619, operating systems, other program components, user interfaces, Web browsers, and/or the like.

Access to the MAMTP database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the MAMTP. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the MAMTP as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple's iOS, Macintosh Operating System's Aqua; IBM's OS/2; Google's Chrome (e.g., and other webbrowser/cloud based client OSs); Microsoft's Windows varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 3617 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 3618 is a stored program component that is executed by a CPU. The Web browser may be a conventional hypertext viewing application such as Apple's (mobile) Safari, Google's Chrome, Microsoft Internet Explorer, Mozilla's Firefox, Netscape Navigator, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the MAMTP enabled nodes. The combined application may be nugatory on systems employing standard Web browsers.

Mail Server

A mail server component 3621 is a stored program component that is executed by a CPU 3603. The mail server may be a conventional Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the MAMTP. Alternatively, the mail server component may be distributed out to mail service providing entities such as Google's cloud services (e.g., Gmail and notifications may alternatively be provided via messenger services such as AOL's Instant Messenger, Apple's iMessage, Google Messenger, SnapChat, etc.).

Access to the MAMTP mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 3622 is a stored program component that is executed by a CPU 3603. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 3620 is a stored program component that is executed by a CPU 3603, cryptographic processor 3626, cryptographic processor interface 3627, cryptographic processor device 3628, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the MAMTP may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the MAMTP component to engage in secure transactions if so desired. The cryptographic component facilitates the secure accessing of resources on the MAMTP and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The MAMTP Database

The MAMTP database component 3619 may be embodied in a database and its stored data. The database is a stored program component, which is executed by the CPU; the stored program component portion configuring the CPU to process the stored data. The database may be a conventional, fault tolerant, relational, scalable, secure database such as MySQL, Oracle, Sybase, etc. may be used. Additionally, optimized fast memory and distributed databases such as IBM's Netezza, MongoDB's MongoDB, opensource Hadoop, opensource VoltDB, SAP's Hana, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the MAMTP database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the MAMTP database is implemented as a data-structure, the use of the MAMTP database 3619 may be integrated into another component such as the MAMTP component 3635. Also, the database may be implemented as a mix of data structures, objects, and relational structures. Databases may be consolidated and/or distributed in countless variations (e.g., see Distributed MAMTP below). Portions of databases, e.g., tables, may be exported and/or imported and thus decentralized and/or integrated.

In one embodiment, the database component 3619 includes several tables 3619a-z:

An accounts table 3619a includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZlPcode, accountCountry, accountEmail, accountPhone, accountAuthKey, accountlPaddress, accountURLAccessCode, accountPortNo, accountAuthorizationCode, accountAccessPrivileges, accountPreferences, accountRestrictions, and/or the like;

A users table 3619b includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZlPCode, userCountry, userAuthorizationCode, userAccessPrivilges, userPreferences, userRestrictions, and/or the like (the user table may support and/or track multiple entity accounts on a MAMTP);

An devices table 3619c includes fields such as, but not limited to: deviceID, sensorIDs, accountID, assetIDs, paymentIDs, deviceType, deviceName, deviceManufacturer, deviceModel, deviceVersion, deviceSerialNo, devicelPaddress, deviceMACaddress, device_ECID, deviceUUID, deviceLocation, deviceCertificate, deviceOS, appIDs, deviceResources, deviceSession, authKey, deviceSecureKey, walletAppinstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 3619d includes fields such as, but not limited to: appID, appName, appType, appDependencies, accountID, deviceIDs, transactionID, userID, appStoreAuthKey, appStoreAccountID, appStorelPaddress, appStoreURLaccessCode, appStorePortNo, appAccessPrivileges, appPreferences, appRestrictions, portNum, access_API_call, linked_wallets_list, and/or the like;

An assets table 3619e includes fields such as, but not limited to: assetID, accountID, userID, distributorAccountID, distributorPaymentID, distributorOnwerID, assetType, assetName, assetCode, assetQuantity, assetCost, assetPrice, assetValue, assetManufactuer, assetModelNo, assetSerialNo, assetLocation, assetAddress, assetState, assetZlPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, iTagID, assetAPI, assetAPI-connectionAddress, and/or the like;

A payments table 3619f includes fields such as, but not limited to: paymentID, accountID, userID, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZlPcode, paymentCountry, paymentEmail, paymentAuthKey, paymentlPaddress, paymentURLaccessCode, paymentPortNo, paymentAccessPrivileges, paymentPreferences, payementRestrictions, and/or the like;

An transactions table 3619g includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 3619h includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

A agent table 3619i includes fields such as, but not limited to: a agentID, clientID, managerID, accountID, agentName, agentContactInformation, agentAccessPrivileges, agentUserName, agentPassword, agentCredentials, agentAddress, and/or the like.

An manager table 3619j includes fields such as, but not limited to: a managerID, clientID, agentID, managerName, managerContactInformation, managerAccessPrivileges, managerUserName, managerPassword, managerCredentials, managerAddress, and/or the like.

An client table 3619k includes fields such as, but not limited to: a clientID, managerID, agentID, accountID, userID, acountIDCredentials, clientName, clientAddress, clientContactInformation, clientAccessPrivileges, clientUserName, clientPassword, clientCredentials, and/or the like.

An financialAccount table 3619l includes fields such as, but not limited to: a accountID, institutionID, agentID, clientID, managerID, accountID, acountIDCredentials, financialInstitutionName, financialInstitutionAddress, financialInstitutionContactInformation, financialInstitutionAPI_type, financialInstitutionAPI_connectionAddress, and/or the like.

An iTag table 3619m includes fields such as, but not limited to: a iTagID, assetID, adID, iTagName, iTagType, iTagBriefDescription, iTagDescription, iTagConsituents, iTagConstituentProportionConstraint, iTagNonConstituents, iTagSuperclassInheretence, subcriptionID, userIDs, anonymizeFlag, holdingsOpaqueFlag, holdingsOpaqueTimeQuantum, subscriptionCost, subscritionHostingFee, and/or the like.

An ads table 3619n includes fields such as, but not limited to: adID, advertiserID, adNetworkTD, adName, adTags, advertiserName, adSponsor, adTime, adGeo, adAttributes, adFormat, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherindustry, publisherName, publisherDescription, siteDomain, siteURL, siteContent, siteTag, siteContext, siteImpression, siteVisits, siteHeadline, siteP-age, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

A goal table 2119o includes fields such as, but not limited to: goalID, assetID, advertiserID, goalName, iTagID, goalType, goalTemplate, goalForm, goalTemplateLocation, goalKeywords, interrelatedGoals, goalDestinationType, goalTimeHorizon, goalCosts, and/or the like;

A market_data table 3619z includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe, Consolidated Quote System (CQS), Consolidated Tape Association (CTA), Consolidated Tape System (CTS), Dun & Bradstreet, OTC Montage Data Feed (OMDF), Reuter's Tib, Triarch, US equity trade and quote market data, Unlisted Trading Privileges (UTP) Trade Data Feed (UTDF), UTP Quotation Data Feed (UQDF), and/or the like feeds, e.g., via ITC 2.1 and/or respective feed protocols), for example, through Microsoft's Active Template Library and Dealing Object Technology's real-time toolkit Rtt.Multi.

In one embodiment, the MAMTP database may interact with other database systems. For example, employing a distributed database system, queries and data access by search MAMTP component may treat the combination of the MAMTP database, an integrated data security layer database as a single database entity (e.g., see Distributed MAMTP below).

In one embodiment, user programs may contain various user interface primitives, which may serve to update the MAMTP. Also, various accounts may require custom database tables depending upon the environments and the types of clients the MAMTP may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 3619a-z. The MAMTP may be configured to keep track of various settings, inputs, and parameters via database controllers.

The MAMTP database may communicate to and/or with other components in a component collection, including itself, and/or facilities of the like. Most frequently, the MAMTP database communicates with the MAMTP component, other program components, and/or the like. The database may contain, retain, and provide information regarding other nodes and data.

The MAMTPs

The MAMTP component 3635 is a stored program component that is executed by a CPU. In one embodiment, the MAMTP component incorporates any and/or all combinations of the aspects of the MAMTP that was discussed in the previous figures. As such, the MAMTP affects accessing, obtaining and the provision of information, services, transactions, and/or the like across various communications networks. The features and embodiments of the MAMTP discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the MAMTP's features and facilities, and in many cases reduce the costs, energy consumption/requirements, and extend the life of MAMTP's underlying infrastructure; this has the added benefit of making the MAMTP more reliable. Similarly, many of the features and mechanisms are designed to be easier for users to use and access, thereby broadening the audience that may enjoy/employ and exploit the feature sets of the MAMTP; such ease of use also helps to increase the reliability of the MAMTP. In addition, the feature sets include heightened security as noted via the Cryptographic components 3620, 3626, 3628 and throughout, making access to the features and data more reliable and secure The MAMTP transforms iTag Creation Request and iTag Creation Responses, holdings selections, allocation splits, goal map selections, goal option selections, account links inputs, via MAMTP components (e.g., iTag creation, instantiate iTag create UI, iTag apply, portfolio create, portfolio iTag create, iTag, asset holdings slicer, slicer UI, goal map, goal map UI, map), into iTag records, iTagged asset information, asset buy/sell approval, asset order, map goal add, tracking, outputs.

The MAMTP component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the MAMTP server employs a cryptographic server to encrypt and decrypt communications. The MAMTP component may communicate to and/or with other components in a component collection, including itself, and/or facilities of the like. Most frequently, the MAMTP component communicates with the MAMTP database, operating systems, other program components, and/or the like. The MAMTP may contain, communicate, generate, obtain, and/or provide program component, system, user, and/or data communications, requests, and/or responses.

Distributed MAMTPs

The structure and/or operation of any of the MAMTP node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the MAMTP controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services, Microsoft Azure, Hewlett Packard Helion, IBM Cloud services allow for MAMTP controller and/or MAMTP component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the MAMTP controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address='192.168.0.100';
$port=255;
// create a server-side SSL socket, listen for/accept incoming communication $sock=socket_create(AF_INET, SOCK_STREAM, 0);
socket_bind($sock, $address, $port) or die('Could not bind to address');
socket_listen($sock);
$client=socket_accept($sock);
// read input data from client device in 1024 byte blocks until end of message do {
    $input=" ";
    $input=socket_read($client, 1024);
    $data.=$input;
} while($input !=" ");
// parse data to extract variables
$obj=json_decode($data, true);
// store input data in a database
mysql_connect("201.408.185.132",$DBserver,$password); // access database server
mysql_select("CLIENT_DB.SQL"); // select database to append
mysql_query("INSERT INTO UserTable (transmission) VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xay.com/perl/site/lib/SOAP/Parser.html
http://publib.boulder.ibm.com/infocenter/tivihelp/v2r1/ index.jsp?topic=/com.ibm .IBMDI.doc/ referenceguide295.htm and other parser implementations:

http://publib.boulder.ibm.com/infocenter/tivihelp/v2r1/ index.jsp?topic=/com.ibm .IBMDI.doc/ referenceguide259.htm all of which are hereby expressly incorporated by reference.

Additional example embodiments include:

Tag-Balancing

1. A multi-dimensional tag-balancing apparatus, comprising:

a memory;

a processor disposed in communication with said memory, and configured to issue a plurality of processing instructions stored in the memory, wherein the processor issues instructions to:

obtain an asset collection identifier for an asset collection from a user;

obtain interest profile constraints associated with the asset collection identifier;

provide a plurality of interest tags for selection to the user;

obtain an interest tag selection to be applied to the asset collection;

obtain constituent asset collection proportion allocation information based on the interest tag selection;

determine if the obtained interest tag selection conflicts with the interest profile constraints associated with the asset collection;

provide a selection mechanism for the user to specify preferences among any conflicting tag selections;

generate synthetic alternatives according to any specified preferences for any conflicting tag selections;

generate a rebalance of the asset collection based on the obtained constituent asset collection proportion allocation information, any obtained specified preferences amongst any conflicting tag selections, and any generated synthetic alternatives;

provide the rebalanced asset collection to the user for approval; and rebalance the asset collection upon obtaining approval, wherein rebalancing executes asset trades to comport with the generated rebalancing of the asset collection.

2. The apparatus of embodiment 1 wherein the interest tag selection is a tracking tag.

3. The apparatus of embodiment 2 wherein the tracking tag allows a tag owner to view the user's asset holdings tagged with the tracking tag.

4. The apparatus of embodiment 2 wherein the tag owner may view the user's asset holdings anonymized of the user's identity.

5. The apparatus of embodiment 2 wherein the tag owner may view the user's asset holdings only with permission of the user.

6. The apparatus of embodiment 2 wherein the tag owner may charge a subscription fee to allow the user to track the tracking tag.

7. The apparatus of embodiment 2 wherein the tag owner may aggregate performance of all tracking portfolios as an index.

8. The apparatus of embodiment 2 wherein the tag owner may aggregate performance of all tracking portfolios as a fund.

9. The apparatus of embodiment 2 wherein the tag owner may allow tracking of the tracking tag without users being able to see underlying assets.

10. The apparatus of embodiment 9 wherein users will only be able to see the underlying assets after a specified delay, wherein the delay may be any of: minutes, hours, days, months, quarters, years.

11. A holdings slicer apparatus, comprising:
a memory;
a component collection in the memory, including:
an asset holdings slicer component;
a processor disposed in communication with the memory, and configured to issue a plurality of processing instructions from the component collection stored in the memory, to:
wherein the processor issues instructions from the asset holding slicer component, stored in the memory, to:
obtain, from a slicer UI component, a holdings selection of an asset holdings object, wherein the selection may include a subportion selection of the asset holdings object;
obtain asset holdings values for the holdings selection;
provide the asset holdings values, to the slicer UI component, for display update;
obtain an apportionment change, from the slicer UI component, wherein the apportionment change includes indication of a portion of the holdings selection to be changed and a change type to be applied to the portion of the holdings selection to be changed;
obtain allocation adjustment holdings based on the apportionment change;
provide the allocation adjustment holdings, to the slicer UI component, for user review;
provide instruction to effect underlying asset adjustments per approved allocation adjustment holdings reviewed by a user.

12. The apparatus of embodiment 11 wherein the apportionment change is a drag and drop operation indicating a change of change asset holding types, wherein the original holding type was set in the location where the drag operation started, and the destination holding type is set by the target of the drop operation.

13. The apparatus of embodiment 11 wherein the asset holdings object include any of: a pie chart, bar chart, scatter chart, 3D cube chart, holdings goal map destination.

14. The apparatus of embodiment 11 wherein the asset holdings values include any of: asset values, tags associated with values, holdings types.

15. The apparatus of embodiment 14 wherein the holdings types include any of: equity, fixed income, cash, real estate, asset alternatives.

16. The apparatus of embodiment 14 wherein the tags are iTags.

17. The apparatus of embodiment 14 wherein the tags include any of: philosophy, interest, and social.

18. The apparatus of embodiment 11 wherein the subportion selection of the asset holdings object is a graph slice representing a subportion of assets.

19. The apparatus of embodiment 11 wherein the change type is any of: holdings types, tags.

20. The apparatus of embodiment 11 further, comprising:
determining that an obtained apportionment change's change type does not conflict with a portion of holdings not to be changed and instantiating the non conflicting portion within the holdings selection as a subclass.

21. The apparatus of embodiment 11 further, comprising:
determining that an obtained apportionment change's change type does conflict with a portion of holdings not to be changed and instantiating the conflicting portion as a new portional holdings selection.

22. A holdings goal map apparatus, comprising:
a memory;
a component collection in the memory, including:
a goal map component; and
a processor disposed in communication with the memory, and configured to issue a plurality of processing instructions from the component collection stored in the memory, to:
wherein the processor issues instructions from the goal map component, stored in the memory, to:
receive, from a goal map UI component, a selection of an asset goal holding type;
obtain, from a goal map UI component, indication of disposition of said asset goal holding type on a time line for a desired goal time, wherein the point of disposition creates a time of desired acquisition of the goal;
retrieve, from a goal map UI component, an option selection template receptacle and option specific information based on the selection of the asset goal type;
generate a selection options receptacle by placing option specific information into the option selection template receptacle and provide the selection options receptacle for display;
obtain, from a goal map UI component, option selections from interactions with the selection options receptacle;
calculate a goal cost based on the goal holding type and its option selections;
calculate required funding levels to support the obtainment of the goal based on the goal cost and the time of desired acquisition of the goal;
provide, to a goal map UI component, an update of the funding levels to support the obtainment of the goal for approval by a user; and
instantiate a goal of the selected asset goal holding type and option selections approved by the user.

23. The apparatus of embodiment 22 wherein the time line is denoted in years representing a user's age.

24. The apparatus of embodiment 22 wherein the update includes ads.

25. The apparatus of embodiment 24 wherein the ads are relevant to the goals.

26. The apparatus of embodiment 22 wherein prior to the update being provided, bids on goal keywords are accepted for placement as goal selection options in the update.

27. The apparatus of embodiment 22 wherein prior to the update being provided, bids on goal keywords are accepted for placement as ads in the update.

28. A processor-readable tag-balancing non-transient medium storing processor-executable components, the components, comprising:
a component collection stored in the medium, including:
an update iTag affected subscribed portfolio component;
wherein the component collection, stored in the medium, includes processor-issuable instructions to:
obtain an asset collection identifier for an asset collection from a user;

obtain interest profile constraints associated with the asset collection identifier;
provide a plurality of interest tags for selection to the user;
obtain an interest tag selection to be applied to the asset collection;
obtain constituent asset collection proportion allocation information based on the interest tag selection;
determine if the obtained interest tag selection conflicts with the interest profile constraints associated with the asset collection;
provide a selection mechanism for the user to specify preferences among any conflicting tag selections;
generate synthetic alternatives according to any specified preferences for any conflicting tag selections;
generate a rebalance of the asset collection based on the obtained constituent asset collection proportion allocation information, any obtained specified preferences amongst any conflicting tag selections, and any generated synthetic alternatives;
provide the rebalanced asset collection to the user for approval; and
rebalance the asset collection upon obtaining approval, wherein rebalancing executes asset trades to comport with the generated rebalancing of the asset collection.

29. The medium of embodiment 28 wherein the interest tag selection is a tracking tag.

30. The medium of embodiment 28 wherein the tracking tag allows a tag owner to view the user's asset holdings tagged with the tracking tag.

31. The medium of embodiment 28 wherein the tag owner may view the user's asset holdings anonymized of the user's identity.

32. The medium of embodiment 28 wherein the tag owner may view the user's asset holdings only with permission of the user.

33. The medium of embodiment 28 wherein the tag owner may charge a subscription fee to allow the user to track the tracking tag.

34. The apparatus of embodiment 28 wherein the tag owner may aggregate performance of all tracking portfolios as an index.

35. The apparatus of embodiment 28 wherein the tag owner may aggregate performance of all tracking portfolios as a fund.

36. The apparatus of embodiment 28 wherein the tag owner may allow tracking of the tracking tag without users being able to see underlying assets.

37. The apparatus of embodiment 36 wherein users will only be able to see the underlying assets after a specified delay, wherein the delay may be any of: minutes, hours, days, months, quarters, years.

38. A processor-implemented tag-balancing system, comprising:
an update iTag affected subscribed portfolio component means, to:
obtain an asset collection identifier for an asset collection from a user;
obtain interest profile constraints associated with the asset collection identifier;
provide a plurality of interest tags for selection to the user;
obtain an interest tag selection to be applied to the asset collection;
obtain constituent asset collection proportion allocation information based on the interest tag selection;
determine if the obtained interest tag selection conflicts with the interest profile constraints associated with the asset collection;
provide a selection mechanism for the user to specify preferences among any conflicting tag selections;
generate synthetic alternatives according to any specified preferences for any conflicting tag selections;
generate a rebalance of the asset collection based on the obtained constituent asset collection proportion allocation information, any obtained specified preferences amongst any conflicting tag selections, and any generated synthetic alternatives;
provide the rebalanced asset collection to the user for approval; and
rebalance the asset collection upon obtaining approval, wherein rebalancing executes asset trades to comport with the generated rebalancing of the asset collection.

39. The system of embodiment 38 wherein the interest tag selection is a tracking tag.

40. The system of embodiment 38 wherein the tracking tag allows a tag owner to view the user's asset holdings tagged with the tracking tag.

41. The system of embodiment 38 wherein the tag owner may view the user's asset holdings anonymized of the user's identity.

42. The system of embodiment 38 wherein the tag owner may view the user's asset holdings only with permission of the user.

43. The system of embodiment 38 wherein the tag owner may charge a subscription fee to allow the user to track the tracking tag.

44. The system of embodiment 38 wherein the tag owner may aggregate performance of all tracking portfolios as an index.

45. The system of embodiment 38 wherein the tag owner may aggregate performance of all tracking portfolios as a fund.

46. The system of embodiment 38 wherein the tag owner may allow tracking of the tracking tag without users being able to see underlying assets.

47. The system of embodiment 46 wherein users will only be able to see the underlying assets after a specified delay, wherein the delay may be any of: minutes, hours, days, months, quarters, years.

48. A processor-implemented tag-balancing and transformation method, comprising:
executing processor-implemented an update iTag affected subscribed portfolio component instructions to:
obtain an asset collection identifier for an asset collection from a user;
obtain interest profile constraints associated with the asset collection identifier;
provide a plurality of interest tags for selection to the user;
obtain an interest tag selection to be applied to the asset collection;
obtain constituent asset collection proportion allocation information based on the interest tag selection;
determine if the obtained interest tag selection conflicts with the interest profile constraints associated with the asset collection;
provide a selection mechanism for the user to specify preferences among any conflicting tag selections;
generate synthetic alternatives according to any specified preferences for any conflicting tag selections;
generate a rebalance of the asset collection based on the obtained constituent asset collection proportion allocation information, any obtained specified preferences amongst any conflicting tag selections, and any generated synthetic alternatives;

provide the rebalanced asset collection to the user for approval; and
rebalance the asset collection upon obtaining approval, wherein rebalancing executes asset trades to comport with the generated rebalancing of the asset collection.

49. The method of embodiment 38 wherein the interest tag selection is a tracking tag.

50. The method of embodiment 38 wherein the tracking tag allows a tag owner to view the user's asset holdings tagged with the tracking tag.

51. The method of embodiment 38 wherein the tag owner may view the user's asset holdings anonymized of the user's identity.

52. The method of embodiment 38 wherein the tag owner may view the user's asset holdings only with permission of the user.

53. The method of embodiment 38 wherein the tag owner may charge a subscription fee to allow the user to track the tracking tag.

54. The method of embodiment 38 wherein the tag owner may aggregate performance of all tracking portfolios as an index.

55. The method of embodiment 38 wherein the tag owner may aggregate performance of all tracking portfolios as a fund.

56. The method of embodiment 38 wherein the tag owner may allow tracking of the tracking tag without users being able to see underlying assets.

57. The method of embodiment 30.62 wherein users will only be able to see the underlying assets after a specified delay, wherein the delay may be any of: minutes, hours, days, months, quarters, years.

Slicer

58. A processor-readable holdings slicer non-transient medium storing processor-executable components, the components, comprising:
a component collection stored in the medium, including:
an asset holdings slicer component;
wherein the component collection, stored in the medium, includes processor-issuable instructions to:
obtain, from a slicer UI component, a holdings selection of an asset holdings object, wherein the selection may include a subportion selection of the asset holdings object;
obtain asset holdings values for the holdings selection;
provide the asset holdings values, to the slicer UI component, for display update;
obtain an apportionment change, from the slicer UI component, wherein the apportionment change includes indication of a portion of the holdings selection to be changed and a change type to be applied to the portion of the holdings selection to be changed;
obtain allocation adjustment holdings based on the apportionment change;
provide the allocation adjustment holdings, to the slicer UI component, for user review;
provide instruction to effect underlying asset adjustments per approved allocation adjustment holdings reviewed by a user.

59. The medium of embodiment 58 wherein the apportionment change is a drag and drop operation indicating a change of change asset holding types, wherein the original holding type was set in the location where the drag operation started, and the destination holding type is set by the target of the drop operation.

60. The medium of embodiment 58 wherein the asset holdings object include any of: a pie chart, bar chart, scatter chart, 3D cube chart, holdings goal map destination.

61. The medium of embodiment 58 wherein the asset holdings values include any of: asset values, tags associated with values, holdings types.

62. The medium of embodiment 58 wherein the holdings types include any of: equity, fixed income, cash, real estate, asset alternatives.

63. The medium of embodiment 58 wherein the tags are iTags.

64. The medium of embodiment 58 wherein the tags include any of: philosophy, interest, and social.

65. The medium of embodiment 58 wherein the subportion selection of the asset holdings object is a graph slice representing a subportion of assets.

66. The medium of embodiment 58 wherein the change type is any of: holdings types, tags.

67. The medium of embodiment 58 further comprising instructions to:
determine that an obtained apportionment change's change type does not conflict with a portion of holdings not to be changed and instantiating the non conflicting portion within the holdings selection as a subclass.

68. The medium of embodiment 58 further comprising instructions to:
determine that an obtained apportionment change's change type does conflict with a portion of holdings not to be changed and instantiating the conflicting portion as a new portional holdings selection.

69. A processor-implemented holdings slicer system, comprising:
an asset holdings slicer component means, to:
obtain, from a slicer UI component, a holdings selection of an asset holdings object, wherein the selection may include a subportion selection of the asset holdings object;
obtain asset holdings values for the holdings selection;
provide the asset holdings values, to the slicer UI component, for display update;
obtain an apportionment change, from the slicer UI component, wherein the apportionment change includes indication of a portion of the holdings selection to be changed and a change type to be applied to the portion of the holdings selection to be changed;
obtain allocation adjustment holdings based on the apportionment change;
provide the allocation adjustment holdings, to the slicer UI component, for user review;
provide instruction to effect underlying asset adjustments per approved allocation adjustment holdings reviewed by a user.

70. The system of embodiment 69 wherein the apportionment change is a drag and drop operation indicating a change of change asset holding types, wherein the original holding type was set in the location where the drag operation started, and the destination holding type is set by the target of the drop operation.

71. The system of embodiment 69 wherein the asset holdings object include any of: a pie chart, bar chart, scatter chart, 3D cube chart, holdings goal map destination.

72. The system of embodiment 69 wherein the asset holdings values include any of: asset values, tags associated with values, holdings types.

73. The system of embodiment 69 wherein the holdings types include any of: equity, fixed income, cash, real estate, asset alternatives.

74. The system of embodiment 69 wherein the tags are iTags.

75. The system of embodiment 69 wherein the tags include any of: philosophy, interest, and social.

76. The system of embodiment 69 wherein the subportion selection of the asset holdings object is a graph slice representing a subportion of assets.

77. The system of embodiment 69 wherein the change type is any of: holdings types, tags.

78. The system of embodiment 69 further comprising instructions to:
determine that an obtained apportionment change's change type does not conflict with a portion of holdings not to be changed and instantiating the non conflicting portion within the holdings selection as a subclass.

79. The system of embodiment 69 further comprising instructions to:
determine that an obtained apportionment change's change type does conflict with a portion of holdings not to be changed and instantiating the conflicting portion as a new portional holdings selection.

80. A processor-implemented holdings slicer and transformation method, comprising: executing processor-implemented asset holdings slicer component instructions to:
obtain, from a slicer UI component, a holdings selection of an asset holdings object, wherein the selection may include a subportion selection of the asset holdings object;
obtain asset holdings values for the holdings selection;
provide the asset holdings values, to the slicer UI component, for display update;
obtain an apportionment change, from the slicer UI component, wherein the apportionment change includes indication of a portion of the holdings selection to be changed and a change type to be applied to the portion of the holdings selection to be changed;
obtain allocation adjustment holdings based on the apportionment change;
provide the allocation adjustment holdings, to the slicer UI component, for user review;
provide instruction to effect underlying asset adjustments per approved allocation adjustment holdings reviewed by a user.

81. The method of embodiment 80 wherein the apportionment change is a drag and drop operation indicating a change of change asset holding types, wherein the original holding type was set in the location where the drag operation started, and the destination holding type is set by the target of the drop operation.

82. The method of embodiment 80 wherein the asset holdings object include any of: a pie chart, bar chart, scatter chart, 3D cube chart, holdings goal map destination.

83. The method of embodiment 80 wherein the asset holdings values include any of: asset values, tags associated with values, holdings types.

84. The method of embodiment 80 wherein the holdings types include any of: equity, fixed income, cash, real estate, asset alternatives.

85. The method of embodiment 80 wherein the tags are iTags.

86. The method of embodiment 80 wherein the tags include any of: philosophy, interest, and social.

87. The method of embodiment 80 wherein the subportion selection of the asset holdings object is a graph slice representing a subportion of assets.

88. The method of embodiment 80 wherein the change type is any of: holdings types, tags.

89. The method of embodiment 80 further comprising instructions to:
determine that an obtained apportionment change's change type does not conflict with a portion of holdings not to be changed and instantiating the non conflicting portion within the holdings selection as a subclass.

90. The method of embodiment 80 further comprising instructions to:
determine that an obtained apportionment change's change type does conflict with a portion of holdings not to be changed and instantiating the conflicting portion as a new portional holdings selection.

Goal Mapping

91. A processor-readable holdings goal map non-transient medium storing processor-executable components, the components, comprising:
a component collection stored in the medium, including:
a goal map component;
wherein the component collection, stored in the medium, includes processor-issuable instructions to:
receive, from a goal map UI component, a selection of an asset goal holding type;
obtain, from a goal map UI component, indication of disposition of said asset goal holding type on a time line for a desired goal time, wherein the point of disposition creates a time of desired acquisition of the goal;
retrieve, from a goal map UI component, an option selection template receptacle and option specific information based on the selection of the asset goal type;
generate a selection options receptacle by placing option specific information into the option selection template receptacle and provide the selection options receptacle for display;
obtain, from a goal map UI component, option selections from interactions with the selection options receptacle;
calculate a goal cost based on the goal holding type and its option selections;
calculate required funding levels to support the obtainment of the goal based on the goal cost and the time of desired acquisition of the goal;
provide, to a goal map UI component, an update of the funding levels to support the obtainment of the goal for approval by a user; and
instantiate a goal of the selected asset goal holding type and option selections approved by the user.

92. The medium of embodiment 91 wherein the time line is denoted in years representing a user's age.

93. The medium of embodiment 91 wherein the update includes ads.

94. The medium of embodiment 93 wherein the ads are relevant to the goals.

95. The medium of embodiment 91 wherein prior to the update being provided, bids on goal keywords are accepted for placement as goal selection options in the update.

96. The medium of embodiment 91 wherein prior to the update being provided, bids on goal keywords are accepted for placement as ads in the update.

97. A processor-implemented holdings goal map system, comprising:

a goal map component means, to:
  receive, from a goal map UI component, a selection of an asset goal holding type;
  obtain, from a goal map UI component, indication of disposition of said asset goal holding type on a time line for a desired goal time, wherein the point of disposition creates a time of desired acquisition of the goal;
  retrieve, from a goal map UI component, an option selection template receptacle and option specific information based on the selection of the asset goal type;
  generate a selection options receptacle by placing option specific information into the option selection template receptacle and provide the selection options receptacle for display;
  obtain, from a goal map UI component, option selections from interactions with the selection options receptacle;
  calculate a goal cost based on the goal holding type and its option selections;
  calculate required funding levels to support the obtainment of the goal based on the goal cost and the time of desired acquisition of the goal;
  provide, to a goal map UI component, an update of the funding levels to support the obtainment of the goal for approval by a user; and
  instantiate a goal of the selected asset goal holding type and option selections approved by the user.

98. The system of embodiment 97 wherein the time line is denoted in years representing a user's age.

99. The system of embodiment 97 wherein the update includes ads.

100. The system of embodiment 99 wherein the ads are relevant to the goals.

101. The system of embodiment 97 wherein said goal map component means is configured such that, prior to the update being provided, bids on goal keywords are accepted for placement as goal selection options in the update.

102. The system of embodiment 97 wherein said goal map component means is configured such that, prior to the update being provided, bids on goal keywords are accepted for placement as ads in the update.

103. A processor-implemented holdings goal map and transformation method, comprising:

executing processor-implemented goal map component instructions to:
  receive, from a goal map UI component, a selection of an asset goal holding type;
  obtain, from a goal map UI component, indication of disposition of said asset goal holding type on a time line for a desired goal time, wherein the point of disposition creates a time of desired acquisition of the goal;
  retrieve, from a goal map UI component, an option selection template receptacle and option specific information based on the selection of the asset goal type;
  generate a selection options receptacle by placing option specific information into the option selection template receptacle and provide the selection options receptacle for display;
  obtain, from a goal map UI component, option selections from interactions with the selection options receptacle;
  calculate a goal cost based on the goal holding type and its option selections;
  calculate required funding levels to support the obtainment of the goal based on the goal cost and the time of desired acquisition of the goal;
  provide, to a goal map UI component, an update of the funding levels to support the obtainment of the goal for approval by a user; and
  instantiate a goal of the selected asset goal holding type and option selections approved by the user.

104. The method of embodiment 103 wherein the time line is denoted in years representing a user's age.

105. The method of embodiment 103 wherein the update includes ads.

106. The method of embodiment 105 wherein the ads are relevant to the goals.

107. The method of embodiment 103 wherein said goal map component means is configured such that, prior to the update being provided, bids on goal keywords are accepted for placement as goal selection options in the update.

108. The method of embodiment 103 wherein said goal map component means is configured such that, prior to the update being provided, bids on goal keywords are accepted for placement as ads in the update.

In order to address various issues and advance the art, the entirety of this application for Multidimensional Asset Management Tag Pivot Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the FIGS. and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower," "upper," "horizontal," "vertical," "above," "below," "up," "down," "top" and "bottom" as well as derivative thereof (e.g., "horizontally," "downwardly," "upwardly," etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached," "affixed," "connected," "coupled," "interconnected," and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a MAMTP individual and/or enterprise user, database configuration and/or relational model, data type, data transmission and/or network framework, syntax structure, and/or the like, various embodiments of the MAMTP, may be implemented that enable a great deal of flexibility and customization. For example, aspects of the MAMTP may be adapted for asset management and transaction. While various embodiments and discussions of the MAMTP have included tag-based management balancing, however, it is to be understood that the embodiments described herein may be readily configured and/or customized for a wide variety of other applications and/or implementations.

What is claimed is:

1. A holdings goal map apparatus, comprising:
a memory;
a component collection in the memory, including:
   a goal map component; and
a processor disposed in communication with the memory, and configured to issue a plurality of processing instructions from the component collection stored in the memory, to:
   obtain, from a goal map user interface component, a selection data structure of an asset goal holding type;
   obtain, from the goal map user interface component, an indication of disposition data structure of the asset goal holding type on a time line for a desired goal time, wherein the indication of disposition data structure is used to create a time of desired acquisition of a goal;
   obtain, from the goal map user interface component, an option selection template receptacle and option specific information based on the selection data structure of the asset goal holding type;
   generate a selection options receptacle by placing the option specific information into the option selection template receptacle and provide the selection options receptacle for display;
   obtain, from the goal map user interface component, option selections data structure from interactions with the selection options receptacle;
   calculate a goal cost based on the asset goal holding type and the option selections data structure;
   calculate required funding levels to support an obtainment of the goal based on the goal cost and the time of desired acquisition of the goal;
   provide, to the goal map user interface component, an update of the funding levels to support the obtainment of the goal for approval by a user, wherein prior to the update being provided, bids on goal keywords are accepted for placement as the selection options of the goal in the update;
   instantiate the goal of the selected asset goal holding type and the option selections approved by the user, wherein the goal is a data structure configured to be operable on a goal map and interconnect with other goals on the goal map;
   provide, to the goal map user interface component, an update to display the goal on a goal map, wherein the goal map is configured to interconnect goals along a path according to desired goal times.

2. The apparatus of claim 1 wherein the time line is denoted in years representing a user's age.

3. The apparatus of claim 1 wherein the update includes ads.

4. The apparatus of claim 3 wherein the ads are relevant to the goals.

5. The apparatus of claim 1 wherein prior to the update being provided, bids on goal keywords are accepted for placement as ads in the update.

* * * * *